(12) United States Patent
Tsovilis et al.

(10) Patent No.: US 10,340,688 B2
(45) Date of Patent: *Jul. 2, 2019

(54) MODULAR OVERVOLTAGE PROTECTION UNITS

(71) Applicant: RIPD IP ASSETS LTD, Nicosia (CY)

(72) Inventors: Thomas Tsovilis, Drama (GR); Eva Giannelaki, Drama (GR); Fani Asimakopoulou, Athens (GR); Konstantinos Bakatsias, Athens (GR); Zafiris G. Politis, Athens (GR)

(73) Assignee: RIPD IP ASSETS LTD, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,158

(22) Filed: Jan. 12, 2018

(65) Prior Publication Data

US 2018/0138698 A1    May 17, 2018

Related U.S. Application Data

(63) Continuation of application No. 14/715,770, filed on May 19, 2015, now Pat. No. 9,906,017.

(Continued)

(51) Int. Cl.
*H02H 9/00* (2006.01)
*H02H 9/06* (2006.01)
(Continued)

(52) U.S. Cl.
CPC .............. *H02H 9/06* (2013.01); *H01C 1/022* (2013.01); *H01C 7/12* (2013.01); *H01C 13/02* (2013.01); *H01T 1/16* (2013.01); *H01C 1/014* (2013.01)

(58) Field of Classification Search
CPC ........................................................ H02H 9/06
See application file for complete search history.

(56) References Cited

U.S. PATENT DOCUMENTS

| 1,144,029 A | 6/1915 | Creighton |
| 2,158,859 A | 5/1939 | Horikoshi |

(Continued)

FOREIGN PATENT DOCUMENTS

| CH | 466 427 A | 12/1968 |
| DE | 3428258 A1 | 2/1986 |

(Continued)

OTHER PUBLICATIONS

Beitz et al. "Dubbel Taschenbuch für den Maschinenbau" (3 pages) (1997).

(Continued)

*Primary Examiner* — Stephen W Jackson
(74) *Attorney, Agent, or Firm* — Myers Bigel, P.A.

(57) ABSTRACT

A modular overvoltage protection unit for electrically connecting a first power line and/or a second power line to a protected earth (PE) line in the case of an overvoltage event on the first or second power line includes a unit enclosure defining an enclosure cavity, and first and second surge protection devices (SPDs) each disposed in the enclosure cavity. Each of the first and second SPDs includes: a first electrode in the form of a metal housing defining a housing cavity; a second electrode disposed within the housing cavity; and a varistor member captured between and electrically connected with each of the first and second electrodes, wherein the varistor member is formed of a varistor material. The overvoltage protection unit further includes: a first line terminal to connect the first power line to the overvoltage protection unit, wherein the first line terminal is electrically connected to the second electrode of the first SPD; a second line terminal to connect the second power line to the overvoltage protection unit, wherein the second line terminal is electrically connected to the second electrode of the second SPD; and a PE terminal to connect the (Continued)

PE line to the overvoltage protection unit, wherein the PE terminal is electrically connected to the metal housing of the second SPD. The metal housing of the first SPD is electrically connected to the PE terminal through the metal housing of the second SPD.

25 Claims, 33 Drawing Sheets

Related U.S. Application Data

(60) Provisional application No. 62/007,126, filed on Jun. 3, 2014.

(51) Int. Cl.
    *H01C 1/022* (2006.01)
    *H01C 7/12* (2006.01)
    *H01C 13/02* (2006.01)
    *H01T 1/16* (2006.01)
    *H01C 1/014* (2006.01)

(56) References Cited

U.S. PATENT DOCUMENTS

| | | |
|---|---|---|
| 2,311,758 A | 2/1943 | Johansson |
| 2,971,132 A | 2/1961 | Nash |
| 3,249,719 A | 5/1966 | Misare et al. |
| 3,522,570 A | 8/1970 | Wanaselja |
| 3,813,577 A | 5/1974 | Kawiecke |
| 4,015,228 A | 3/1977 | Eda et al. |
| 4,085,397 A | 4/1978 | Yagher, Jr. |
| 4,092,694 A | 5/1978 | Stetson |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |
| 4,355,345 A | 10/1982 | Franchet |
| 4,425,017 A | 1/1984 | Chan |
| 4,493,003 A | 1/1985 | Mickelson et al. |
| 4,595,635 A | 6/1986 | Dubrow et al. |
| 4,600,261 A | 7/1986 | Debbaut |
| 4,701,574 A | 10/1987 | Shimirak et al. |
| 5,006,950 A | 4/1991 | Allina |
| 5,130,884 A | 7/1992 | Allina |
| 5,172,296 A | 12/1992 | Kaczmarek |
| 5,311,164 A | 5/1994 | Ikeda et al. |
| 5,519,564 A | 5/1996 | Carpenter, Jr. |
| 5,523,916 A | 6/1996 | Kaczmarek |
| 5,529,508 A | 6/1996 | Chiotis et al. |
| 5,588,856 A | 12/1996 | Collins et al. |
| 5,652,690 A | 7/1997 | Mansfield et al. |
| 5,721,664 A | 2/1998 | Uken et al. |
| 5,724,221 A | 3/1998 | Law |
| 5,781,394 A | 7/1998 | Lorenz et al. |
| 5,808,850 A | 9/1998 | Carpenter, Jr. |
| 5,936,824 A | 8/1999 | Carpenter, Jr. |
| 6,038,119 A | 3/2000 | Atkins et al. |
| 6,094,128 A | 7/2000 | Bennett et al. |
| 6,172,865 B1 | 1/2001 | Boy et al. |
| 6,175,480 B1 | 1/2001 | Karmazyn |
| 6,430,019 B1 | 8/2002 | Martenson et al. |
| 6,430,020 B1 | 8/2002 | Atkins et al. |
| 6,556,402 B2 | 4/2003 | Kizis et al. |
| 6,614,640 B2 | 9/2003 | Richter et al. |
| 6,930,871 B2 | 8/2005 | Macanda |
| 7,433,169 B2 | 10/2008 | Kamel et al. |
| 7,558,041 B2 | 7/2009 | Lagnoux |
| 7,684,166 B2 | 3/2010 | Donati et al. |
| 7,738,231 B2 | 6/2010 | Lagnoux |
| 9,906,017 B2 * | 2/2018 | Tsovilis .............. H01C 1/022 |
| 2002/0018331 A1 | 2/2002 | Takahashi |
| 2004/0150937 A1 | 8/2004 | Bobert et al. |
| 2008/0049370 A1 | 2/2008 | Adachi et al. |
| 2011/0248816 A1 | 10/2011 | Duval et al. |
| 2012/0086539 A1 | 4/2012 | Duval et al. |
| 2012/0086540 A1 | 4/2012 | Duval et al. |
| 2014/0092514 A1 | 4/2014 | Chen |
| 2015/0103462 A1 | 4/2015 | Depping |

FOREIGN PATENT DOCUMENTS

| | | |
|---|---|---|
| DE | 198 23 446 A1 | 11/1999 |
| DE | 19843519 A1 | 4/2000 |
| DE | 10 2008 02655 A1 | 12/2009 |
| DE | 10 2012 004 678 A1 | 9/2013 |
| DE | 10 2014 016 938 B3 | 2/2016 |
| DE | 10 2014 016 830 B4 | 9/2016 |
| EP | 0 108 518 A2 | 5/1984 |
| EP | 0 203 737 A2 | 12/1986 |
| EP | 0 335 479 A2 | 10/1989 |
| EP | 0 445 054 A1 | 9/1991 |
| EP | 0 603 428 A1 | 6/1994 |
| EP | 1 102 371 A1 | 5/2001 |
| EP | 1 355 327 A2 | 10/2003 |
| EP | 1 458 072 A1 | 9/2004 |
| EP | 1 798 742 A1 | 6/2007 |
| EP | 2 725 588 A1 | 4/2014 |
| FR | 2 574 589 A1 | 6/1986 |
| FR | 2 622 047 A1 | 4/1989 |
| JP | 60-187002 A | 9/1985 |
| JP | 60-226103 A | 11/1985 |
| JP | 60-258905 A | 12/1985 |
| JP | 61-198701 A | 9/1986 |
| JP | 1-176687 A | 7/1989 |
| JP | 09-326546 | 12/1997 |
| JP | 2002-525861 A | 8/2002 |
| JP | 2002-525862 A | 8/2002 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 A | 8/2011 |
| SI | 23749 A | 11/2012 |
| WO | WO 88/00603 A2 | 1/1988 |
| WO | WO 90/05401 A1 | 5/1990 |
| WO | WO 95/15600 A1 | 6/1995 |
| WO | WO 95/24756 A1 | 9/1995 |
| WO | WO 97/42693 A1 | 11/1997 |
| WO | WO 98/38653 A1 | 9/1998 |
| WO | WO 00/17892 A1 | 3/2000 |
| WO | WO 2007/117163 A1 | 10/2007 |
| WO | WO 2011/102811 A2 | 8/2011 |
| WO | WO 2012/026888 A1 | 3/2012 |
| WO | WO 2012/154134 A1 | 11/2012 |

OTHER PUBLICATIONS

Data Book Library 1997 Passive Components, Siemens Matsushita Components (pp. 15-17, 26- 32, 36-37, 39, 161, 166, 167, 169, 171-174) (1997).
Extended European Search Report corresponding to European Application No. 15169729.9 (4 Pages) (dated Oct. 1, 2015).
Extended European Search Report corresponding to European Application No. 16174415.6 (7 Pages) (dated Jul. 5, 2016).
Formex™ GK/Formex Product Data Flame Retardant Polypropylene Sheet, ITW Formex (4 pages) (2002).
"Gas Discharge Tubes—GDT" Iskra Zaščite (3 pages) (Jul. 4, 2014).
"Gas-filled tube" *Wikipedia* retrieved from http://en.wikipedia.org/wiki/Gas-filled_tube (9 pages) (Retrieved on Jan. 20, 2015).
Oberg et al. "Machinery's Handbook 27$^{th}$ Edition—Soldering and Brazing" (4 pages) (2004).
"The Next Generation Surge Protection Rayvoss™" Raycap brochure (4 pages) (May 4, 2012).
"Rayvoss™ Transient Voltage Surge Suppression System" Raycap, retrieved from http://www.raycap.com/surge/rayvoss.htm (1 page) (Accessed on Nov. 29, 2005).

(56) References Cited

OTHER PUBLICATIONS

"Revolutionary Lightning Protection Technology" Raycap Corporation Press Release, retrieved from http://www.raycap.com/news/020930.htm (1 page) (Accessed on Nov. 29, 2005).
"Strikesorb® 30 Series OEM Surge Suppression Solutions" Raycap brochure (2 pages) (Apr. 17, 2009).
The Ultimate Overvoltage Protection: Rayvoss™ Raycap brochure (4 pages) (Date unknown but admitted prior art).
The Ultimate Overvoltage Protection Rayvoss™ Raycap brochure (4 pages) (2005).
The Ultimate Overvoltage Protection Rayvoss™ Raycap brochure (4 pages) (Jan. 2009).
"The Ultimate Overvoltage Protection" Rayvoss™, retrieved from http://www.rayvoss.com (2 pages) (Accessed on Nov. 29, 2005).
Rayvoss™ "Applications" webpage <http://www.rayvoss.com/applications.htm (4 pages) (Accessed on Nov. 29, 2005).
"Frequently Asked Questions" Rayvoss™, retrieved from http://www.rayvoss.com/faq.htm (2 pages) (Accessed on Nov. 29, 2005).
"Technical Information" Rayvoss™, retrieved from <http://www.rayvoss.com/tech_info.htm (3 pages) (Accessed on Nov. 29, 2005).
Translation of DIN-Standards, Built-In Equipment for Electrical Installations; Overall Dimensions and Related Mounting Dimensions (15 pages) (Dec. 1988).
VAL-MS-T1/T2 335/12.5/3+1, Extract from the online catalog, Phoenix Contact GmbH & Co. KG, retrieved from http://catalog.phoenixcontact.net/phoenix/treeViewClick.do?UID=2800184 (7 pages) (May 22, 2014).

\* cited by examiner

US 10,340,688 B2

MODULAR OVERVOLTAGE PROTECTION UNITS

RELATED APPLICATION(S)

The present application is a continuation application of and claims priority from U.S. patent application Ser. No. 14/715,770, filed May 19, 2015, which claims the benefit of and priority from U.S. Provisional Patent Application No. 62/007,126, filed Jun. 3, 2014, the disclosures of which are incorporated herein by reference.

FIELD OF THE INVENTION

The present invention relates to voltage surge protection devices and, more particularly, to voltage surge protection devices including varistor members.

BACKGROUND OF THE INVENTION

Frequently, excessive voltage is applied across service lines that deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse may be blown or weakened by the surge current or the failure of the varistor element.

Varistors have been constructed according to several designs for different applications. For heavy-duty applications (e.g., surge current capability in the range of from about 60 to 200 kA) such as protection of telecommunications facilities, block varistors are commonly employed. A block varistor typically includes a disk-shaped varistor element potted in an epoxy or plastic housing. The varistor disk is formed by pressure casting a metal oxide material, such as zinc oxide, or other suitable material such as silicon carbide. Copper, or other electrically conductive material, is flame sprayed onto the opposed surfaces of the disk. Ring-shaped electrodes are bonded to the coated opposed surfaces and the disk and electrode assembly is enclosed within the plastic housing. Examples of such block varistors include Product No. SIOV-B860K250, available from Siemens Matsushita Components GmbH & Co. KG and Product No. V271BA60, available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

Another type of overvoltage protection device employing a varistor wafer is the Strikesorb™ surge protection module available from Raycap Corporation of Greece, which may form a part of a Rayvoss™ transient voltage surge suppression system. (See, for example, U.S. Pat. Nos. 6,038,119, 6,430,020 and 7,433,169).

Varistor-based overvoltage protection devices (e.g., of the epoxy-shielded type) are commonly designed with an open circuit failure mode using an internal thermal disconnector or overcurrent disconnector to disconnect the device in case of failure. Other varistor-based overvoltage protection devices have a short circuit as a failure mode. For example, some epoxy-shielded devices use a thermal disconnector to switch to a short circuit path. However, many of these devices have very limited short circuit current withstand capabilities.

Overvoltage protection devices, circuit breakers, fuses, ground connections and the like are often mounted on DIN (Deutsches Institut für Normung e.V.) rails. DIN rails may serve as mounting brackets of standardized dimensions so that such electrical control devices may be sized and configured to be readily and securely mounted to a support surface such as an electrical service utility box.

SUMMARY

According to embodiments of the invention, a modular overvoltage protection unit for electrically connecting a first power line and/or a second power line to a protected earth (PE) line in the case of an overvoltage event on the first or second power line includes a unit enclosure defining an enclosure cavity, and first and second surge protection devices (SPDs) each disposed in the enclosure cavity. Each of the first and second SPDs includes: a first electrode in the form of a metal housing defining a housing cavity; a second electrode disposed within the housing cavity; and a varistor member captured between and electrically connected with each of the first and second electrodes, wherein the varistor member is formed of a varistor material. The overvoltage protection unit further includes: a first line terminal to connect the first power line to the overvoltage protection unit, wherein the first line terminal is electrically connected to the second electrode of the first SPD; a second line terminal to connect the second power line to the overvoltage protection unit, wherein the second line terminal is electrically connected to the second electrode of the second SPD; and a PE terminal to connect the PE line to the overvoltage protection unit, wherein the PE terminal is electrically connected to the metal housing of the second SPD. The metal housing of the first SPD is electrically connected to the PE terminal through the metal housing of the second SPD.

According to some embodiments, the overvoltage protection unit includes a third SPD disposed in the enclosure cavity. The third SPD includes: a first electrode in the form of a metal housing defining a housing cavity; a second electrode disposed within the housing cavity; and a varistor member captured between and electrically connected with each of the first and second electrodes, wherein the varistor member is formed of a varistor material. The overvoltage protection unit includes a third line terminal to connect a third power line to the overvoltage protection unit. The third line terminal is electrically connected to the second electrode of the third SPD. The metal housing of the third SPD is electrically connected to the PE terminal through the metal housing of the second SPD.

According to some embodiments, the overvoltage protection unit further includes a surge protection module electrically connected between the metal housing of the second SPD and the PE terminal. In some embodiments, the surge protection module includes a gas discharge tube.

In some embodiments, at least one of the first, second and third SPDs includes an elastomeric insulator member electrically insulating the first electrode from the second electrode and biasing the first and second electrodes to apply a compressive load on the varistor member thereof. In some embodiments, the elastomeric insulator member is formed of silicone rubber. According to some embodiments, at least one of the first, second and third SPDs includes a gas discharge tube (GDT) captured and electrically connected between the varistor member and one of the first and second electrodes.

In some embodiments, at least one of the first, second, and third SPDs includes a gas discharge tube (GDT) captured and electrically connected between the varistor member and one of the first and second electrodes.

According to some embodiments, the overvoltage protection unit further includes a neutral terminal to connect a neutral line to the overvoltage protection unit, the neutral terminal is electrically connected to the metal housing of the second SPD, and the surge protection module is not electrically connected between the metal housing of the second SPD and the neutral terminal.

In some embodiments, the metal housings of the first, second and third SPDs are individual, discrete metal housings that are arranged in overlapping relation and bolted to one another by a plurality of bolts.

According to some embodiments, each of the first, second and third SPDs includes a cover covering the housing cavity thereof, and the covers are secured to the metal housings by the at least one bolt.

The overvoltage protection unit may include a metal unitary SPD housing member, wherein the metal housings of the first, second and third SPDs are each integral portions of the unitary SPD housing member and the housing cavities are defined therein.

The overvoltage protection unit may further include fourth, fifth and sixth SPDs each disposed in the internal cavity. Each of the fourth, fifth and sixth SPDs includes: a first electrode in the form of a metal housing defining a housing cavity; a second electrode disposed within the housing cavity; and a varistor member captured between and electrically connected with each of the first and second electrodes, wherein the varistor member is formed of a varistor material. The first line terminal is also electrically connected to the second electrode of the fourth SPD. The second line terminal is also electrically connected to the second electrode of the fifth SPD. The third line terminal is also electrically connected to the second electrode of the sixth SPD. In some embodiments, the first line terminal is electrically connected to the second electrodes of the first and fourth SPDs by a first metal bridge bracket, the second line terminal is electrically connected to the second electrodes of the second and fifth SPDs by a second metal bridge bracket, and the third line terminal is electrically connected to the second electrodes of the third and sixth SPDs by a third metal bridge bracket.

According to some embodiments, the housing cavities are cylindrical in shape, and the outer profiles of the metal housings are substantially square in shape.

According to some embodiments, the unit enclosure includes a DIN rail slot defined therein, the unit enclosure is configured to mount the overvoltage protection unit on a DIN rail, and the overvoltage protection unit is DIN standard compliant.

The overvoltage protection unit may further include a surge protection module electrically connected between the metal housing of the second SPD and the PE terminal. In some embodiments, the surge protection module includes a gas discharge tube. In some embodiments, the overvoltage protection unit further includes a neutral terminal to connect a neutral line to the overvoltage protection unit, the neutral terminal is electrically connected to the metal housing of the second SPD, and the surge protection module is not electrically connected between the metal housing of the second SPD and the neutral terminal.

According to some embodiments, the metal housings of the first and second SPDs are individual, discrete metal housings that are arranged in overlapping relation and bolted to one another by at least one bolt.

According to some embodiments, each of the first and second SPDs includes a cover covering the housing cavity thereof, and the covers are secured to the metal housings by the at least one bolt.

The overvoltage protection unit may include a metal unitary SPD housing member, wherein the metal housings of the first and second SPDs are each integral portions of the unitary SPD housing member and the housing cavities are defined therein.

The overvoltage protection unit may further include third and fourth SPDs each disposed in the internal cavity. Each of the first and second SPDs includes: a first electrode in the form of a metal housing defining a housing cavity; a second electrode disposed within the housing cavity; and a varistor member captured between and electrically connected with each of the first and second electrodes, wherein the varistor member is formed of a varistor material. The first line terminal is also electrically connected to the second electrode of the third SPD. The second line terminal is also electrically connected to the second electrode of the fourth SPD. In some embodiments, the first line terminal is electrically connected to the second electrodes of the first and third SPDs by a first metal bridge bracket, and the second line terminal is electrically connected to the second electrodes of the second and fourth SPDs by a second metal bridge bracket.

According to some embodiments, the housing cavities are cylindrical in shape, and the outer profiles of the metal housings are substantially square in shape.

In some embodiments, each of the first and second SPDs includes an elastomeric insulator member electrically insulating the first electrode from the second electrode and biasing the first and second electrodes to apply a compressive load on the varistor member thereof. The elastomeric insulator members may be formed of silicone rubber.

According to some embodiments, the unit enclosure includes a DIN rail slot defined therein, the unit enclosure is configured to mount the overvoltage protection unit on a DIN rail, and the overvoltage protection unit is DIN standard compliant.

According to some embodiments, at least one of the first and second SPDs includes a gas discharge tube (GDT) captured and electrically connected between the varistor member and one of the first and second electrodes.

According to embodiments of the invention, a modular overvoltage protection unit includes a unit enclosure defining an enclosure cavity and having a DIN rail slot, and first and second surge protection devices (SPDs) each disposed in the enclosure cavity. Each of the first and second SPDs includes: a first electrode in the form of a metal housing defining a housing cavity; a second electrode disposed within the housing cavity; and a varistor member formed of a varistor material, wherein the varistor member is captured between and electrically connected with each of the first and second electrodes. The unit enclosure is configured to mount the overvoltage protection unit on a DIN rail and is DIN standard compliant.

According to embodiments of the invention, a modular surge protection device assembly includes: a unitary, metal housing member including six housing cavities defined therein, wherein three of the housing cavities open to a first side of the housing member and the other three housing cavities open to an opposing side of the housing member; six electrode members each disposed in a respective one of the six housing cavities; and six varistor members each disposed in a respective one of the six housing cavities and captured between and electrically connected with each of the housing member and the electrode in said respective housing cavity, wherein the varistor members are formed of a varistor material. In some embodiments, the housing member is monolithic.

According to embodiments of the invention, a modular surge protection device includes a first electrode, a second electrode, a varistor member and a gas discharge tube (GDT). The varistor member is captured between and electrically connected with each of the first and second electrodes. The varistor member is formed of a varistor material. The GDT is captured and electrically connected between the varistor member and one of the first and second electrodes.

In some embodiments, the module surge protection device includes a second GDT captured and electrically connected between the first GDT and the one of the first and second electrodes. In some embodiments, the module surge protection device includes an elastomeric insulator member electrically insulating the first electrode from the second electrode and biasing the first and second electrodes to apply a compressive load on the varistor member and the GDT.

The modular surge protection device may further include an electrically conductive, meltable member, wherein the meltable member is responsive to heat in the modular surge protection device to melt and form a short circuit current flow path through the meltable member, between the first and second electrodes and bypassing the varistor member and the GDT. In some embodiments, the modular surge protection device further includes an integral fail-safe mechanism operative to electrically short circuit the first and second electrode members about the varistor member by fusing first and second metal surfaces in the overvoltage protection device to one another using an electric arc. In some embodiments, the modular surge protection device includes an elastomeric insulator member electrically insulating the first electrode from the second electrode and biasing the first and second electrodes to apply a compressive load on the varistor member and the GDT.

The modular surge protection device may further include an integral fail-safe mechanism operative to electrically short circuit the first and second electrode members about the varistor member by fusing first and second metal surfaces in the overvoltage protection device to one another using an electric arc. In some embodiments, the first and second metal surfaces are separated by a gap, the overvoltage protection device further includes an electrically insulating spacer member electrically isolating the first and second metal surfaces from one another, and the electric arc disintegrates the spacer member and extends across the gap to fuse the first and second metal surfaces. According to some embodiments, the modular surge protection device includes an elastomeric insulator member electrically insulating the first electrode from the second electrode and biasing the first and second electrodes to apply a compressive load on the varistor member and the GDT.

The modular surge protection device may include an elastomeric insulator member electrically insulating the first electrode from the second electrode and biasing the first and second electrodes to apply a compressive load on the varistor member and the GDT. In some embodiments, the elastomeric insulator members are formed of silicone rubber.

The modular surge protection device may further include: an electrically conductive, meltable member, wherein the meltable member is responsive to heat in the modular surge protection device to melt and form a short circuit current flow path through the meltable member, between the first and second electrodes and bypassing the varistor member and the GDT; an integral fail-safe mechanism operative to electrically short circuit the first and second electrode members about the varistor member by fusing first and second metal surfaces in the overvoltage protection device to one another using an electric arc, wherein: the first and second metal surfaces are separated by a gap; the overvoltage protection device further includes an electrically insulating spacer member electrically isolating the first and second metal surfaces from one another; and the electric arc disintegrates the spacer member and extends across the gap to fuse the first and second metal surfaces; and an elastomeric insulator member electrically insulating the first electrode from the second electrode and biasing the first and second electrodes to apply a compressive load on the varistor member and the GDT. The modular surge protection device may further include a second GDT captured and electrically connected between the first GDT and the one of the first and second electrodes.

According to embodiments of the invention, a modular surge protection device includes: a first electrode in the form of a metal housing defining a housing cavity; a second electrode disposed within the housing cavity; a varistor member captured between and electrically connected with each of the first and second electrodes, wherein the varistor member is formed of a varistor material; and an elastomeric insulator member electrically insulating the first electrode from the second electrode and biasing the first and second electrodes to apply a compressive load on the varistor member.

In some embodiments, the elastomeric insulator members are formed of silicone rubber. The modular surge protection device may further include an electrically conductive, meltable member, wherein the meltable member is responsive to heat in the modular surge protection device to melt and form a short circuit current flow path through the meltable member, between the first and second electrodes and bypassing the varistor member. The modular surge protection device may further include an integral fail-safe mechanism operative to electrically short circuit the first and second electrode members about the varistor member by fusing first and second metal surfaces in the overvoltage protection device to one another using an electric arc.

The modular surge protection device may further include an integral fail-safe mechanism operative to electrically short circuit the first and second electrode members about the varistor member by fusing first and second metal surfaces in the overvoltage protection device to one another using an electric arc. In some embodiments, the first and second metal surfaces are separated by a gap, the overvoltage protection device further includes an electrically insulating spacer member electrically isolating the first and second metal surfaces from one another, and the electric arc disintegrates the spacer member and extends across the gap to fuse the first and second metal surfaces.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
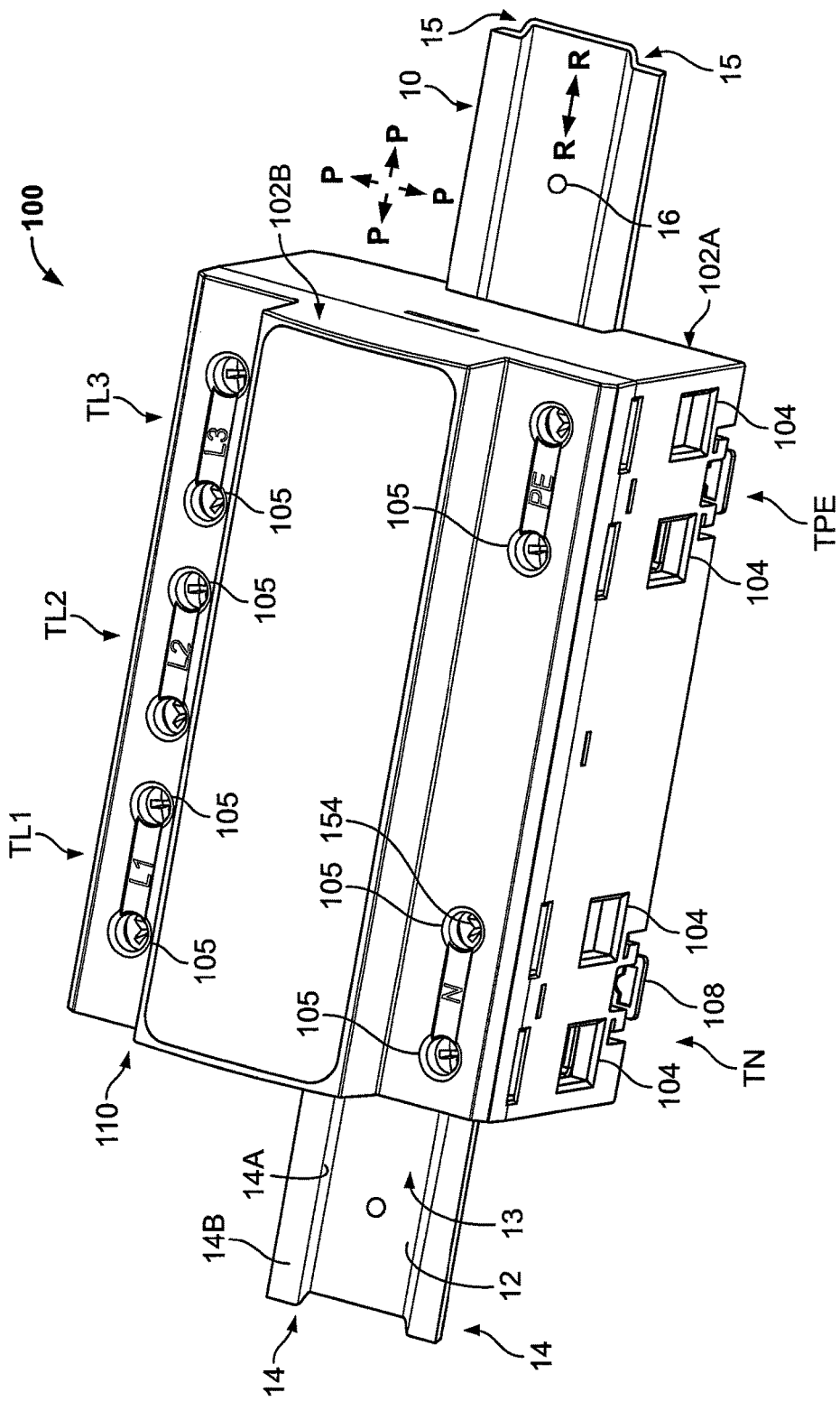
FIG. 1 is a top, rear perspective view of an overvoltage protection unit according to embodiments of the present invention mounted on a DIN rail.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

As used herein, the term "wafer" means a substrate having a thickness which is relatively small compared to its diameter, length or width dimensions.

With reference to FIGS. 1-12, a modular overvoltage protection unit according to embodiments of the present invention is shown therein and designated 100. According to some embodiments and as shown, the unit 100 is configured, sized and shaped for mounting on a support rail 10 (e.g., DIN rail 10 shown in FIG. 1) and is compliant with corresponding applicable DIN requirements or standards.

The overvoltage protection unit 100 includes a modular housing assembly or unit enclosure 110, an SPD subassembly 119, three power transmission line terminals TL1, TL2, TL3, a neutral line terminal TN, a ground or protected earth (PE) terminal TPE, and PE surge protection module 170 (e.g., a gas discharge tube (GDT)). The SPD subassembly 119 includes three overvoltage or surge protection device (SPD) modules 111, 112, and 113. These and additional components of the unit 100 are described hereinbelow in more detail.

According to some embodiments and as shown, the rail 10 is a DIN rail. That is, the rail 10 is a rail sized and configured to meet DIN specifications for rails for mounting modular electrical equipment.

The DIN rail 10 has a rear wall 12 and integral, lengthwise flanges 14 extending outwardly from the rear wall 12. Each flange 14 includes a forwardly extending wall 14A and an outwardly extending wall 14B. The walls 12, 14 together form a lengthwise extending front, central channel 13 and opposed, lengthwise extending, rear, edge channels 15. Mounting holes 16 may be provided extending fully through the wall 12 and to receive fasteners (e.g., threaded fasteners or rivets) for securing the rail 10 to a support structure (e.g., a wall or panel). The DIN rail 10 defines a DIN rail plane P-P and has a lengthwise axis R-R extending in the plane P-P. DIN rails of this type may be referred to as "top hat" support rails.

According to some embodiments, the rail 10 is a 35 mm (width) DIN rail. According to some embodiments, the rail 10 is formed of metal and/or a composite or plastic material.

Figure 2:
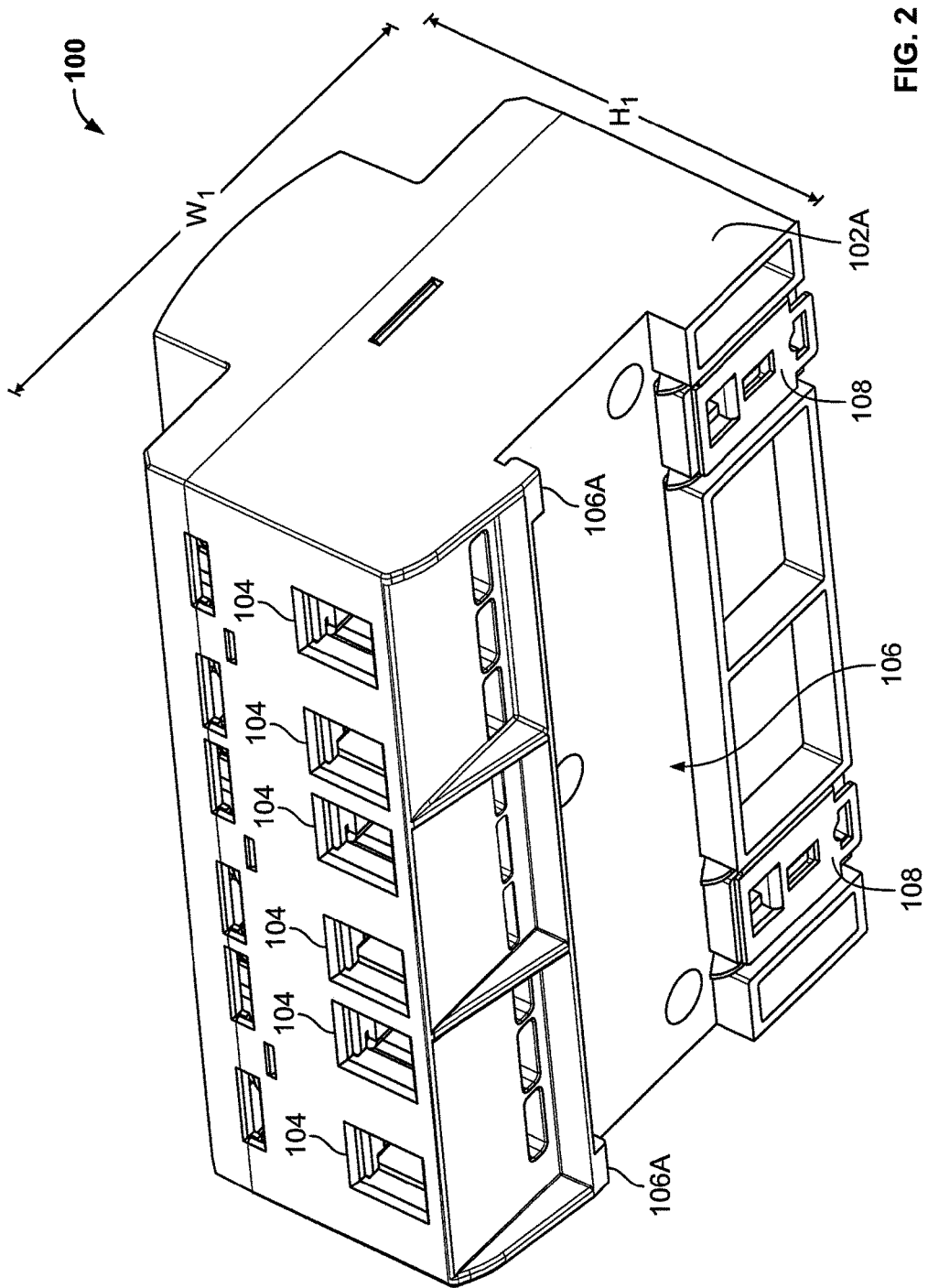
FIG. 2 is a bottom perspective view of the overvoltage protection unit of FIG. 1.
Figure 3:
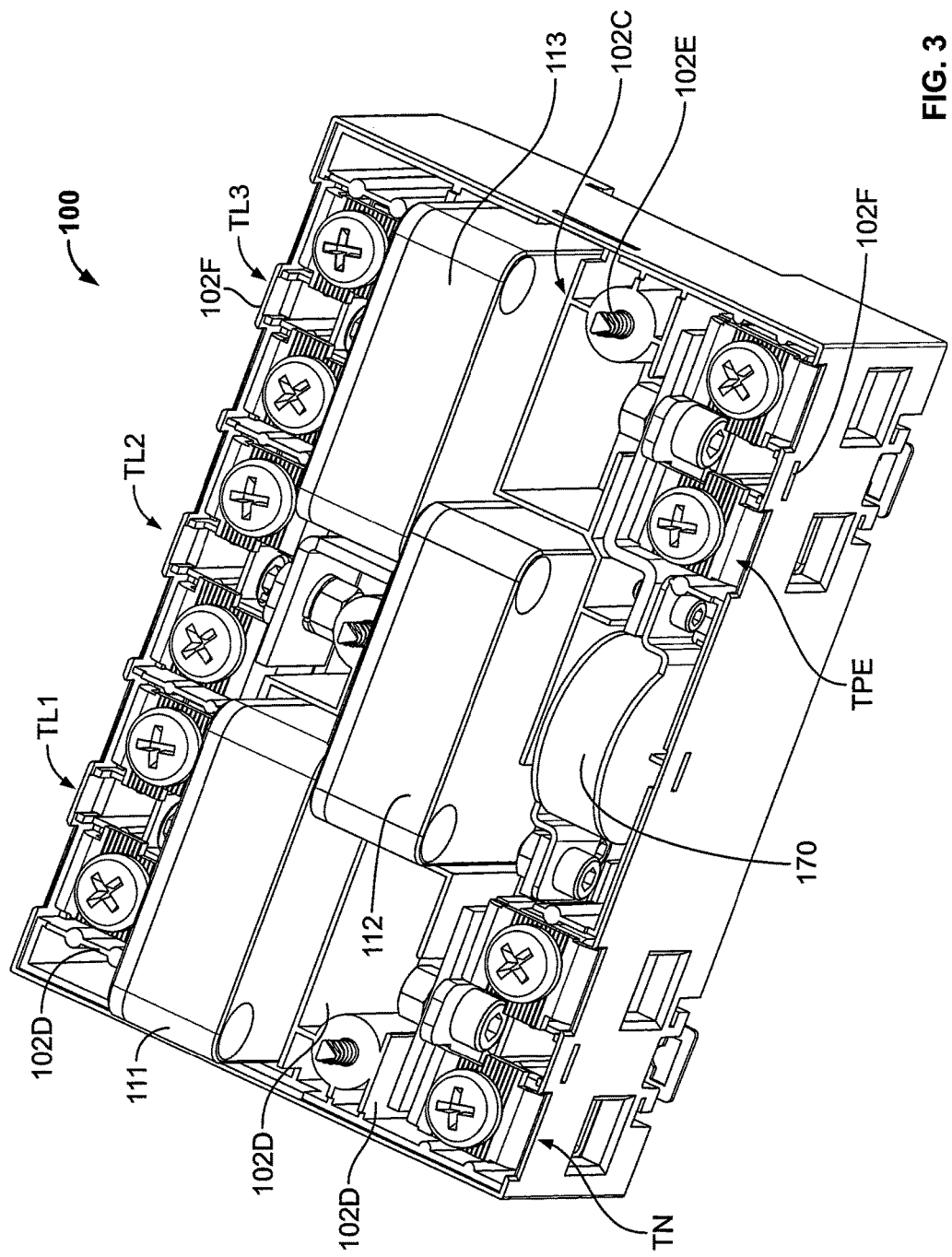
FIG. 3 is a top, rear perspective view of the overvoltage protection unit of FIG. 1 with a cover thereof removed.

The unit enclosure 110 includes a base part 102A and a cover part 102B. The parts 102A, 102B may be secured together as shown in FIGS. 1 and 2 using fasteners 102E, integral interlock or latch features 102F, and/or adhesive. When combined, the parts 102A, 102B define an enclosed internal cavity or chamber 102C within which the electrical components are contained. Integral locator walls 102D are positioned in the cavity 102C to positively locate and stabilize the electrical components. Cable ports 104 are defined in opposed sides of the housing part 102A. Terminal adjustment openings 105 are in opposed sides of the housing part 102B. According to some embodiments, the housing parts 102A, 102B are formed of an electrically insulating polymeric material.

A DIN rail receiver channel 106 is defined in the rear panel of the base part 102A. Integral rail hook features 106A are located on one side of the channel 106 and spring loaded DIN rail latch mechanisms 108 are mounted on the other side of the channel 106. The features and components 106, 106A and 108 are sized and configured to securely and releasably mount the unit 100 on a standard DIN rail 10 as is well-known in the art.

According to some embodiments, the outer dimensions of the unit enclosure 110 define the outer dimensions of the unit 100. In some embodiments, the maximum dimensions of the unit 100 are compliant with at least one of the following DIN Standards: DIN 43 880 (December 1988). In some embodiments, the maximum dimensions of the unit 100 are compliant with each of these standards. According to some embodiments, the depth or height H1 (FIG. 2) of the unit 100 is less than or equal to 100 mm and the width W1 (FIG. 2) of the unit 100 is less than or equal to 100 mm (where the height H1 is the dimension extending orthogonal to and away from the plane P-P of the DIN rail 10, and the width W1 is the dimension extending perpendicular to the lengthwise axis R-R of the DIN rail 10 and parallel to the plane P-P. when the unit 100 is mounted on the rail 10 as shown and described herein).

According to some embodiments and as shown, the PE surge protection module 170 is a gas discharge tube (GDT) and will be referred to hereinafter as the GDT 170. The GDT 170 includes a body 170A and opposed electrical terminals 170B and 170C. In some embodiments, the PE surge protection module 170 is a spark gap device.

The SPDs 111, 112, 113 may be constructed substantially identically or may differ from one another. In the illustrated embodiment, the three SPDs 111, 112, 113 are substantially the same and therefore only the SPD 113 will be described in detail, it being appreciated that this description likewise applies to the other SPDs.

The SPD 113 includes a first electrode or housing 120, a piston-shaped second electrode 130, a varistor member (herein, "the varistor wafer") 138 between the housing 120 and the electrode 130, a cover 126, an electrically insulating, elastomeric insulator member 140, a meltable member 136, short bolts 146, and long bolts 148.

The housing 120 has an end electrode wall 122 and a cylindrical sidewall 123 extending from the electrode wall 122. The sidewall 123 and the electrode wall 122 form a cylindrical chamber or cavity 125 communicating with an opening 127. The housing 120 is generally square in lateral cross-section with rounded corners. Four threaded bores 124 extend axially through housing 120 each at a corresponding corner of the housing. The electrode wall 122 has an inwardly facing, substantially planar contact surface 122A. According to some embodiments, the housing 120 is formed of aluminum. However, any suitable electrically conductive metal may be used. According to some embodiments, the housing 120 is unitary and, in some embodiments, monolithic.

The electrode 130 has a head 132 disposed in the cavity 125 and an integral shaft 134 that projects outwardly through the opening 127. The varistor wafer 138 is disposed in the cavity 125 between and in contact with each of the electrode wall 122 and the head 132.

The head 132 has a substantially planar lower contact surface 132A that faces the contact surface 122A. A pair of integral, annular, axially spaced apart flanges 133A and 133B extend radially outwardly from the shaft 134 and define an annular, sidewardly opening groove 133C therebetween. A threaded bore 134A is formed in the end of the shaft 134 to receive a terminal coupling bolt 156 for securing the terminal TL3 to the electrode 130.

According to some embodiments, the electrode 130 is formed of aluminum and, in some embodiments, the housing sidewall 123 and the electrode 130 are both formed of aluminum. However, any suitable electrically conductive metal may be used. According to some embodiments, the electrode 130 is unitary and, in some embodiments, monolithic.

The annular meltable member 136 is mounted on the electrode 130 in the groove 133C. The meltable member 136 is spaced apart from the sidewall 123 a distance sufficient to electrically isolate the meltable member 136 from the sidewall 123.

The meltable member 136 is formed of a heat-meltable, electrically conductive material. According to some embodiments, the meltable member 136 is formed of metal. According to some embodiments, the meltable member 136 is formed of an electrically conductive metal alloy. According to some embodiments, the meltable member 136 is formed of a metal alloy from the group consisting of aluminum alloy, zinc alloy, and/or tin alloy. However, any suitable electrically conductive metal may be used.

According to some embodiments, the meltable member 136 is selected such that its melting point is greater than a prescribed maximum standard operating temperature. The maximum standard operating temperature may be the greatest temperature expected in the meltable member 136 during normal operation (including handling overvoltage surges within the designed for range of the SPD) but not during operation which, if left unchecked, would result in thermal runaway. According to some embodiments, the meltable member 136 is formed of a material having a melting point in the range of from about 80 to 160° C. and, according to some embodiments, in the range of from about 80 to 120° C. According to some embodiments, the melting point of the meltable member 136 is at least 20° C. less than the melting points of the housing 120 and the electrode 130 and, according to some embodiments, at least 40° C. less than the melting points of those components.

According to some embodiments, the meltable member 136 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The varistor wafer 138 has first and second opposed, substantially planar contact surfaces. The varistor wafer 138 is interposed between the contact surfaces 132A and 122A. As described in more detail below, the head 132 and the wall 122 are mechanically loaded against the varistor wafer 138 to ensure firm and uniform engagement between the surfaces 132A and 122A and the respective opposed surfaces of the varistor wafer 138.

According to some embodiments, the varistor wafer 138 is disk-shaped. However, the varistor wafer 138 may be formed in other shapes. The thickness and the diameter of the varistor wafer 138 will depend on the varistor characteristics desired for the particular application. The varistor wafer 138 may include a wafer of varistor material coated on either side with a conductive coating so that the exposed surfaces of the coatings serve as the contact surfaces. The coatings can be formed of aluminum, copper or silver, for example.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The cover 126 is substantially plate-shaped and has a central opening 126A defined therein. The cover 126 is generally square with rounded corners. Four bores 126B extend axially through a respective corner of the cover 126. According to some embodiments, the cover 126 is formed of an electrically conductive material. In some embodiments, the cover 126 is formed of a metal and, in some embodiments, is formed of aluminum.

The insulator member 140 includes an annular body 140A defining a central opening 140B. An annular upper flange 140C projects upwardly from the body 140A immediately about the opening 140B. An annular lower flange 140D projects downwardly from the body 140A about its outer edge.

The insulator member 140 is formed of an electrically insulating, resilient, elastomeric material. According to some embodiments, the insulator member 140 is formed of a material having a hardness in the range of from about 60 Shore A to 85 Shore A. According to some embodiments, the insulator member 140 is formed of rubber. According to some embodiments, the insulator member 140 is formed of silicone rubber. Suitable materials for the insulator member 140 may include KE-5612G or KE-5606 silicone rubber available from Shin-Etsu Chemical Co. Ltd. According to some embodiments, the body 140A has an installed (axially compressed) thickness 114 (FIG. 11) in the range of from about 1 mm to 8 mm.

When the SPD 113 is assembled, the insulator member 140 is captured between the cover 126 and the electrode upper flange 133A and axially compressed (i.e., axially loaded and elastically deformed from its relaxed state) so that the insulator member 140 serves as a biasing member and applies a persistent axial pressure or load to the electrode 130 and the cover 126. The insulator member 140 also serves to electrically insulate the housing 120 from the electrode 130. The compressed insulator member 140 can also form a seal to constrain or prevent overvoltage event byproducts, such as hot gases and fragments from the wafer 138 from escaping the SPD 113 through the housing opening 127.

The SPD 113 may be assembly as follows. The varistor wafer 138 is placed in the cavity 125 such that the facing wafer surface engages the contact surface 122A. The meltable member 136 is mounted on the shaft 134 using any suitable technique (e.g., casting). The electrode 130 is inserted into the cavity 125 such that the contact surface 132A engages the facing varistor wafer surface. The insulator member 140 is slid down the shaft portion 134 and placed over the flange 133A. The cover 126 is placed over the opening 127 such that the electrode upper flange 133A is received in the cover opening 126A. The bolts 146, 148 are inserted through and into the threaded bores 126B and 124 and tightened to clamp the cover 126 against the housing 120. The insulator member 140 is thereby elastically axially compressed or deformed. The compressed insulator member 140 exerts an axial load against the cover 126 and the head 132. In this way, the varistor wafer 138 is sandwiched (clamped) between the head 132 and the electrode wall 122. The electrode head 132 and the electrode wall 122 are persistently biased or loaded against the varistor wafer 138 by the insulator member 140 to ensure firm and uniform engagement between the wafer surfaces and the surfaces.

Figure 10:
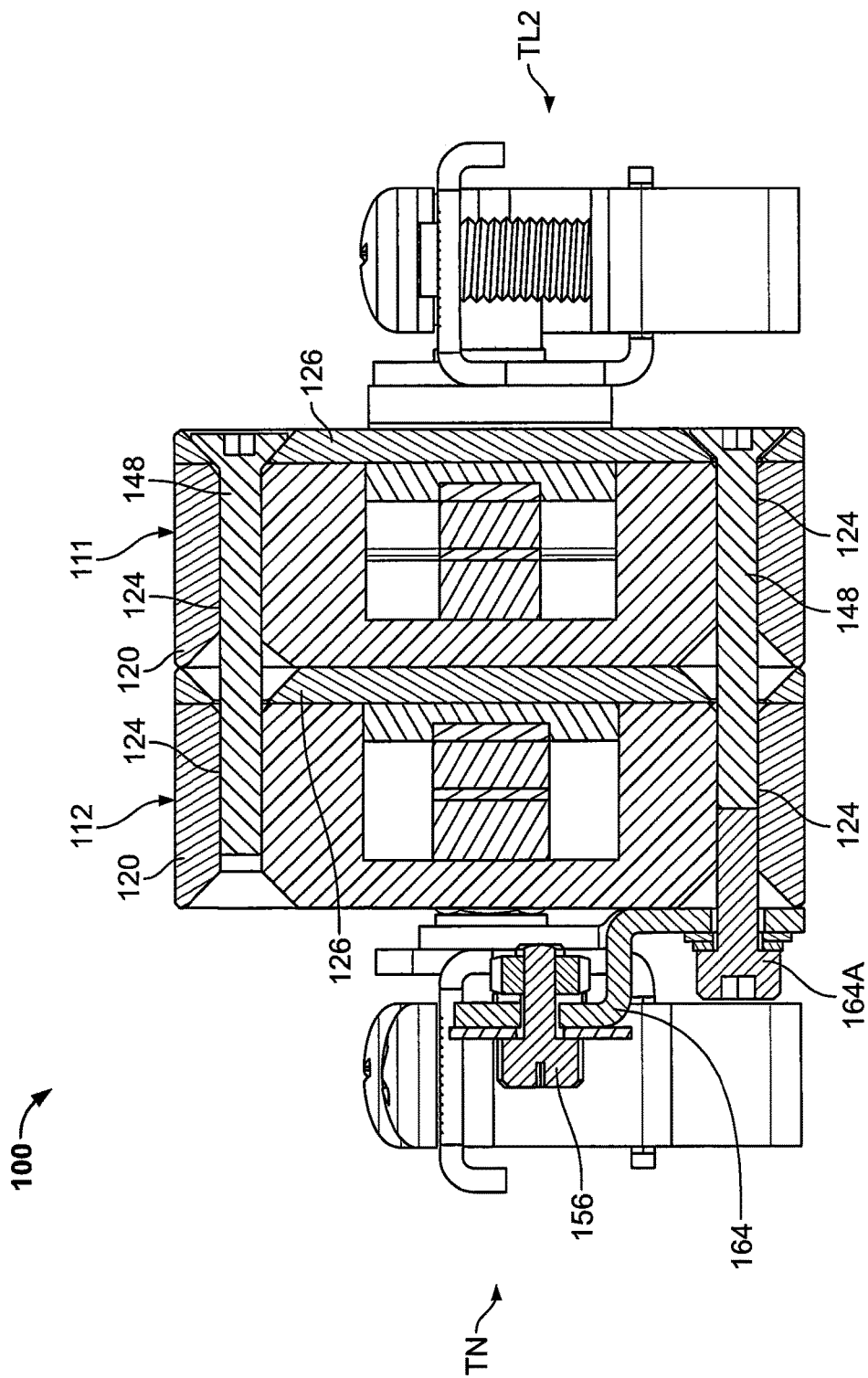
FIG. 10 is a fragmentary, cross-sectional view of the overvoltage protection unit of FIG. 1 taken along the line 10-10 of FIG. 6.

The SPDs 111 and 112 are likewise assembled. However, each of the SPDs 111, 112, 113 shares a long bolt 148 with an adjacent SPD 111, 112, 113, and the SPD 112 uses only shared long bolts 148. For example, as shown in FIG. 10, two long bolts 148 extend through the cover bolt holes 126B of the SPD 111, the housing bolt holes 124 of the SPD 111, the cover bolt holes 126B of the SPD 112, and the housing bolt holes 124 of the SPD 112. Thus, in assembling the SPDs 111, 112, 113, the SPD subassembly 119 is also assembled.

Moreover, each SPD 111, 112, 113 in the SPD subassembly 119 laterally overlaps (i.e., overlap along or parallel to the rail longitudinal axis R-R) and engages the adjacent SPD(s) 111, 112, 113. That is, the housings of the SPDs 111 and 113 each engage the cover 126 of the SPD 112. In this manner, electrically contact and continuity is provided between and through the housing 120 of the SPD 112.

Figure 4:
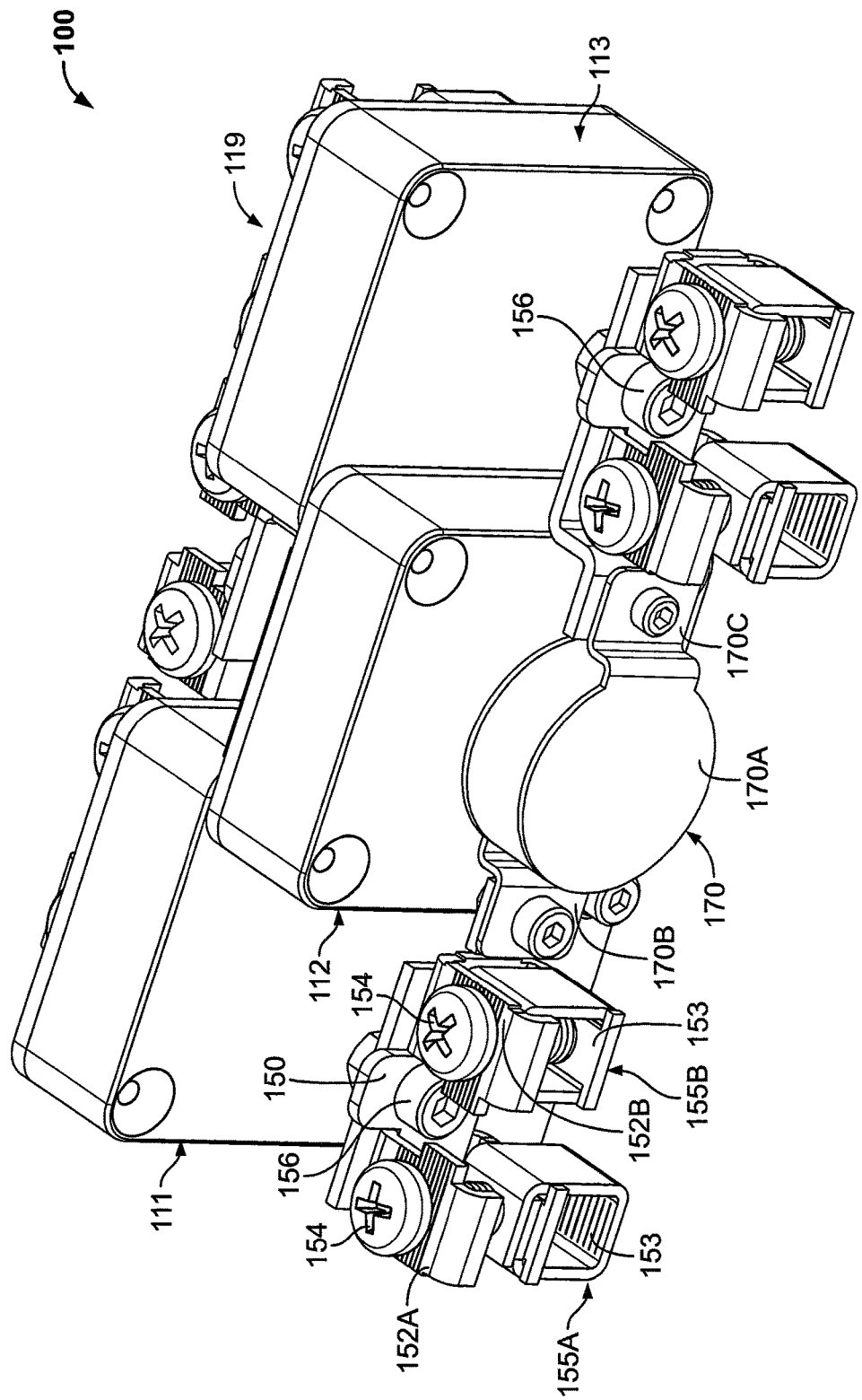
FIG. 4 is a top, rear perspective view of the overvoltage protection unit of FIG. 1 with an enclosure thereof removed.
Figure 5:
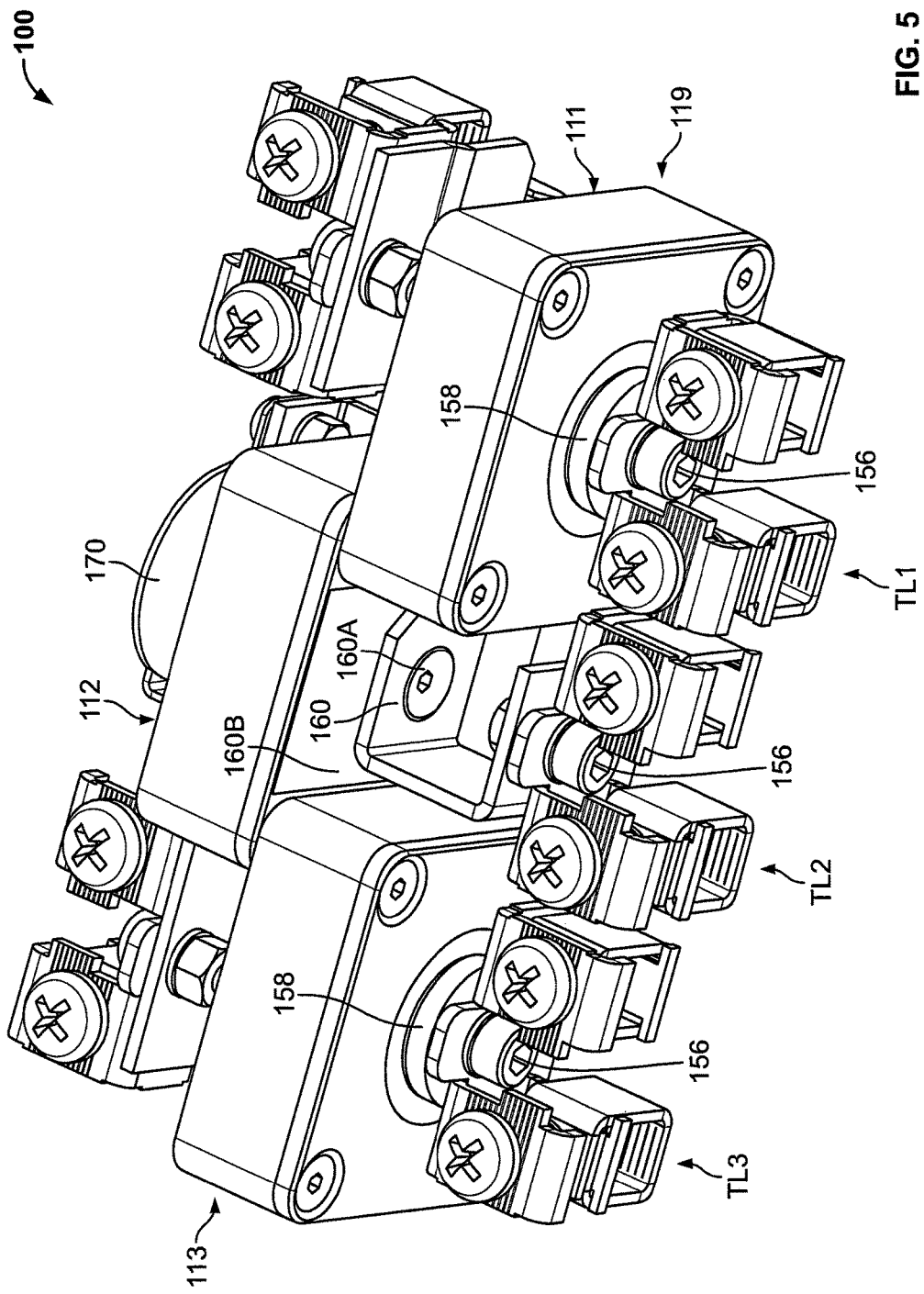
FIG. 5 is a top, front perspective view of the overvoltage protection unit of FIG. 1 with the enclosure thereof removed.
Figure 6:
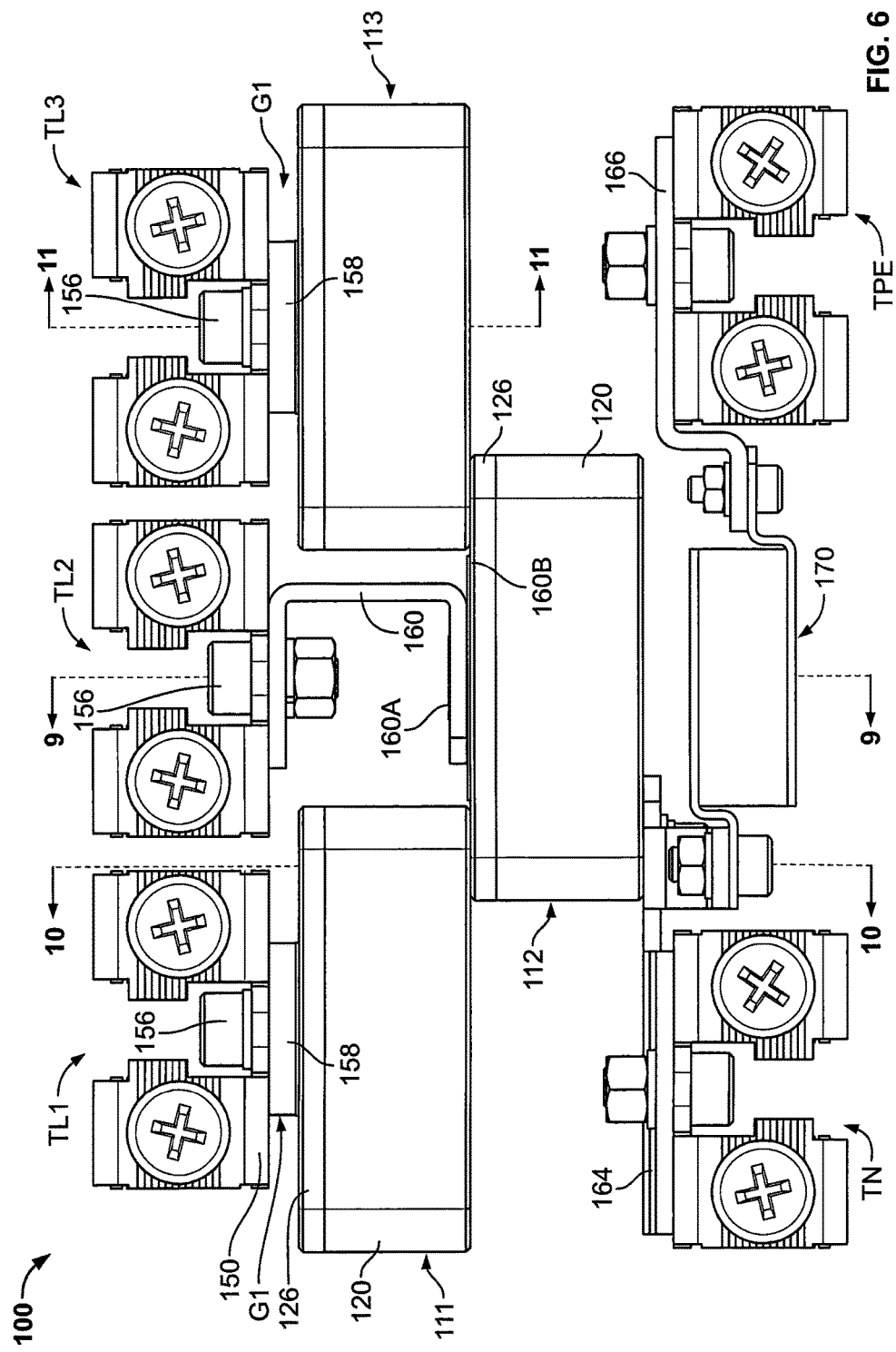
FIG. 6 is a top plan view of the overvoltage protection unit of FIG. 1 with the enclosure thereof removed.
Figure 7:
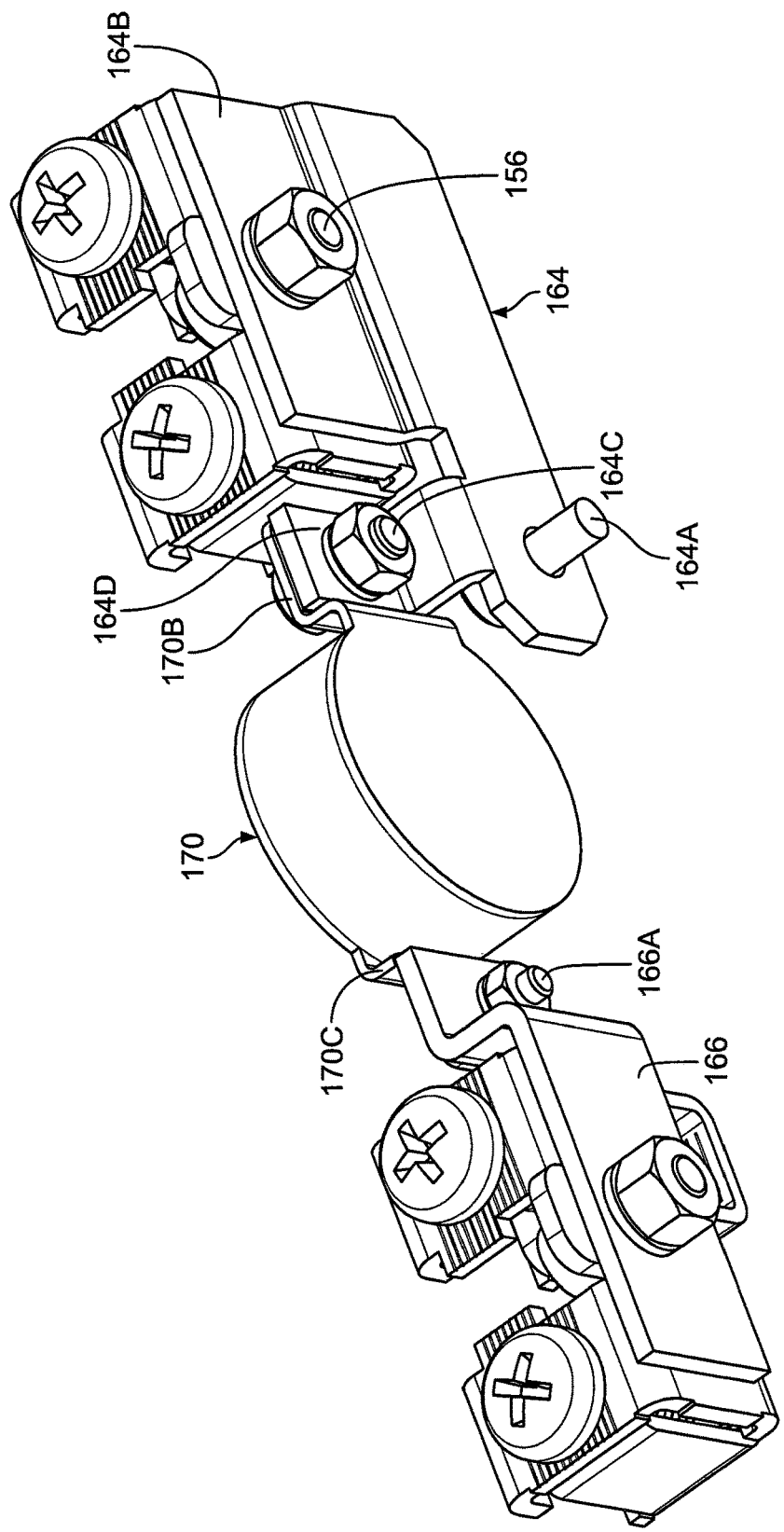
FIG. 7 is a fragmentary, top, front perspective view of the overvoltage protection unit of FIG. 1 with the enclosure thereof removed.
Figure 8:
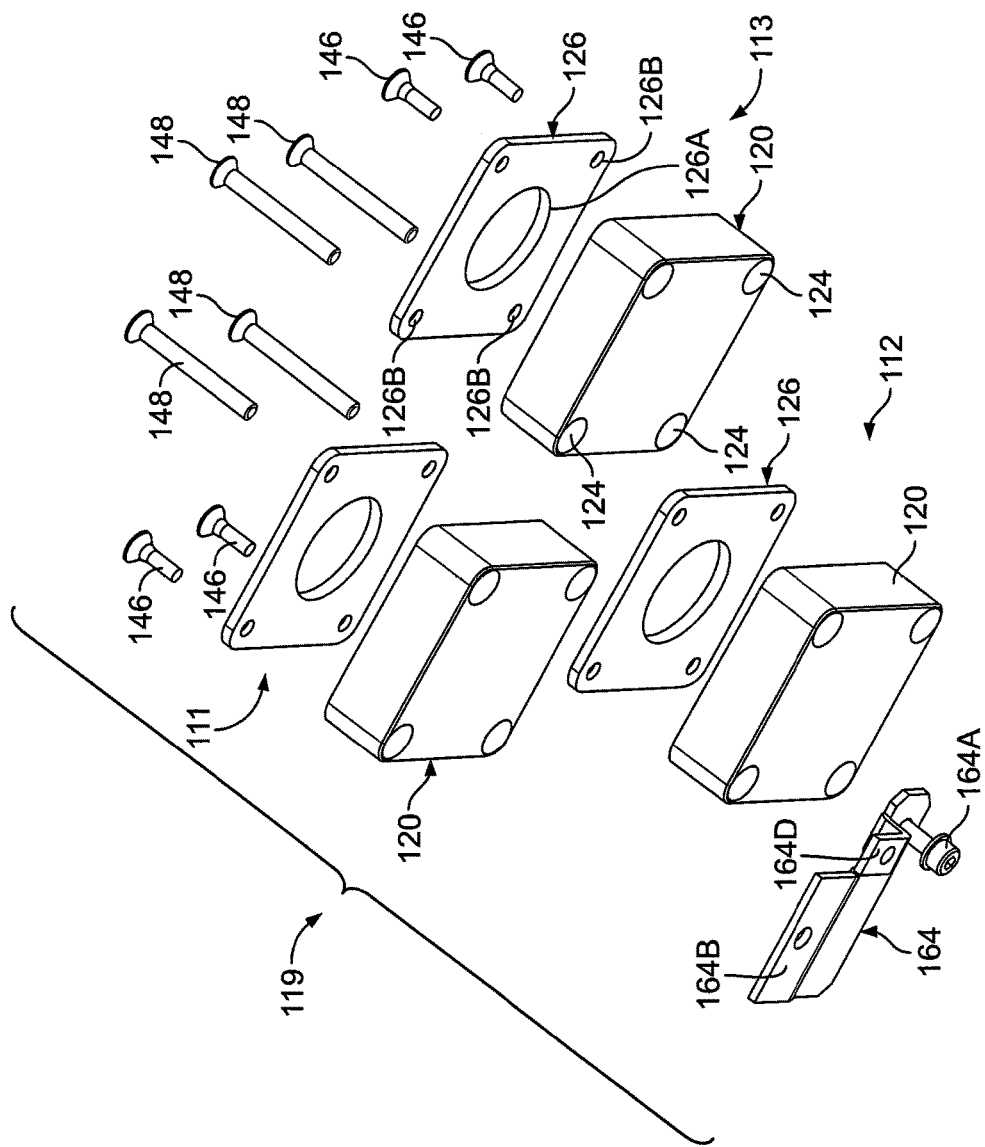
FIG. 8 is an exploded, fragmentary, top, rear perspective view of the overvoltage protection unit of FIG. 1.
Figure 9:
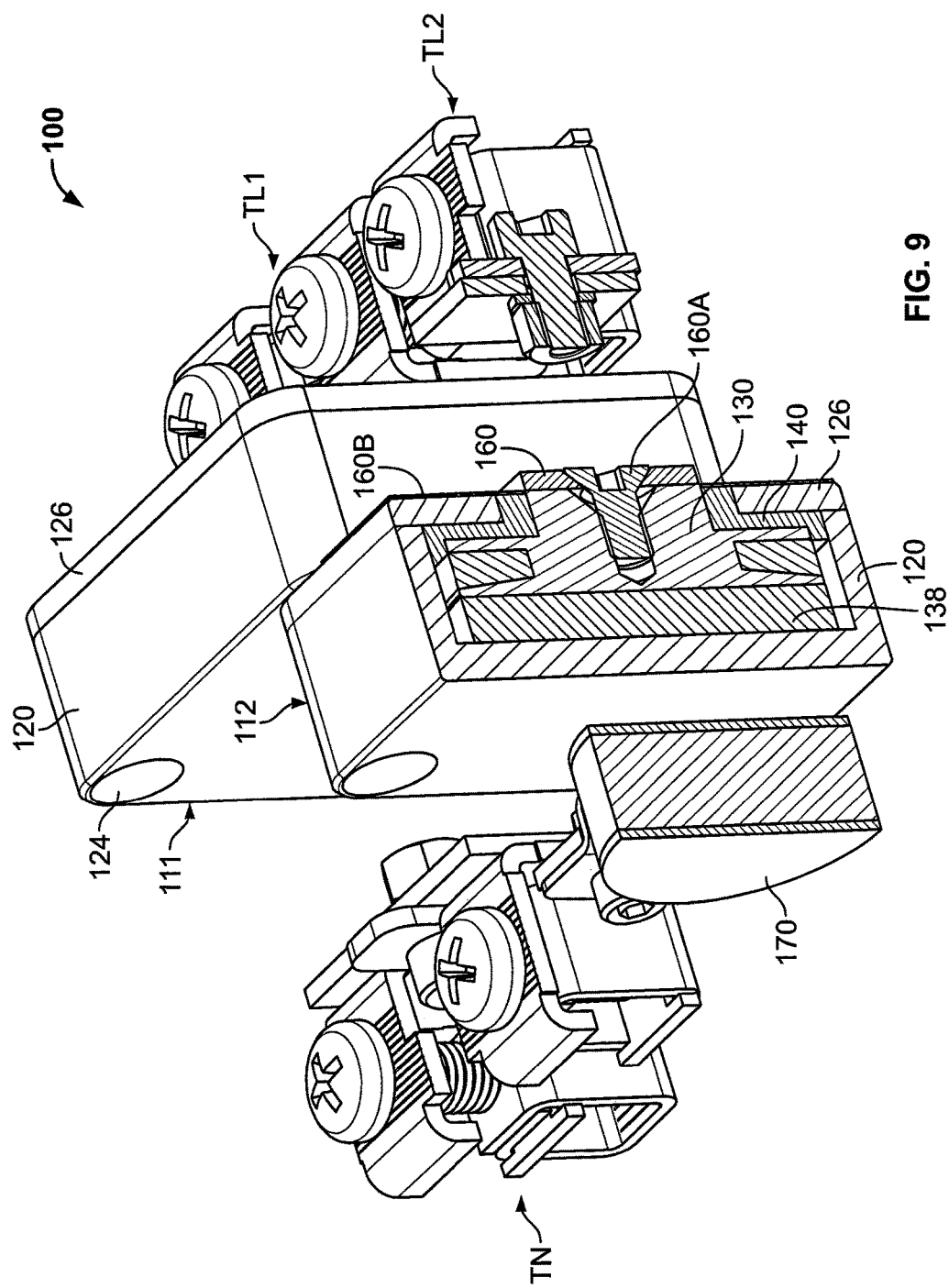
FIG. 9 is a fragmentary, cross-sectional view of the overvoltage protection unit of FIG. 1 taken along the line 9-9 of FIG. 6.

With reference to FIG. 4, each of the terminals TL1, TL2, TL3, TN, TPE includes a metal, electrically conductive base bracket 150 having spaced apart connector portions 152A and 152B. Each connector portion 152A and 152B is provided with a metal, electrically conductive, annular clamp member 153 and associated clamping bolts 154 to form respective releasable connectors 155A and 155B. The connectors 155A, 155B are each aligned with a corresponding cable port 104 of the housing base 102A to receive a terminal end of a cable therethrough. The heads of the clamping bolts 154 are each aligned with and accessible through a corresponding actuation opening 105 in the housing cover 102B. The connectors 155A, 155B of each terminal TL1, TL2, TL3, TN, TPE are each aligned with and accessible through a corresponding cable port 104. As will be appreciated by those of skill in the art, the cable end can be inserted in each connector 155A, 155B and secured therein by tightening the corresponding clamping bolt 154 and forcibly compressing the cable end between the clamp member 153 and the connector portion 152A, 152B. The cable end can be released from the connector 155A, 155B by loosening the clamping bolt 154.

The outer line terminal TL1 is mechanically and electrically connected to the SPD 111 by a terminal coupling bolt 156 that extends through its terminal base bracket 150 and is screwed into the threaded bore 134A of the electrode 130 of the SPD 111. A metal spacer 158 (e.g., formed of aluminum) is provided between the bracket 150 and the electrode 130 to ensure sufficient creepage distance is provided between the bracket 150 and the housing 120 of the SPD 111. The outer line terminal TL3 is likewise mechanically and electrically connected to the SPD 113 by a terminal coupling bolt 156 that extends through its terminal base bracket 150 and is screwed into the threaded bore 134A of the electrode 130 of the SPD 113 with a metal spacer 158 interposed therebetween.

The middle line terminal TL2 is mechanically and electrically connected to the SPD 112 by a terminal coupling bolt 156, a metal, electrically conductive coupling bracket 160, and a bracket coupling bolt 160A. The terminal coupling bolt 156 extends through the terminal base bracket 150 and into proximate end of the coupling bracket 160. The bracket coupling bolt 160A extends through the distal end of the bracket 160 and is screwed into the threaded bore 134A of the electrode 130 of the SPD 112.

An electrically insulating or dielectric layer 160B is interposed between the coupling bracket 160 and the SPD 112 to ensure sufficient creepage distance is maintained between the coupling bracket 160 and the housing 120. The bolt 160A and the end of the electrode 130 extend through a hole in the insulating layer 160B. The insulating layer 160B may be formed of any suitable material. According to some embodiments, the insulating layer 160B is formed of a polymeric material. According to some embodiments, the insulating layer 160B is a polypropylene layer. Suitable polypropylene material may include GK-10 flame retardant propylene sheet material available from FORMEX of Addison Ill. According to some embodiments, the insulating layer 160B has a thickness in the range of from about 0.15 mm to 0.35 mm.

The neutral terminal TN is mechanically and electrically connected to the SPD 112 by a terminal coupling bolt 156, a metal, electrically conductive neutral coupling bracket 164, and a bracket coupling bolt 164A. The terminal coupling bolt 156 extends through the terminal base bracket 150 and into a terminal mounting portion 164A of the coupling bracket 164. The bracket coupling bolt 164A extends through the other end of the bracket 164 and is screwed into the lower end of the threaded bore 124 of the housing 120 of the SPD 112. The coupling bracket 164 makes direct and electrically conductive contact with the bottom wall of the housing 120 of the SPD 112.

The neutral coupling bracket 164 also includes a GDT mounting portion 164D. One terminal 170B of the GDT 170 is secured to the portion 164D by a coupling bolt 164C. The bracket portion 164D is bent or space away from the SPD 112 to ensure sufficient insulation distance between the GDT 170 and the housing 120.

The base bracket 150 of the terminal TPE is mechanically and electrically connected to the terminal 170C of the GDT 170 by a PE bracket 166 and a bolt 166A.

Figure 13:
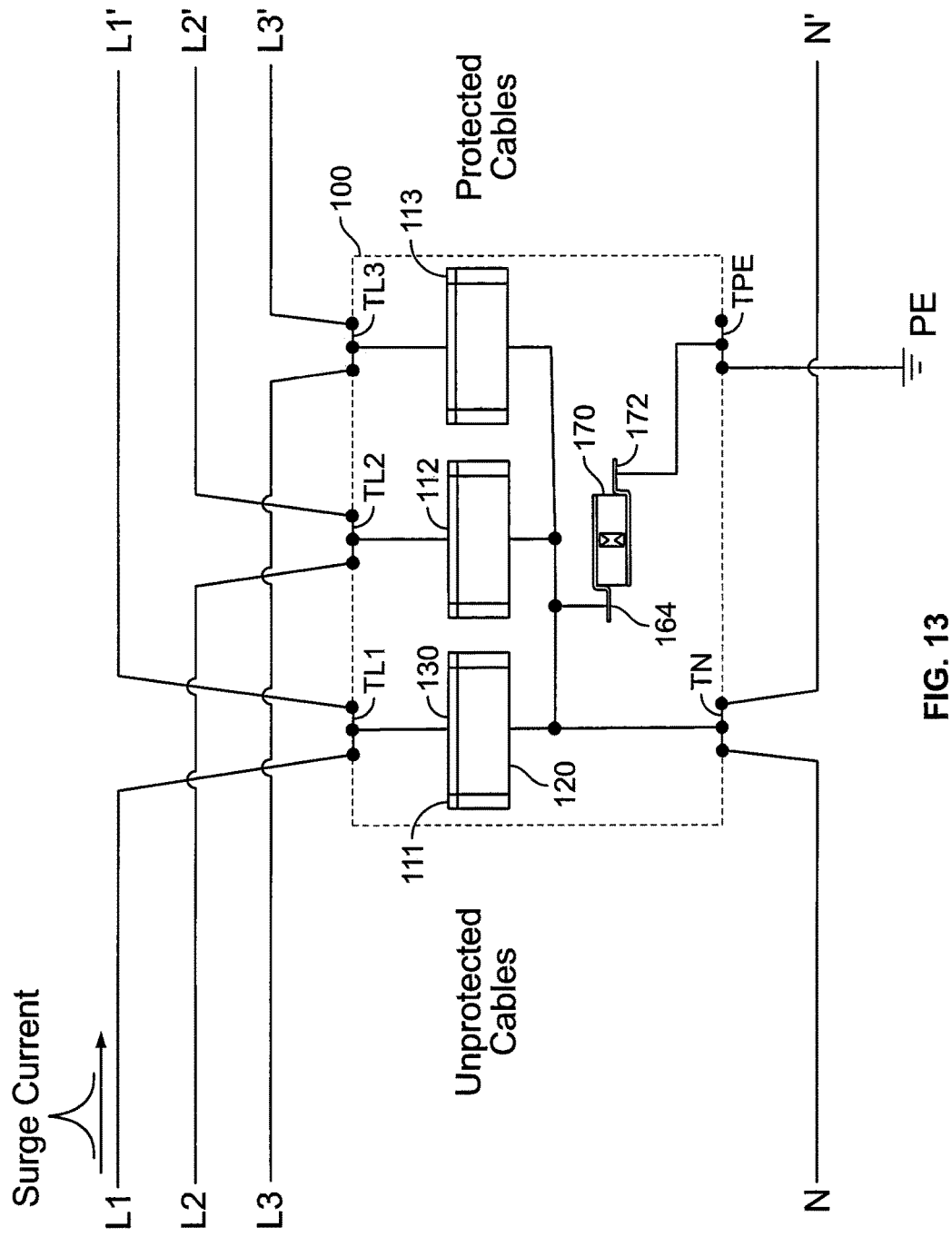
FIG. 13 is a schematic electrical circuit diagram representing an electrical circuit including the overvoltage protection unit of FIG. 1.
Figure 14:
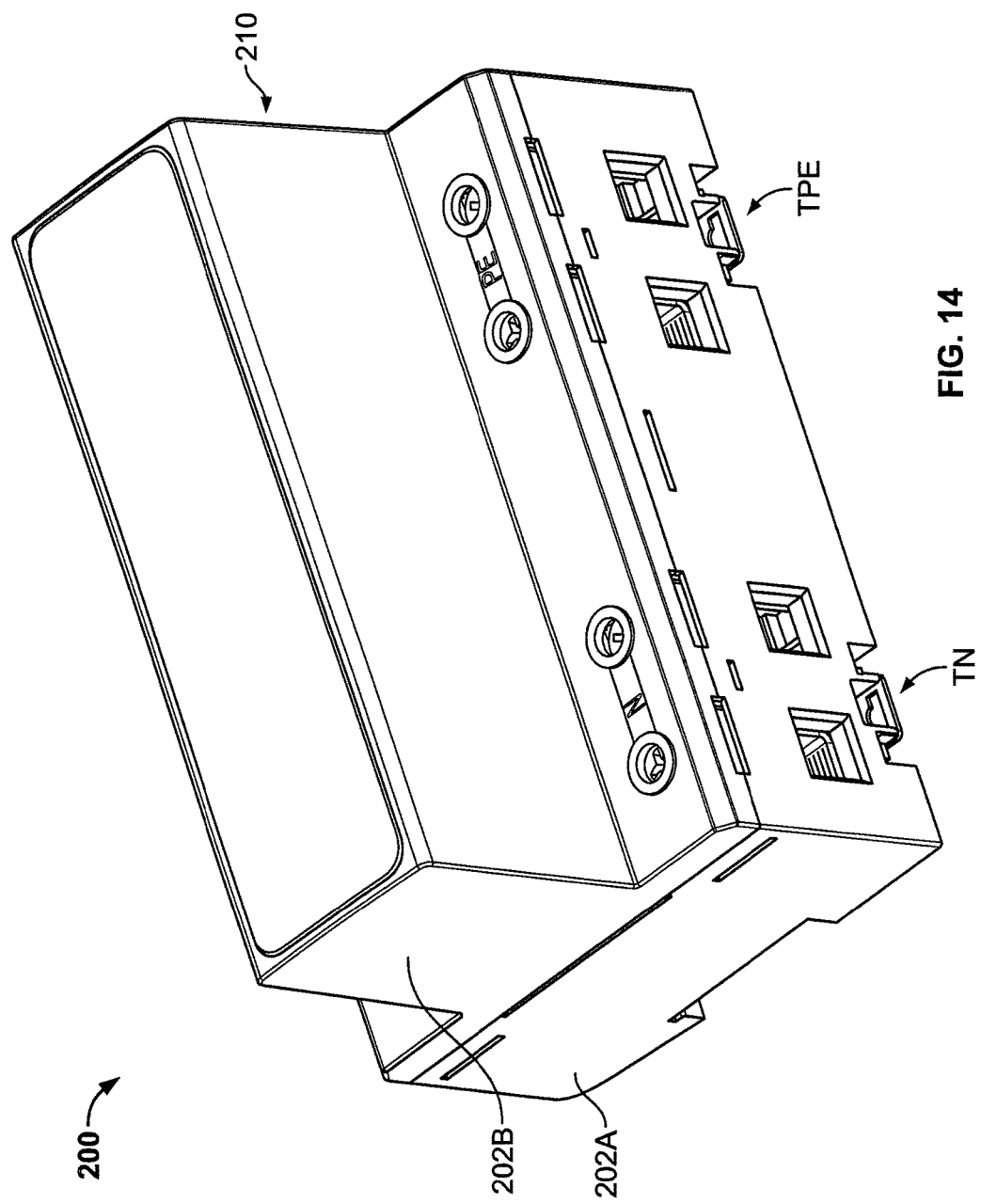
FIG. 14 is a top, rear perspective view of an overvoltage protection unit according to further embodiments of the present invention.
Figure 15:
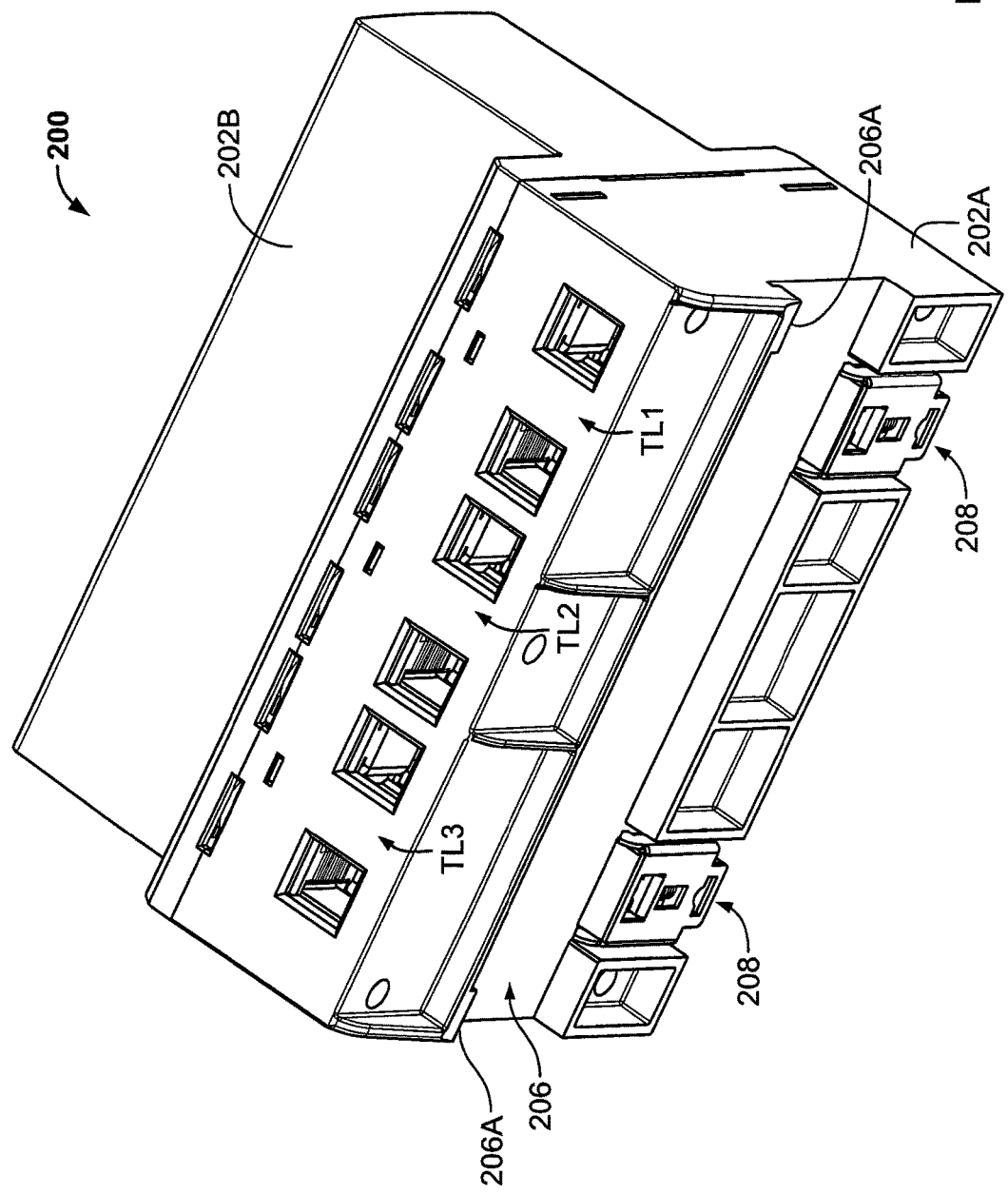
FIG. 15 is a bottom perspective view of the overvoltage protection unit of FIG. 14.
Figure 16:
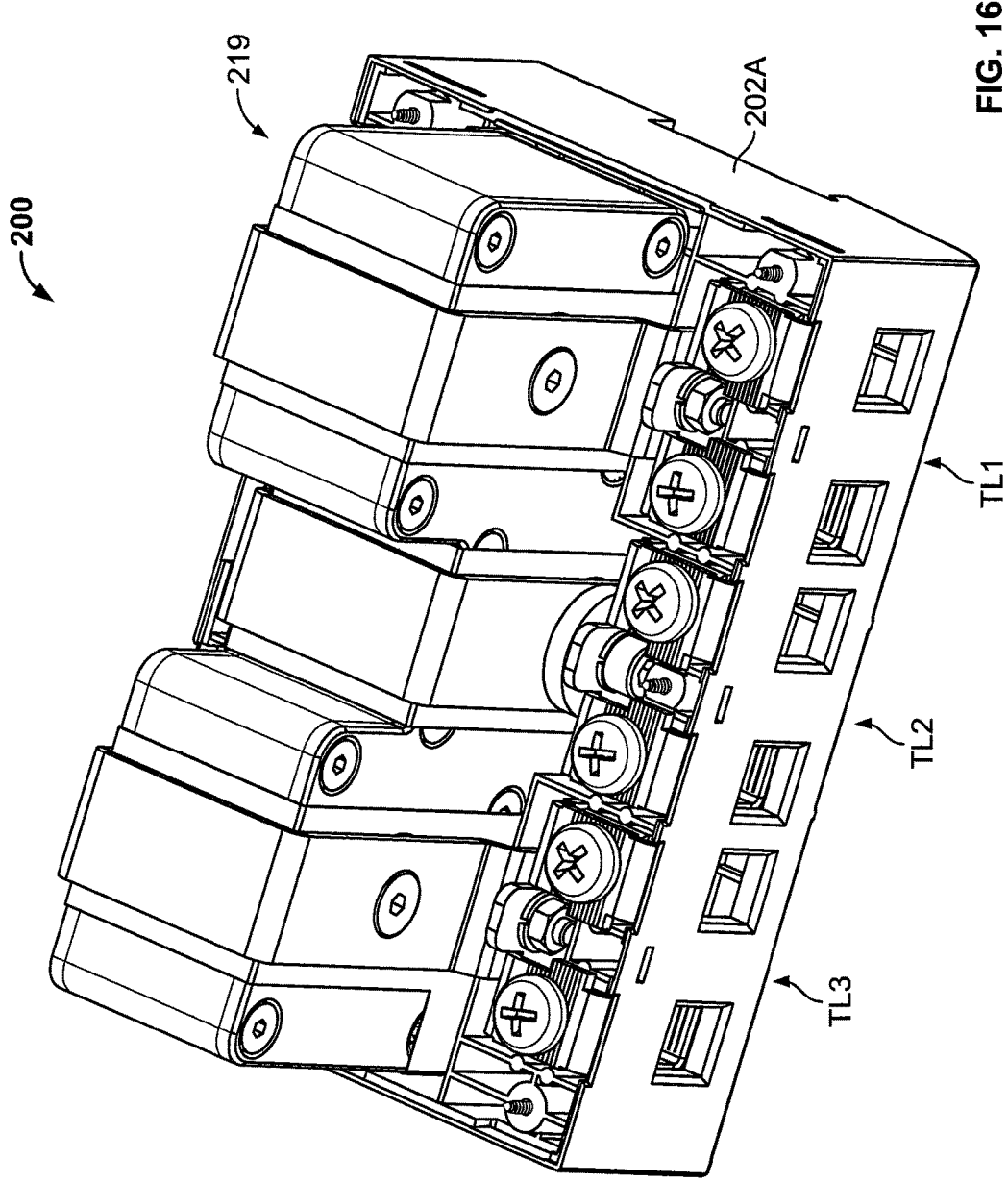
FIG. 16 is a top, rear perspective view of the overvoltage protection unit of FIG. 14 with a cover thereof removed.
Figure 17:
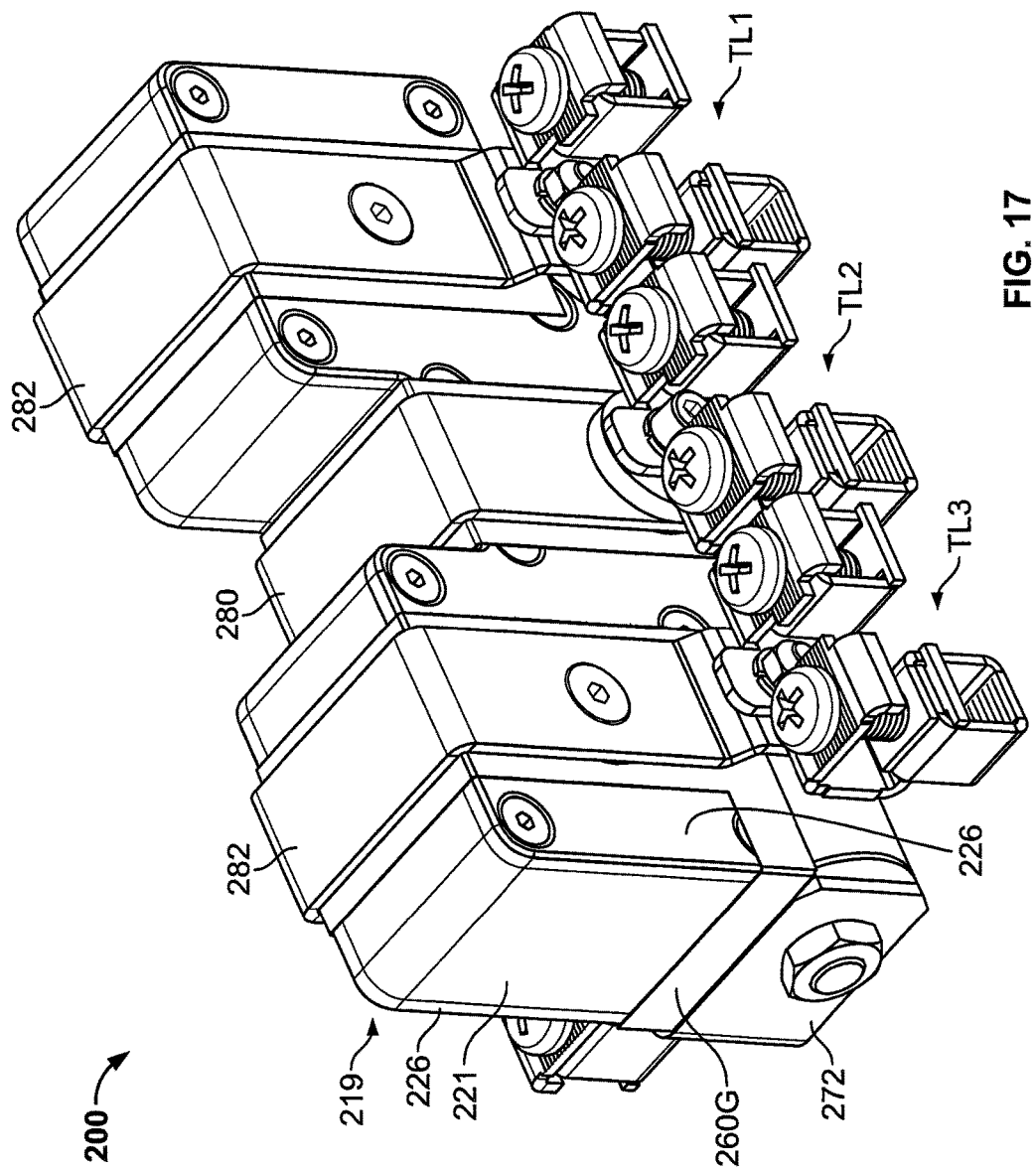
FIG. 17 is a top, rear perspective view of the overvoltage protection unit of FIG. 14 with an enclosure thereof removed.
Figure 18:
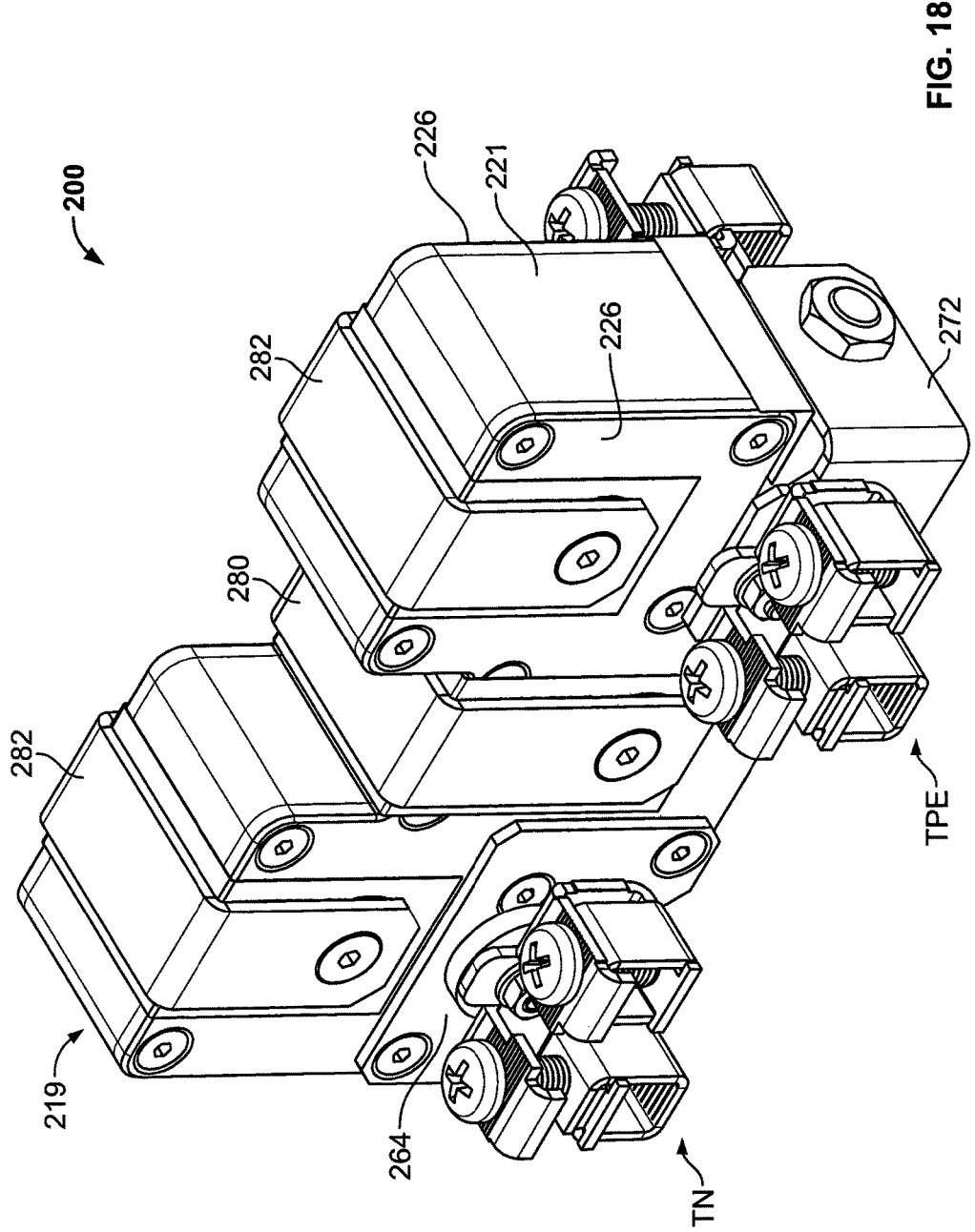
FIG. 18 is a top, front perspective view of the overvoltage protection unit of FIG. 14 with the enclosure thereof removed.
Figure 19:
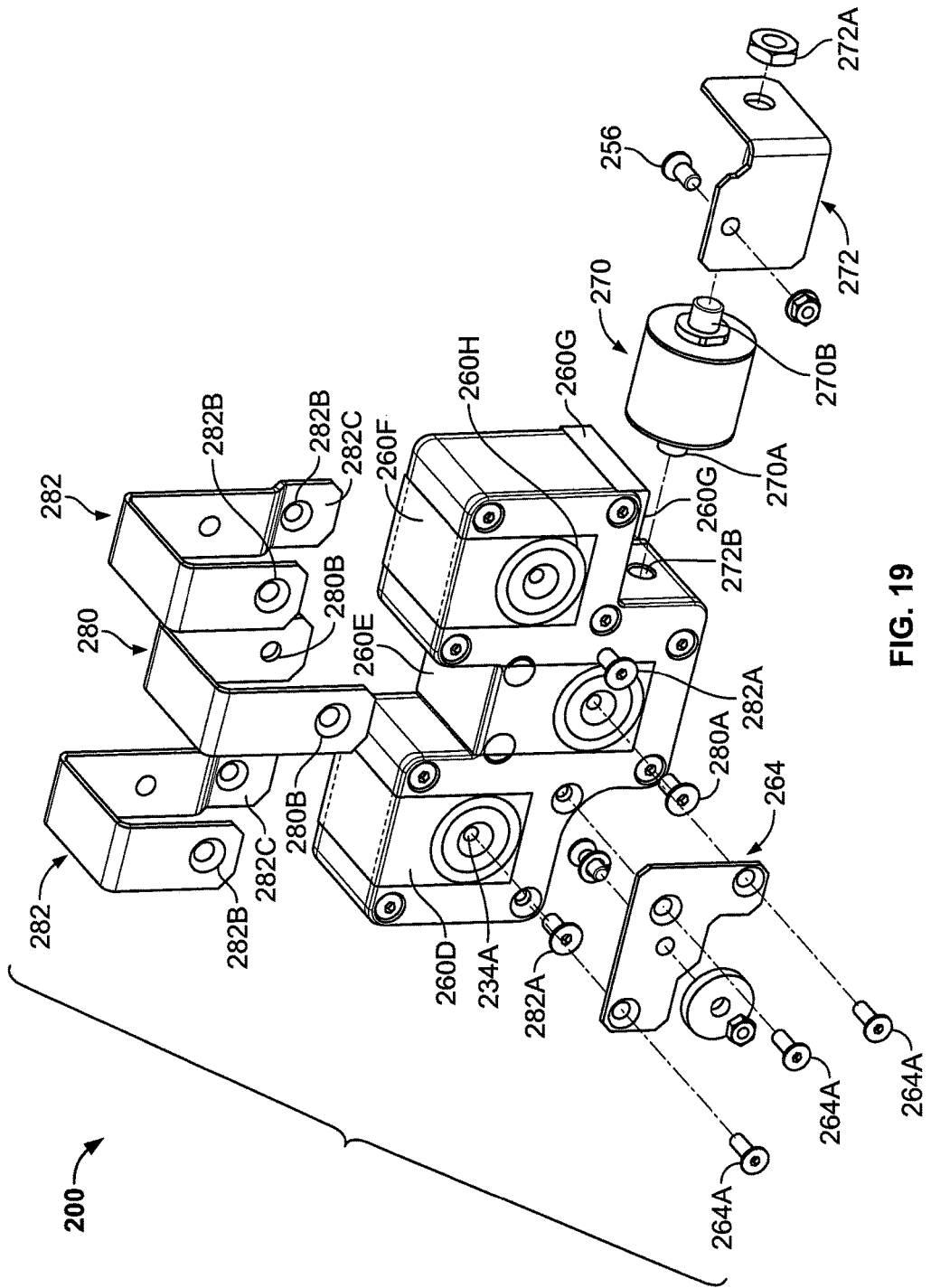
FIG. 19 is an exploded, fragmentary, perspective view of the overvoltage protection unit of FIG. 14.
Figure 20:
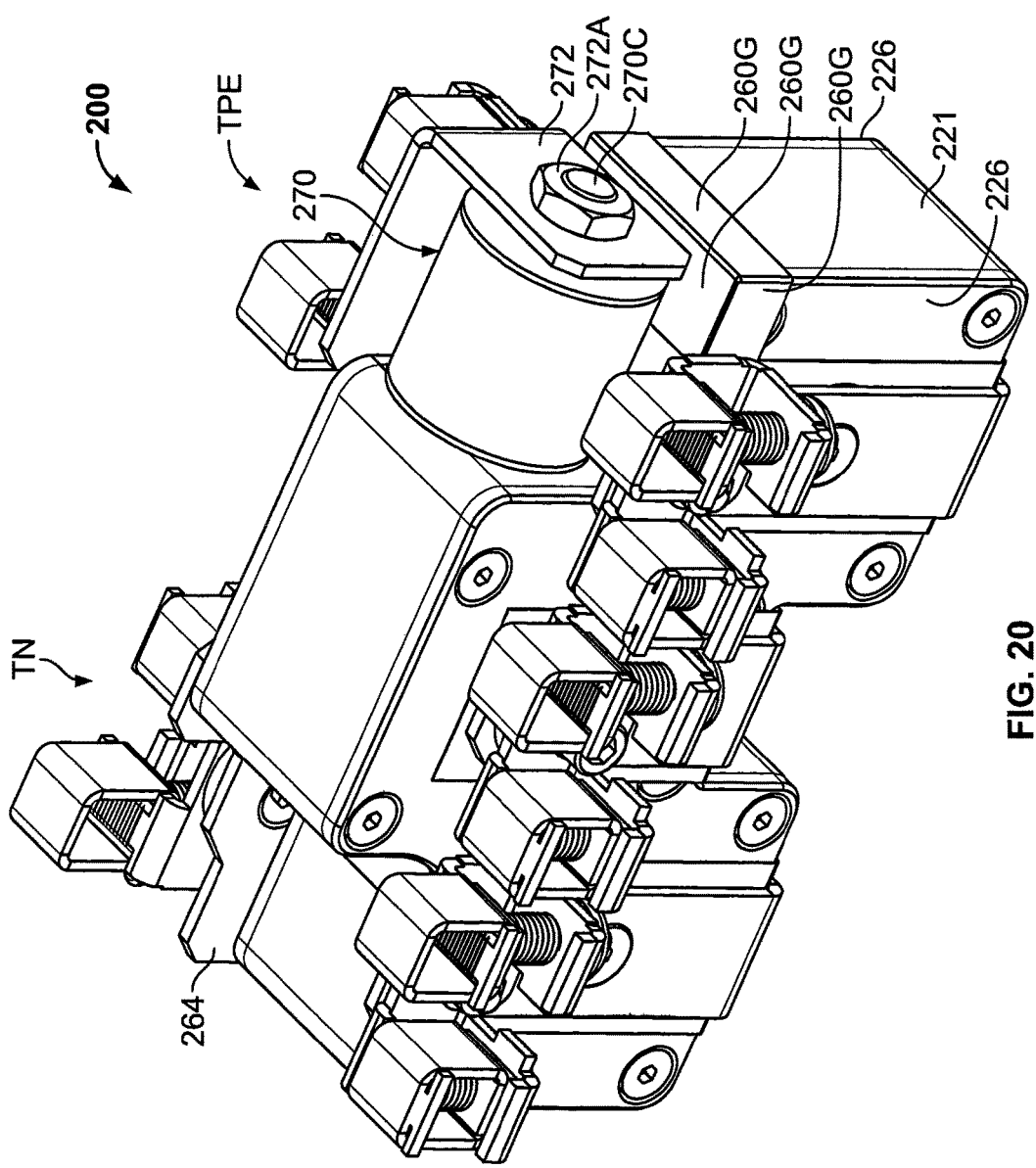
FIG. 20 is a bottom, front perspective view of the overvoltage protection unit of FIG. 14 with the enclosure thereof removed.
Figure 21:
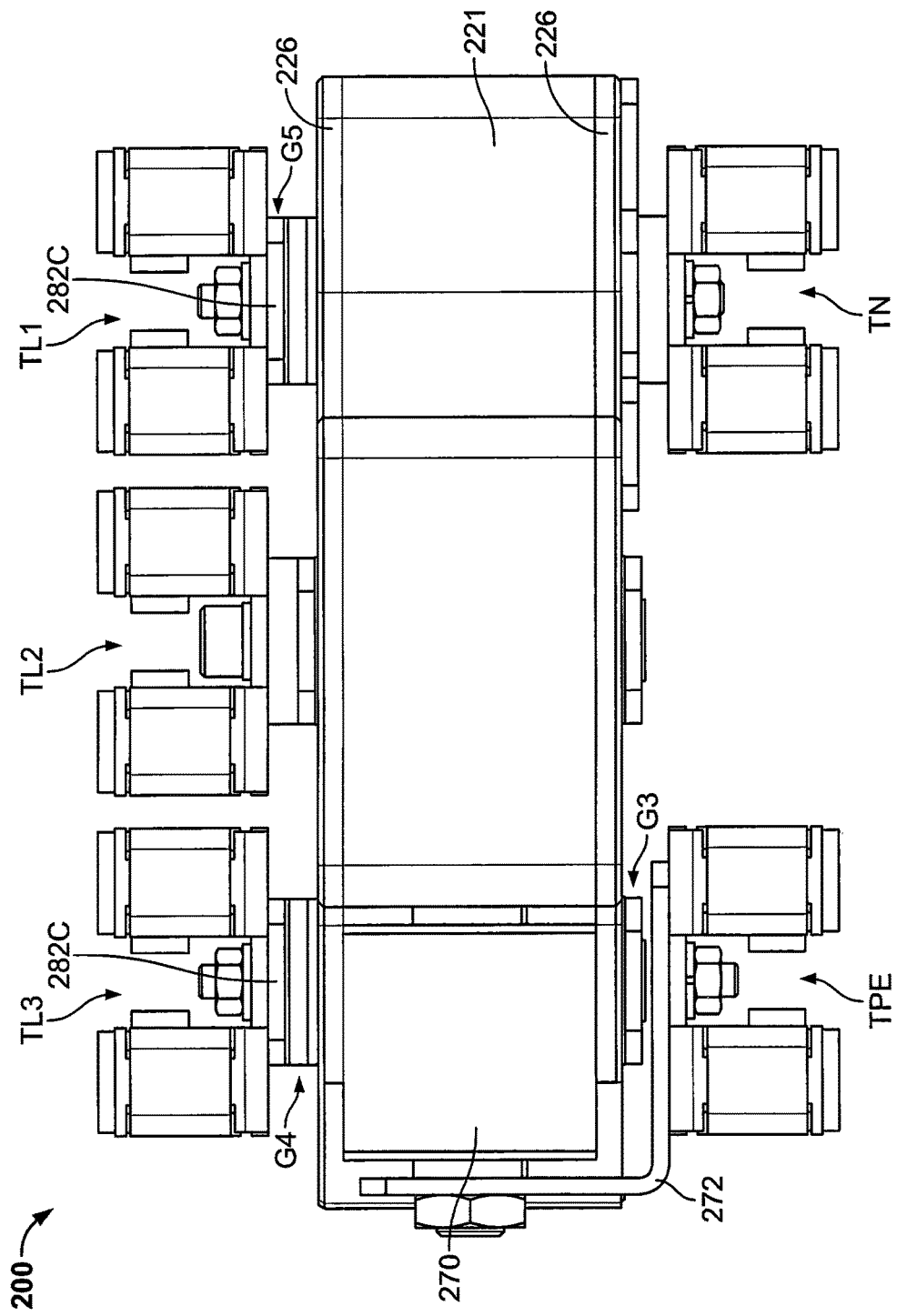
FIG. 21 is a bottom plan view of the overvoltage protection unit of FIG. 14 with the enclosure thereof removed.
Figure 22:
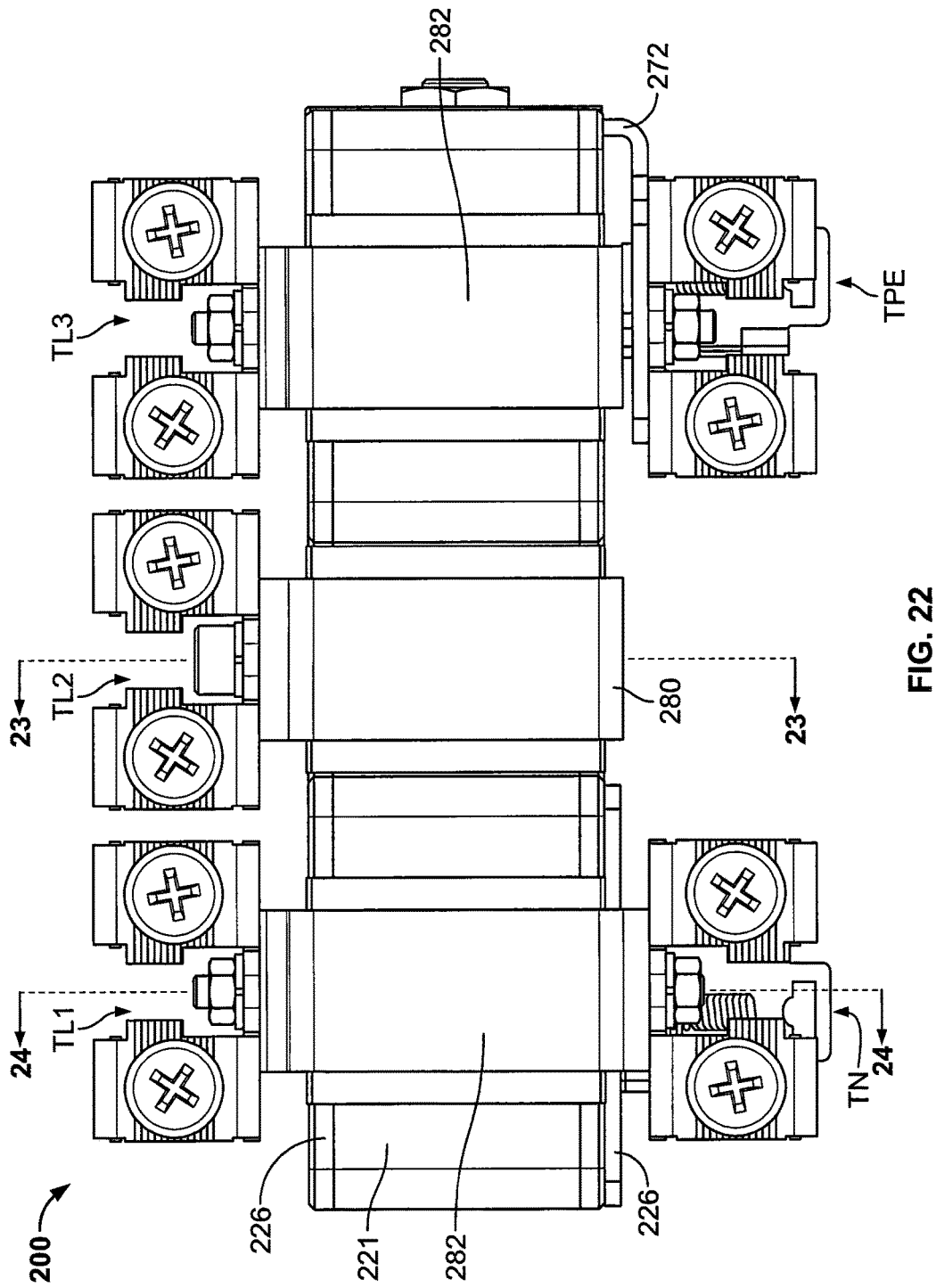
FIG. 22 is a top plan view of the overvoltage protection unit of FIG. 14 with the enclosure thereof removed.
Figure 23:
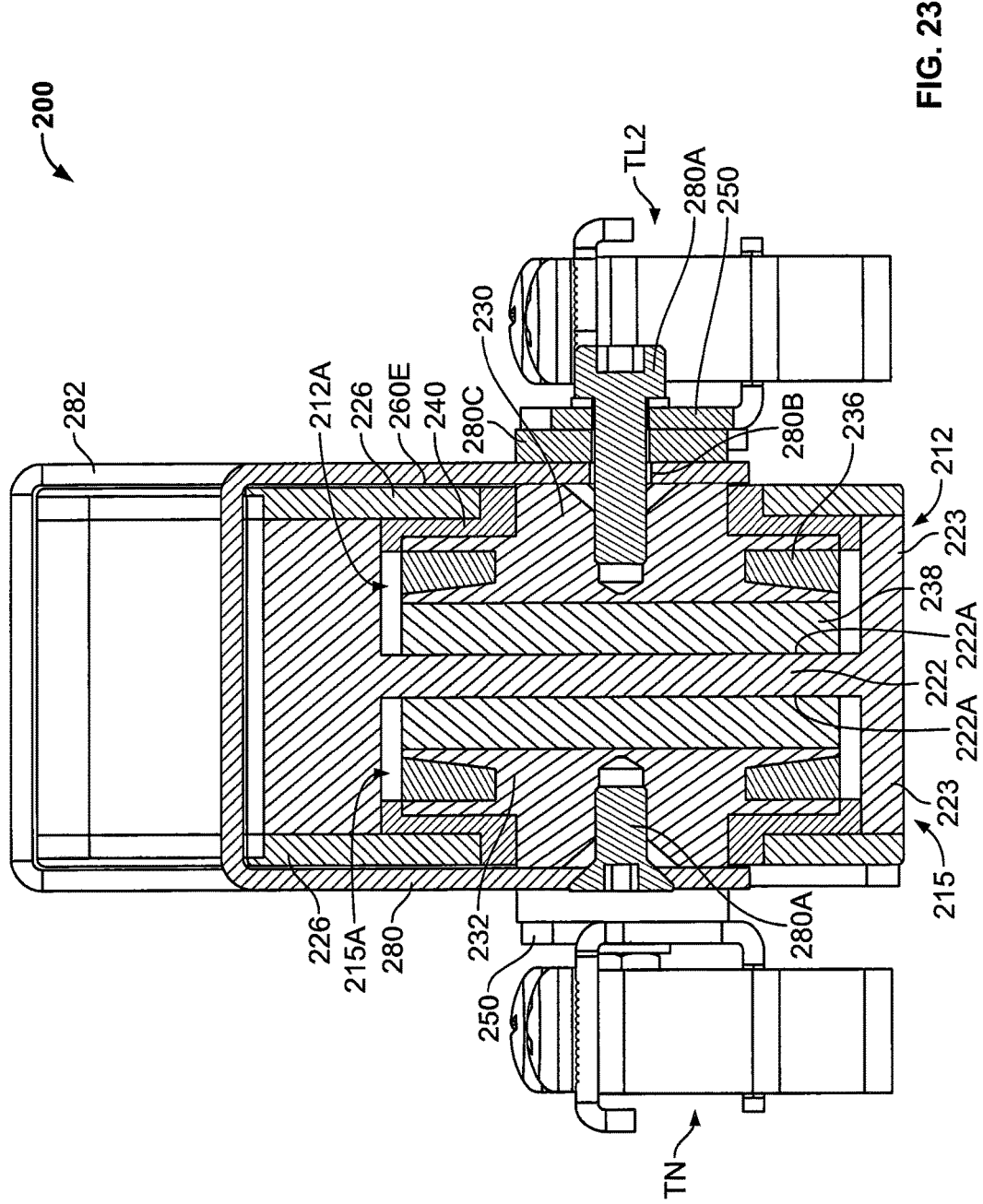
FIG. 23 is a fragmentary, cross-sectional view of the overvoltage protection unit of FIG. 14 taken along the line 23-23 of FIG. 22.
Figure 24:
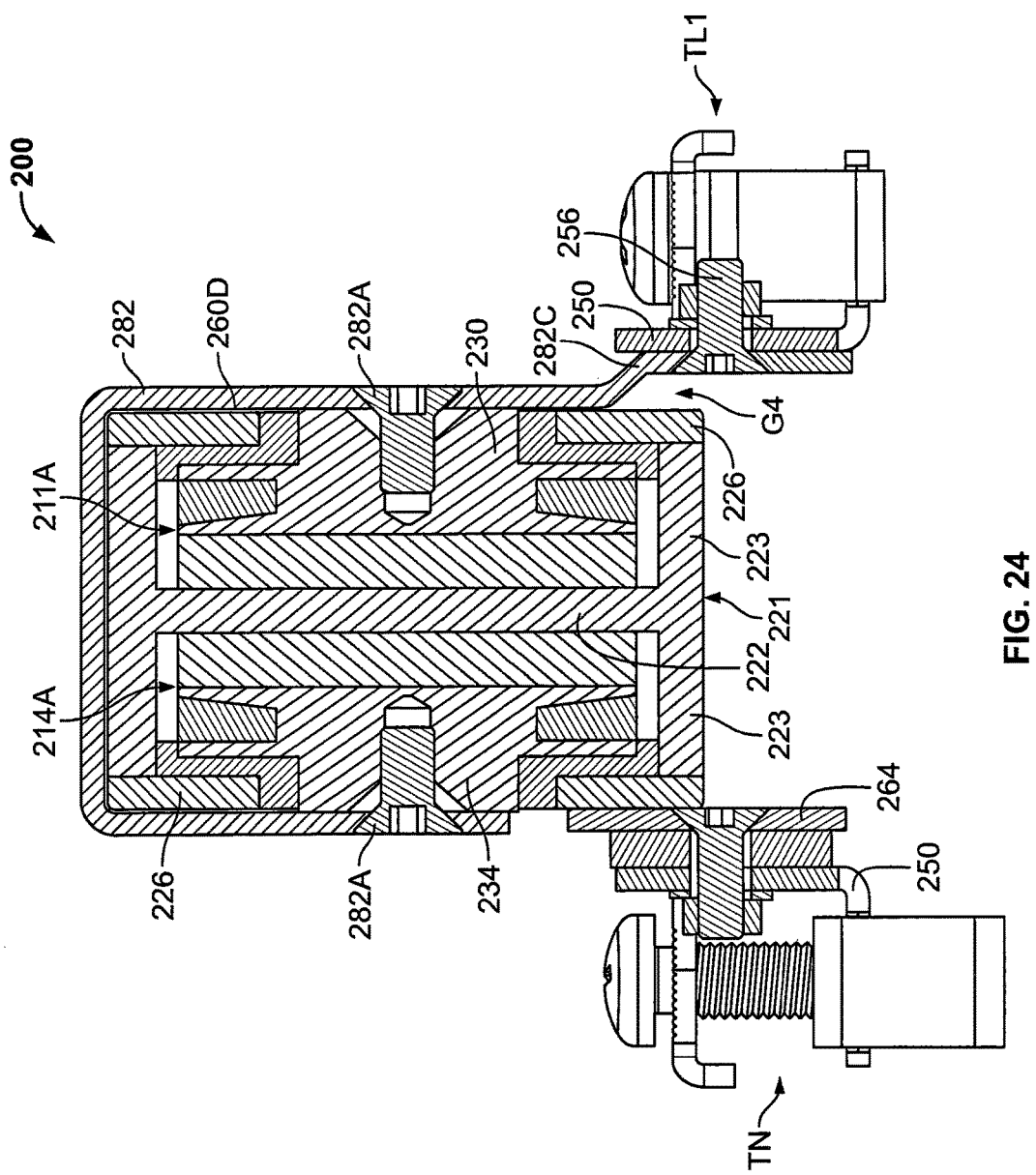
FIG. 24 is a fragmentary, cross-sectional view of the overvoltage protection unit of FIG. 1 taken along the line 24-24 of FIG. 22.
Figure 25:
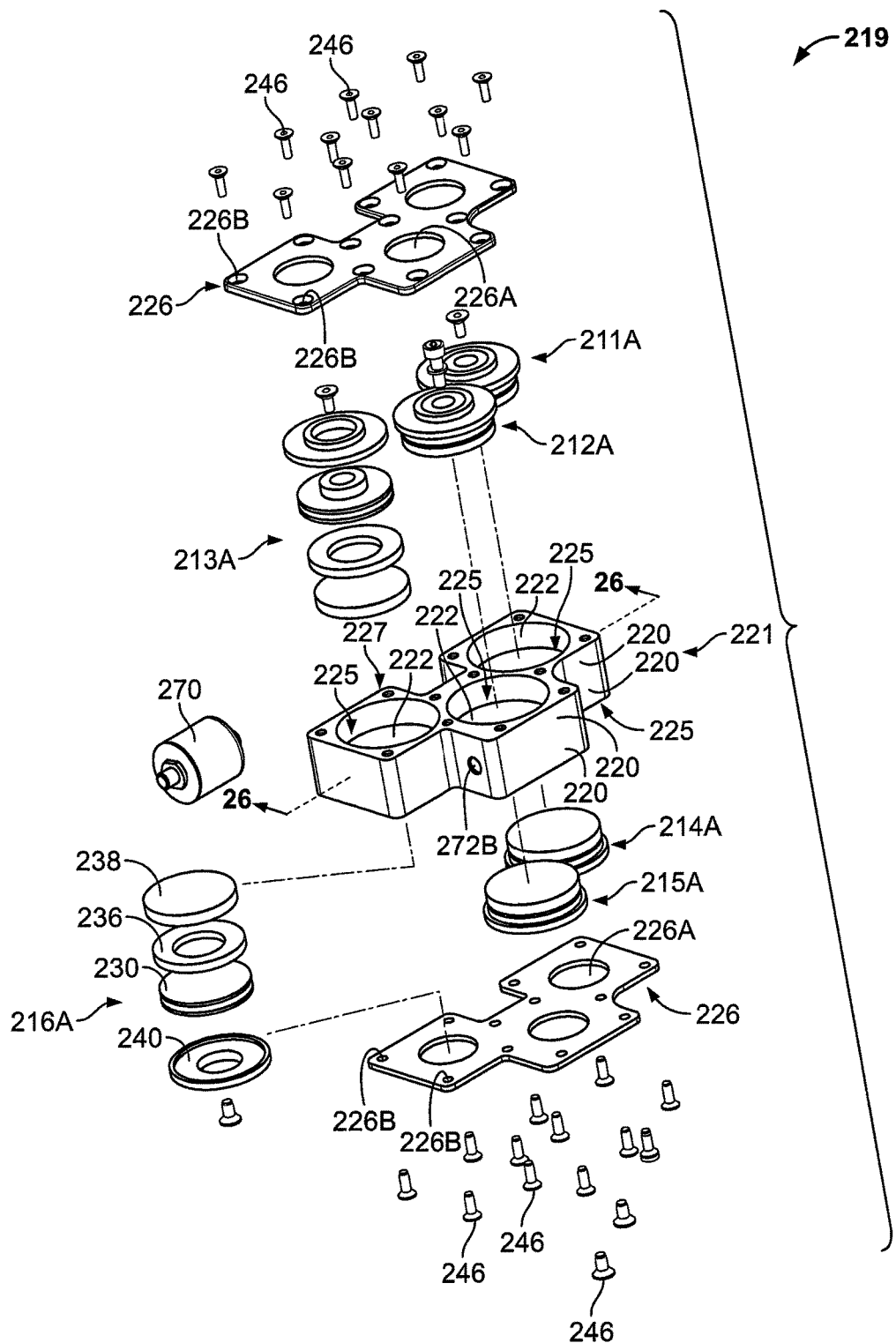
FIG. 25 is an exploded, fragmentary, perspective view of the overvoltage protection unit of FIG. 14.
Figure 26:
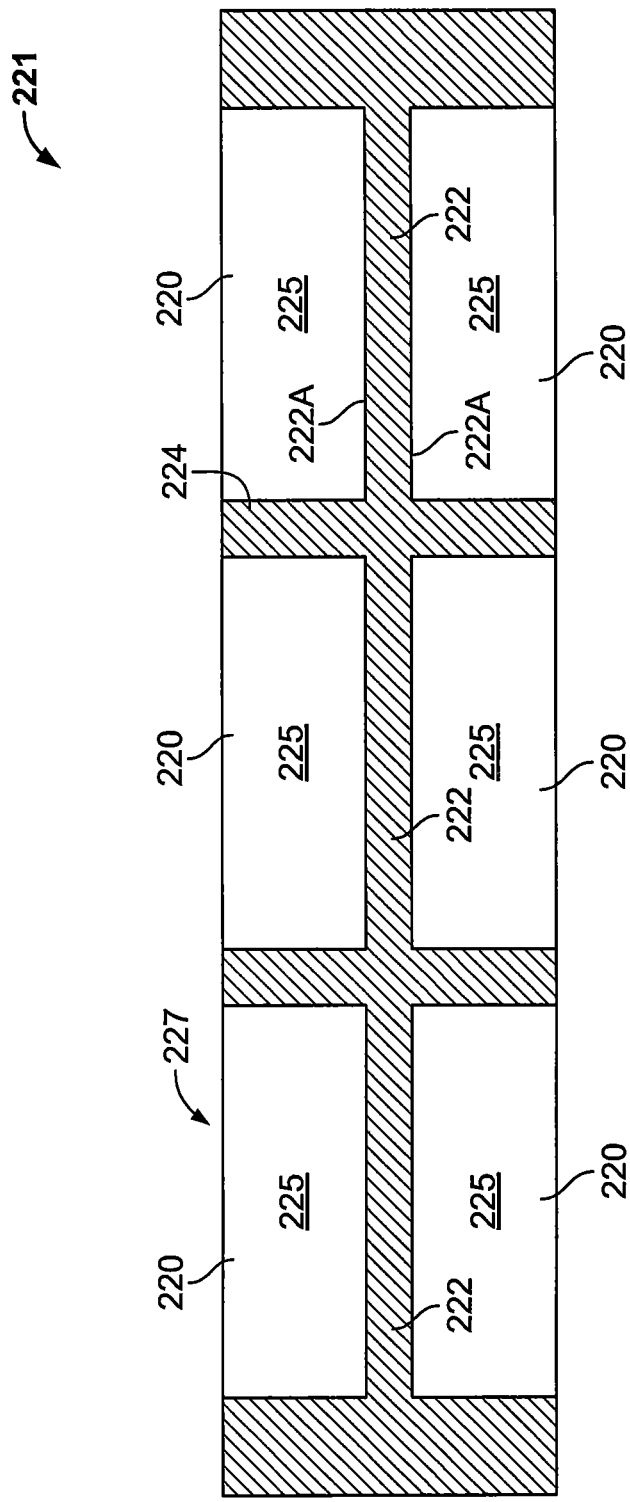
FIG. 26 is a fragmentary, cross-sectional view of the overvoltage protection unit of FIG. 1 taken along the line 26-26 of FIG. 25.

With reference FIG. 13, the unit 100 may be used as follows in accordance with methods of the present invention. FIG. 13 is a circuit diagram of an exemplary three-phase AC power distribution circuit including the unit 100.

The unit 100 is mounted on the DIN rail 10 as shown in FIG. 1. The DIN rail 10 is received in the channel 106 and secured by the hooks 106A and latch mechanisms 108.

The phase input line cables L1, L2 and L3 are terminated at the connectors 155A of the terminals TL1, TL2 and TL3, respectively. The phase output cables L1', L2' and L3' are terminated at the connectors 155B of the terminals TL1, TL2 and TL3, respectively. The neutral cable N is terminated at the connector 155A of the terminal TN. The protected earth cable PE is terminated at the connector 155A of the terminal TPE.

The service lines L1, L2 and L3 are thereby electrically connected to the electrodes 130 of the SPDs 111, 112 and 113, respectively. Ordinarily, in the absence of an overvoltage condition on the line, the varistor wafer 138 of the associated SPD 111, 112, 113 provides high electrical resistance such that no significant current flows through the SPD 111, 112, 113 as it appears electrically as an open circuit. Each SPD housing 120 is electrically isolated from its electrode 130 by the varistor wafer 138 and the insulator member 140, and is electrically isolated from the terminals TL1, TL2, TL3 by a spacing gap G1. The current from each of input lines L1, L2 and L3 thus flows through the corresponding terminals TL1, TL2 and TL3 to the output lines L1', L2' and L3', respectively, without further redirection through the unit 100.

In the event of an overvoltage condition on a line L1, L2 and L3 relative to the design voltage (sometimes referred to as the "clamping voltage", "breakdown voltage" or simply the "varistor voltage") of the connected SPD 111, 112, 113, the resistance of the varistor wafer 138 decreases rapidly, allowing current to flow through the varistor 138 to the housing 120 of the SPD 111, 112, 113 and create a shunt path for current flow to protect other components of the associated electrical system.

The current path followed by the surge current will depend on which line L1, L2, L3 experiences the overvoltage event. If the overvoltage condition is on line L2, the surge current will flow sequentially through the terminal TL2, the coupling bracket 160, the electrode 130, varistor 138 and housing 120 of the SPD 112, the neutral bracket 164, the GDT 170, the GDT coupling bracket 172, and the terminal TPE to the PE cable.

Alternatively, if the overvoltage condition is on line L1, the surge current will flow sequentially through the terminal TL1, the electrode 130, varistor 138 and housing 120 of the SPD 111, the housing 120 of the SPD 112, the neutral bracket 164, the GDT 170, the GDT coupling bracket 172, and the terminal TPE to the PE cable.

Similarly, if the overvoltage condition is on line L3, the surge current will flow sequentially through the terminal TL3, the electrode 130, varistor 138 and housing 120 of the SPD 113, the housing 120 of the SPD 112, the neutral bracket 164, the GDT 170, the GDT coupling bracket 172, and the terminal TPE to the PE cable.

In use and operation, one example system may be implemented in a three phase power system in which the line-to-line voltage is 400V and the line-to-neutral voltage is 230V. Under normal conditions there is no voltage difference between the neutral and protective earth (PE). As illustrated, each of the SPDs 111, 112, 113 may be connected between respective ones of L1, L2 and L3, and neutral (N). A typical operating voltage of an SPD 111, 112, 113 in the present example may be about 300V. In this regard, the SPDs 111, 112, 113 will each perform as an insulator and thus not conduct current during normal operating conditions. In some embodiments, the operating voltage of the SPD's 111, 112, 113 is sufficiently higher than the normal line-to-neutral voltage to ensure that the SPD will continue to perform as an insulator even in cases in which the system voltage increases due to overvoltage conditions that might arise as a result of a loss of neutral or other power system issues.

In the event of a surge current in, for example, L1, protection of power system load devices may necessitate providing a current path to ground for the excess current of the surge current. The surge current may generate a transient overvoltage between L1 and PE, which may overcome the isolation of the gas discharge tube (GDT) 170. Since the transient overvoltage significantly exceeds that operating voltage of SPD 111, the SPD 111 will become conductive, allowing the excess current to flow from L1 through SPD 111 and the GDT 170 to the PE and, where applicable, the neutral N.

Once the surge current has been conducted to PE, the overvoltage condition ends and the SPD 111 becomes non-conducting again. Also, the GDT 170 will no longer conduct any current once the transient voltage between L1 and PE is no longer present.

In case of a failure of the SPD 111, 112, or 113, a fault current will be conducted between the corresponding line L1, L2, or L3 and the neutral. Thus it can be seen that when the current is conducted on line L1 or L3, the housing 120 of the SPD 112 will effectively serve as a busbar or electrical connector between the corresponding SPD 111 or 113 and the neutral bracket 164.

As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e., a leakage current or a surge current). The VNOM of a varistor is typically specified as the measured voltage across the varistor with a DC current of 1 mA.

As is well known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

As discussed above, in the absence of an overvoltage condition, the varistor wafer 138 provides high resistance such that no current flows through the SPD 111, 112, 113 as it appears electrically as an open circuit. That is, ordinarily the varistor 138 passes no current. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the SPD 111, 112, 113 and create a shunt path for current flow to protect other components of an associated electrical system. Normally, the varistor 138 recovers from these events without significant overheating of the SPD 111, 112, 113.

Varistors have multiple failure modes. The failure modes include: 1) the varistor 138 fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

As discussed above, in some cases the SPD 111, 112, 113 may assume an "end of life" mode in which the varistor wafer 138 is depleted in full or in part (i.e., in an "end of life" state), leading to an end of life failure. When the varistor reaches its end of life, the SPD will become substantially a short circuit with a very low but non-zero ohmic resistance. As a result, in an end of life condition, a fault current will continuously flow through the varistor even in the absence of an overvoltage condition. In this case, the meltable member 136 can operate as a fail-safe mechanism that by-passes the failed varistor and creates a permanent low-ohmic short circuit between the terminals of the SPDs 111, 112, and 113 in the manner described in U.S. Pat. No. 7,433,169, the disclosure of which is incorporated herein by reference.

One way to avoid such short circuit currents is to interrupt the fault current through the SPD 111, 112, 113 using a fuse. However, there are applications where in case the SPDs 111, 112, 113 are connected between the lines and the PE, it is not desired to have any leakage current though the SPDs during their operation. Leakage currents might be conducted for a limited period of time before the SPD becomes a low-ohmic short circuit and trips the fuse. The unit 100 addresses this risk by employing a "3+1" electrical configuration. That is, the unit 100 includes three SPDs 111, 112, 113 in series with one GDT 170 between the input lines TL1, TL2, TL3 and the protected earth PE. Leakage current is prevented from flowing to PE by the GDT 170, which will not conduct in the absence of an overvoltage event. The fault current will flow instead to the neutral line N (from the housing 120 of the SPD 112, through the neutral mounting bracket 164, and the neutral terminal TN), where it can be sensed and may cause one or more types of protective devices to be triggered (e.g., a fuse or fuses). In addition, it may also trigger an alarm circuit integrated internally to the device (in some embodiments part of this circuit may be external) to provide a remote alarm indication by the means of a dry contact.

In some cases the use of a fuse as described above is ineffective or undesirable when it is connected in series to the SPD and between the power line and the SPD, as it will leave the load unprotected after disconnecting the surge protective device. Therefore, the SPD should be able to conduct the fault current even in the case when it is protected by an external fuse, not dedicated to the SPD. The meltable member 136 of each SPD 111, 112, 113 may serve as a fail-safe mechanism that will enhance the withstand capabilities of the SPD to fault currents and will not require specific, low $I^2t$ dedicated fuses for its own protection during end of life.

The meltable member 136 is adapted and configured to electrically short circuit the current applied to the associated SPD around the varistor 138 to prevent or reduce the generation of heat in the varistor. In this way, the meltable member 136 can operate as switch to bypass the varistor 138 and prevent overheating and catastrophic failure as described above. As used herein, a fail-safe system is "triggered" upon occurrence of the conditions necessary to cause the fail-safe system to operate as described to short circuit the electrodes 120, 130.

When heated to a threshold temperature, the meltable member 136 will flow to bridge and electrically connect the electrodes 120, 130. The meltable member 136 thereby redirects the current applied to the SPD to bypass the varistor 138 so that the current induced heating of the varistor 138 ceases. The meltable member 136 may thereby serve to prevent or inhibit thermal runaway without requiring that the current through the SPD be interrupted.

Figure 11:
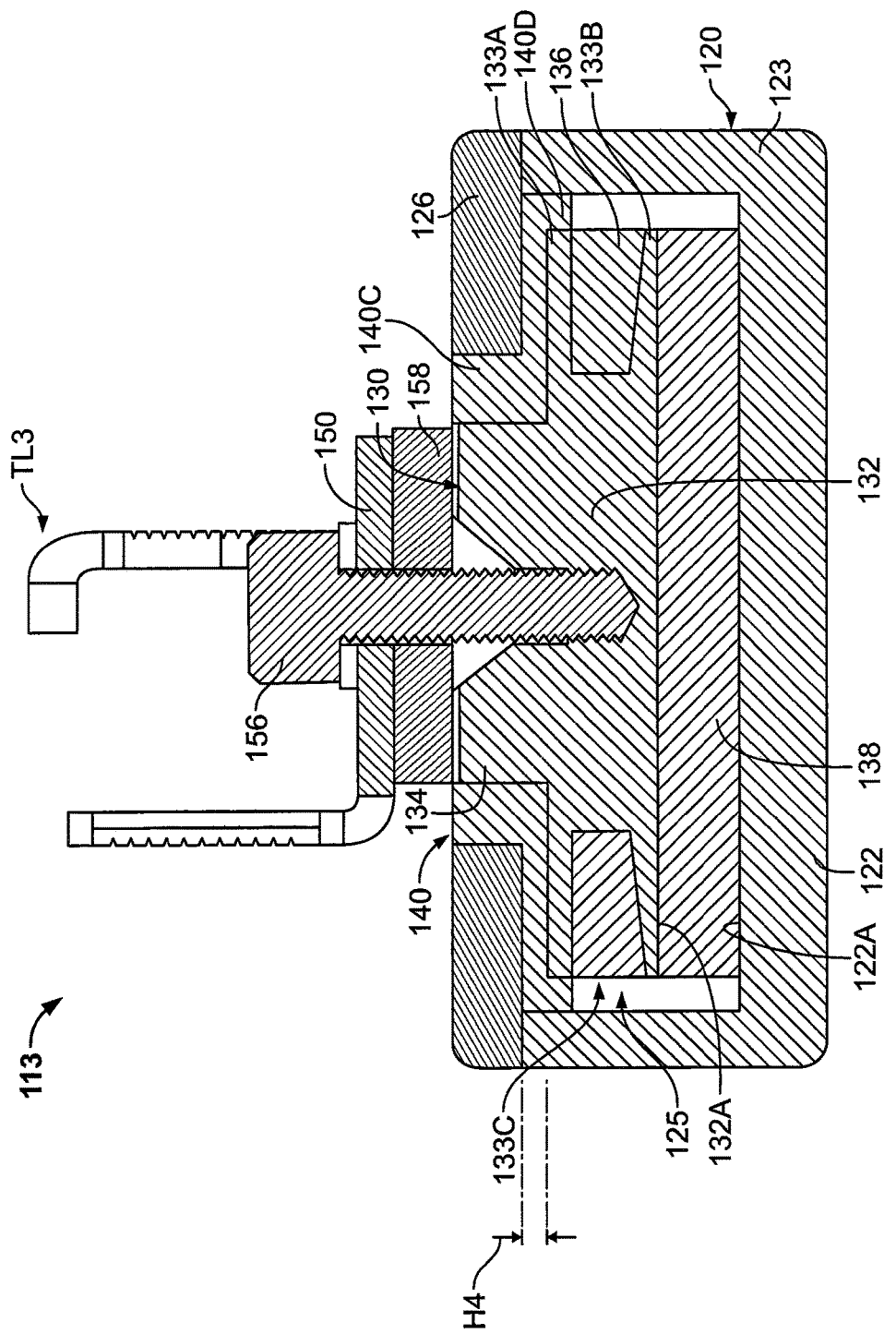
FIG. 11 is a fragmentary, cross-sectional view of the overvoltage protection unit of FIG. 1 taken along the line 11-11 of FIG. 6.
Figure 12:
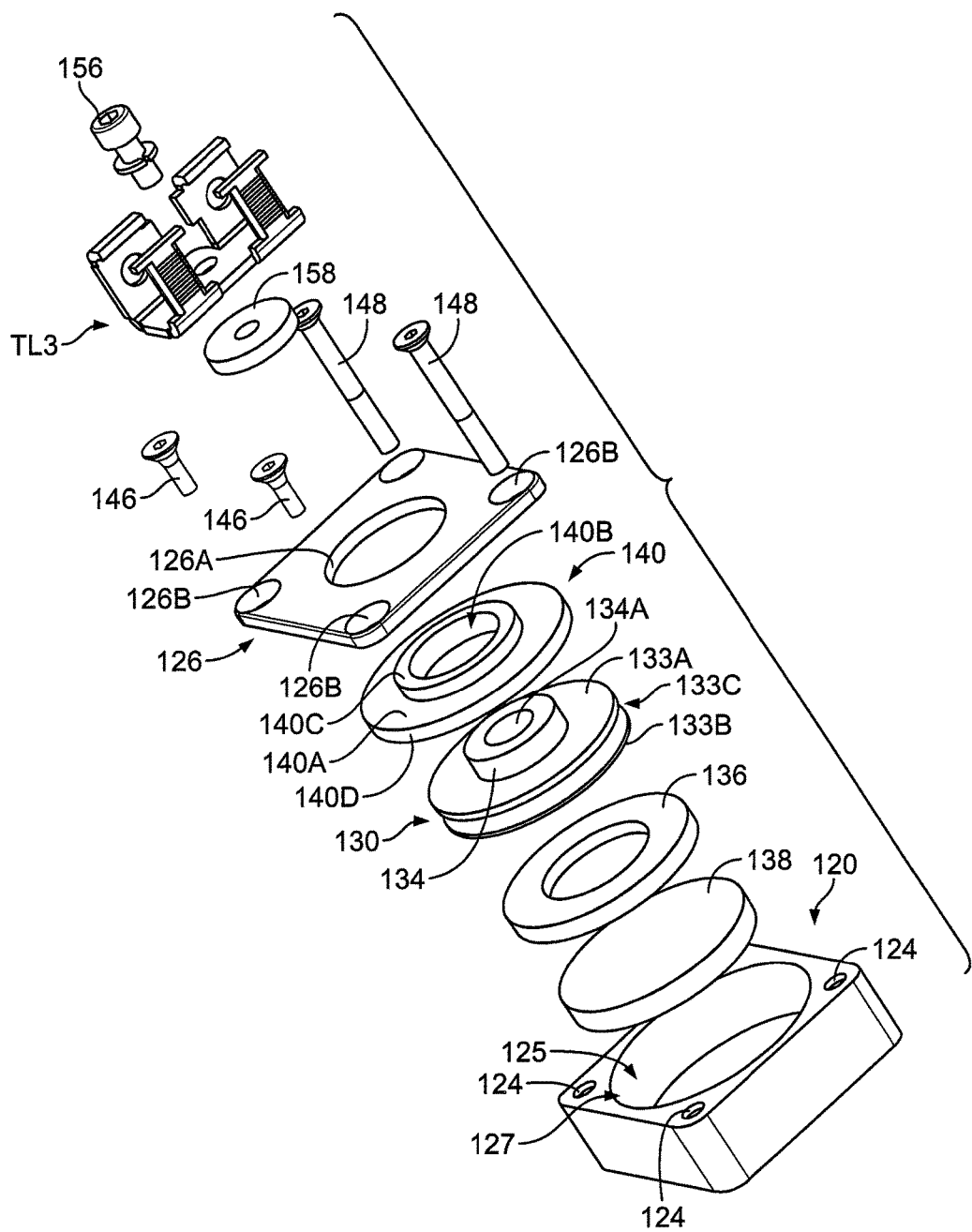
FIG. 12 is an exploded, fragmentary, perspective view of the overvoltage protection unit of FIG. 1.

More particularly, the meltable member 136 initially has a first configuration as shown in FIGS. 11 and 12 such that it does not electrically couple the electrode 130 and the housing 120 except through the head 132. Upon the occurrence of a heat buildup event, the electrode 130 is thereby heated. The meltable member 136 is also heated directly and/or by the electrode 130. During normal operation, the temperature in the meltable member 136 remains below its melting point so that the meltable member 136 remains in solid form. However, when the temperature of the meltable member 136 exceeds its melting point, the meltable member 136 melts (in full or in part) and flows by force of gravity into a second configuration different from the first configuration. The meltable member 136 bridges or short circuits the electrode 130 to the housing 120 to bypass the varistor 138. That is, a new direct flow path or paths are provided from the surface of the electrode 120 to the surface of the housing sidewall 124 through the meltable member 136. According to some embodiments, at least some of these flow paths do not include the varistor wafer 138.

According to some embodiments, the SPDs 111, 112, 113 are adapted such that when the meltable member 136 is triggered to short circuit the SPD, the conductivity of the SPD is at least as great as the conductivity of the feed and exit cables connected to the device.

The unit 100 advantageously provides multiple (three) SPDs 111, 112, 113 between the lines L1, L2, L3 and neutral N, and additionally a GDT 170 between neutral N and ground PE, in a format adapted for and compliant with DIN specifications for mounting the unit on a DIN rail 10, to provide a "3+1" surge protector circuit. In particular, the three SPDs 111, 112, 113 integrated in the unit 100 are of a type including a varistor sealed within a metal housing and a mechanically and electrically captured between a metal electrode and the housing (which serves as a second electrode). The SPDs of this type generally required more space than surge protection devices of other types, but can provide a number of advantages. In some embodiments, in case there is no need for an SPD between N and PE (this is when the N is electrically connected (hardwired) to PE), the SPDs 111, 112, 113 may be used in 3+0 format, i.e., excluding the GDT from the circuit or replacing it with a metal bus bar connection between N and PE terminals.

The interconnection configuration and features of the unit between the SPDs 111, 112, 113 and the neutral terminal TN enable a unit 100 having a significantly reduced size. In particular, because the housing 120 of the SPD 112 is used as an electrical connection or busbar between the housings 120 of the SPDs 111, 113 and the neutral coupling bracket 164, it is not necessary to provide one or more additional cables or busbars to effect these connections. This interconnection is accomplished by laterally overlapping the SPDs 111, 113 with the SPD 112 and placing the electrically conductive cover 126 of the SPD 112 in contact with the electrically conductive housings 120 of the SPDs 111, 113. The cover 126 and housings 120 are maintained in firm contact by the compressive loading applied by the shared bolts 148. Moreover, by using the shared bolts 148 to secure the covers of both of the overlapping SPDs, the SPD subassembly 119 can be made more compact.

The square outer shape of the SPD housings 120 provides corner portions for receiving the bolts 146, 148 while still retaining the cylindrical shape for the internal cavity 125. The corner portions provide contact interfaces between the housings 120 for electrical continuity therebetween. The corner portions can also provide additional thermal mass to the housing 120.

The elastomeric (e.g., silicone rubber) insulator 140 serves both to electrically isolate the electrode 130 from the housing (electrode) 120. The insulator 140 also serves to apply pressure on the electrode 130 tending to force the opposing electrode contact surfaces 122A, 132A against the varistor 138. This loading of the electrodes 120, 130 against the varistor helps to ensure good contact between the mating surfaces and thus to reduce electrical contact resistance between them. The insulator 140 is clamped down and compressively loaded by the bolts 146, 148 and the low profile screw down covers 126. The insulator 140 can enable a more compact, low profile design for the SPDs 111, 112, 113, thereby enabling a smaller or more compact form factor for the unit 100. The insulator 140 will not affect the failure mode of the SPD. When formed of silicone rubber, the insulator 140 can withstand aging well.

According to some embodiments, the biased electrodes 120, 130 of each SPD 111, 112, 113 apply a load to the varistor 138 in the range of from 100 lbf and 1000 lbf depending on its surface area. As will be appreciated from the foregoing discussion, some or this entire load is applied by the compressed insulator member 140.

With reference to FIGS. 14-26, a modular overvoltage protection unit 200 according to further embodiments of the invention is shown therein. The unit 200 can be used in the same manner and for the same purpose as the unit 100 and, according to some embodiments, is likewise configured, sized and shaped for mounting on a support rail (e.g., DIN rail 10 shown in FIG. 1) and is compliant with corresponding applicable DIN requirements or standards.

The overvoltage protection unit 200 includes a housing assembly 210, an SPD subassembly 219, three power transmission line terminals TL1, TL2, TL3, a neutral line terminal TN, a ground or protected earth (PE) terminal TPE, and PE surge protection module 270 (e.g., a gas discharge tube (GDT)). The SPD subassembly 219 includes six integral overvoltage or surge protection devices (SPDs) 211, 212, 213, 214, 215, and 216. These and additional components of the unit 200 are described hereinbelow in more detail.

The housing assembly 210 includes a base part 202A and a cover part 202B generally constructed as described above for the unit enclosure 110 and parts 102A, 102B, but configured to accommodate the different electronic components and layout.

Turning to the SPD subassembly 219 in more detail, the SPD subassembly 219 includes a housing 221, two covers 226, and six SPD internal component sets 211A, 212A, 213A, 214A, 215A, 216A. Each SPD internal component set 211A, 212A, 213A, 214A, 215A, 216A includes an electrode 230, an insulator member 240, a meltable member 236, and a varistor 238 corresponding to and constructed and arranged in the same manner as described above for the components 130, 140, 136, and 138.

The housing 221 is unitary and, in some embodiments, monolithic. The housing 221 is formed of an electrically conductive metal such as aluminum. The housing 221 includes six integral housing electrode portions 220 (two mirror image sets of three on each side). Each housing portion 220 includes an electrode wall 222, a sidewall 223, a cavity 225, and a top opening 227 corresponding to the features 122, 123, 125, and 127, except as follows. Each housing portion 220 shares its electrode wall 222 with the opposing housing portion 220 so that the electrode wall has opposed contact surfaces 222A. Each housing portion 220 also shares a side wall or side walls 222 with a laterally adjacent housing portion 220. A threaded GDT mounting bore 272B is defined in a side wall of the housing 221.

The covers 226 are substantially plate-shaped and have a profile matching that of the housing 221. Each cover 226 has three electrode openings 226A and twelve fastening bores 226B defined therein. According to some embodiments, the covers 226 are formed of an electrically conductive material. In some embodiments, the covers 226 are formed of a metal and, in some embodiments, are formed of aluminum.

Each SPD internal component set 211A, 212A, 213A, 214A, 215A, 216A is disposed in respective one of the housing cavities 225. The covers 226 are secured to opposed sides of the housing 221 by bolts 246. The covers 226 capture the SPD internal component sets 211A, 212A, 213A, 214A, 215A, 216A and axially compress the elastomeric insulators 240 thereof. The SPD internal component sets 211A, 212A, 213A, 214A, 215A, and 216A, the corresponding housing portions 220, and the corresponding covers 226 thereby form six SPDs 211, 212, 213, 214, 215, and 216, respectively.

A metal, C-shaped middle electrode bridge bracket 280 extends over the SPDs 212 and 215. The bridge bracket 280 is electrically and mechanically secured to the heads 234 of the electrodes 230 of the SPDs 212 and 215 by bolts 280A extending through openings 280B and into the threaded bores 234A.

A metal, C-shaped middle electrode bridge bracket 282 extends over the SPDs 211 and 214. A further metal, C-shaped middle electrode bridge bracket 282 extends over the SPDs 213 and 216. The bridge brackets 282 are electrically and mechanically secured to the heads 234 of the electrodes 230 of the SPDs 211, 214 and 213, 216 by bolts 282A extending through openings 282B and into the threaded bores 234A.

Electrical insulation strips, sheets or layers 260D, 260E, 260F are wrapped over the housing 221. The insulation layers 260D, 260E, 260F may be formed of the same material and dimensions as discussed above with regard to the insulation layer 160. Each insulation layer 260D, 260E, 260F between and around a respective pair of opposed electrode heads 234 and is interposed between the corresponding bridge bracket 280, 282 and the housing 221 and covers 226. Holes 260I1 are provided in the insulation layers 260D, 260E, 260F to permit passage of the bolts 280A, 282A and electrical contact between the bridge brackets 280, 282 and the electrode heads 234.

The insulation layer 260F also includes a portion 260G wrapped around the lower edges of the SPDs 113, 116 to electrically insulate the GDT terminal 270B and a PE terminal mounting bracket 272 from the housing 221 and covers 226.

The bases 250 of the terminals TL1 and TL3 are secured to the bridge brackets 282 by bolts 256. Each bridge bracket 282 has an end tab portion 282C that is bent away from the cover 226 to form a gap G4, G5 between the cover 226 and the bridge bracket 282, terminal and bolt 256, thereby providing electrical isolation between the cover 226 and these components.

The base 250 of the terminal TL2 is secured directly to the electrode 230 of the SPD 212 by the near side bolt 280A. A metal spacer washer 280C is provided between the terminal TL2 and the bridge bracket 280 to align the terminal TL2 with the other line terminals TL1, TL3.

A metal neutral bracket 264 is directly secured to the rear cover 226 by cover bolts 264A such that electrical contact is provided between the bracket 264 and the cover 226 and housing 221. The base 250 of the terminal TN is in turn bolted to the neutral bracket 264.

The GDT 270 includes opposed electrical terminals in the form of threaded studs 270A, 270B. The terminal 270A is screwed into the bore 272B to securely mechanically and electrically connect the GDT 270 to the housing 221.

The aforementioned PE terminal mount bracket 272 is securely mechanically and electrically connected the GDT 270 by the terminal 270C and a cooperating nut 272A. The base 250 of the terminal TPE is in turn bolted to the PE terminal mount bracket 272 by a bolt 256. A gap G3 is defined between the cover 226 and the bracket 272, terminal and bolt 256, thereby providing electrical isolation between the cover 226 and these components.

The unit 200 may be used as follows in accordance with methods of the present invention and similarly to the unit 100. The unit 200 may be used in place of the unit 100 in the exemplary three-phase AC power distribution circuit of FIG. 13, for example.

The unit 200 is mounted on the DIN rail 10 (FIG. 1). The DIN rail 10 is received in the channel 206 and secured by the hooks 206A and latch mechanisms 208.

The phase input line cables L1, L2 and L3 are terminated at the connectors 255A of the terminals TL1, TL2 and TL3, respectively. The phase output cables L1', L2' and L3' are terminated at the connectors 255B of the terminals TL1, TL2 and TL3, respectively. The neutral cable N is terminated at the connector 255A of the terminal TN. The protected earth cable PE is terminated at the connector 255A of the terminal TPE.

The service lines L1, L2 and L3 are thereby electrically connected to the electrodes 230 of the SPDs 211, 212, 213, 214, 215 and 216, respectively, through the bridge brackets 280, 282. Ordinarily, in the absence of an overvoltage condition on the line, the varistor wafer 238 of the associated SPD 211, 212, 213, 214, 215, 216 provides high electrical resistance such that no significant current flows through the SPD 211, 212, 213, 214, 215, 216 as it appears electrically as an open circuit. Each SPD housing portion 220 is electrically isolated from its electrode 230 by the varistor wafer 238 and the insulator member 240. The housing 221 is electrically isolated from the terminals TL1, TL2, TL3 and bridge brackets 280, 282 by a spacing gap G4, G5 or insulation layer 260D-G. The current from each of input lines L1, L2 and L3 thus flows through the corresponding terminals TL1, TL2 and TL3 to the output lines L1', L2' and L3', respectively, without further redirection through the unit 200.

In the event of an overvoltage condition on a line L1, L2 and L3 relative to the design voltage (sometimes referred to as the "clamping voltage", "breakdown voltage" or simply the "varistor voltage") of the connected SPD 211, 212, 213, 214, 215, 216, the resistance of the varistor wafer 238 decreases rapidly, allowing current to flow through the varistor 238 to the electrode wall 222 of the housing portion 220 of the SPD 211, 212, 213, 214, 215, 216 and create a shunt path for current flow to protect other components of the associated electrical system.

The current path followed by the surge current will depend on which line L1, L2, L3 experiences the overvoltage event. If the overvoltage condition is on line L2, the surge current will flow sequentially through the terminal TL2, the electrode 230, the varistor 238 and the electrode wall 222 of the SPD 212, the housing 221, the GDT 270, the PE terminal mount bracket 272, and the terminal TPE to the PE cable. Additionally, when the overvoltage condition is on the line L2, the surge current will flow sequentially from the terminal TL2 through the bridge bracket 280, the electrode 230, the varistor 238 and the electrode wall 222 of the SPD 215 (where the electrode wall 222 is the same as the electrode wall 222 of the SPD 212), the housing 221, the GDT 270, the PE terminal mount bracket 272, and the terminal TPE to the PE cable.

Alternatively, if the overvoltage condition is on line L1, the surge current will flow sequentially through the terminal TL1, the associated bridge bracket 282, the electrode 230, varistor 238 and electrode wall 222 of the SPD 211, the housing 221, the GDT 270, the PE terminal mount bracket 272, and the terminal TPE to the PE cable. Additionally, the surge current will flow sequentially from the terminal TL1 through the associated bridge bracket 282, the electrode 230, varistor 238 and electrode wall 222 of the SPD 214, the housing 221, the GDT 270, the PE terminal mount bracket 272, and the terminal TPE to the PE cable.

Similarly, if the overvoltage condition is on line L3, the surge current will flow sequentially through the terminal TL3, the associated bridge bracket 282, the electrode 230, varistor 238 and electrode wall 222 of the SPD 213, the housing 221, the GDT 270, the PE terminal mount bracket 272, and the terminal TPE to the PE cable. Additionally, the surge current will flow sequentially from the terminal TL3 through the associated bridge bracket 282, the electrode 230, varistor 238 and electrode wall 222 of the SPD 216, the housing 221, the GDT 270, the PE terminal mount bracket 272, and the terminal TPE to the PE cable.

Similar to the unit 100, leakage current is prevented from flowing to PE by the GDT 270, which will not conduct in the absence of an overvoltage event. The leakage current will flow instead to the neutral line N (from the housing 221 and rear cover 226, through the neutral mounting bracket 264, and the neutral terminal TN), where it can be sensed and may cause one or more types of protective devices to be triggered (e.g., a fuse or fuses). In addition, it may also trigger an alarm circuit integrated internally to the device (in some embodiments part of this circuit may be external) to provide a remote alarm indication by the means of a dry contact.

In some embodiments, the SPD subassembly 219 using two SPDs per phase (SPD's 211, 212, 213, 214, 215, 216) may be operable to withstand about double the surge current of the same device used in an single SPD per phase. For example, some embodiments provide that in a single SPD application, the surge current maximum may be about 12.5 kA whereas two SPD's per phase may be capable of withstanding about 25 kA in a 10/350 μsec current waveform. With one example system may be implemented in a three phase power system in which the line-to-line voltage is 400V and the line-to-neutral voltage is 230V.

Thus, it can be seen that when the overvoltage occurs on any of the lines L1, L2, L3, the integral, unitary housing 221 will effectively serve as a busbar or electrical connector between the corresponding SPD 211, 212, 213, 214, 215, 216 and the GDT 270. The integral housing 221 and combined cover plates 226 thereby enable a more compact form factor.

The unit 200 likewise provides a "3+1" protection circuit as discussed above. Additionally, it can be seen that each line L1, L2, L3 is provided with two SPDs in electrical parallel between the line and neutral N. In this way, the overall surge capacity of the unit 200 can be increased (e.g., doubled). Also, the unit 200 is able to better withstand fault currents during short circuit current events when one or more of the SPDs 211, 212, 213, 214, 215, 216 has failed because of its monolithic design (the connection between the modules and the neutral terminal is not done using individual parts bolted together). In some embodiments, in case there is no need for an SPD between N and PE (this is when the N is electrically connected (hardwired) to PE), the SPDs 211, 212, 213 may be used in 3+0 format, i.e., excluding the GDT from the circuit or replacing it with a metal bus bar connection between N and PE terminals.

According to some embodiments, the areas of engagement between each of the contact surfaces (e.g., the contact surfaces 122A, 132A) and the varistor wafer surfaces is at least 0.5 square inches.

According to some embodiments, the combined thermal mass of the housing 120 or housing portion 220 and the electrode 130, 230 of each SPD 111-113, 211-216 is substantially greater than the thermal mass of its varistor wafer 138, 238. As used herein, the term "thermal mass" means the product of the specific heat of the material or materials of the object (e.g., the varistor wafer) multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head 132, 232 and the electrode wall 122, 222 is substantially greater than the thermal mass of the varistor wafer 138, 238. According to some embodiments, the thermal mass of at least one of the electrode head 132, 232 and the electrode wall 122, 222 is at least two times the thermal mass of the varistor wafer 138, 238, and, according to some embodiments, at least ten times as great. According to some embodiments, the combined thermal masses of the head 132, 232 and the wall 122, 222 are substantially greater than the thermal mass of the varistor wafer 138, 238, according to some embodiments at least two times the thermal mass of the wafer 138, 238 and, according to some embodiments, at least ten times as great.

Figure 27:
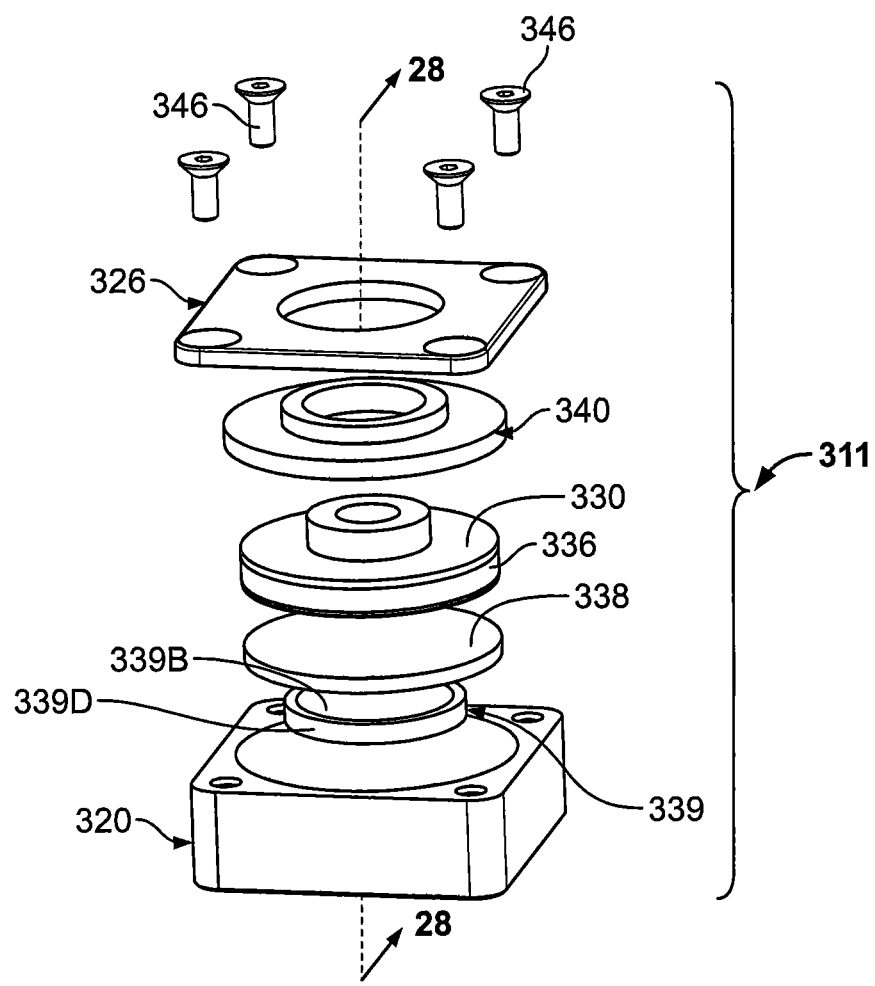
FIG. 27 is an exploded, top perspective view of a surge protection device according to further embodiments of the present invention.
Figure 28:
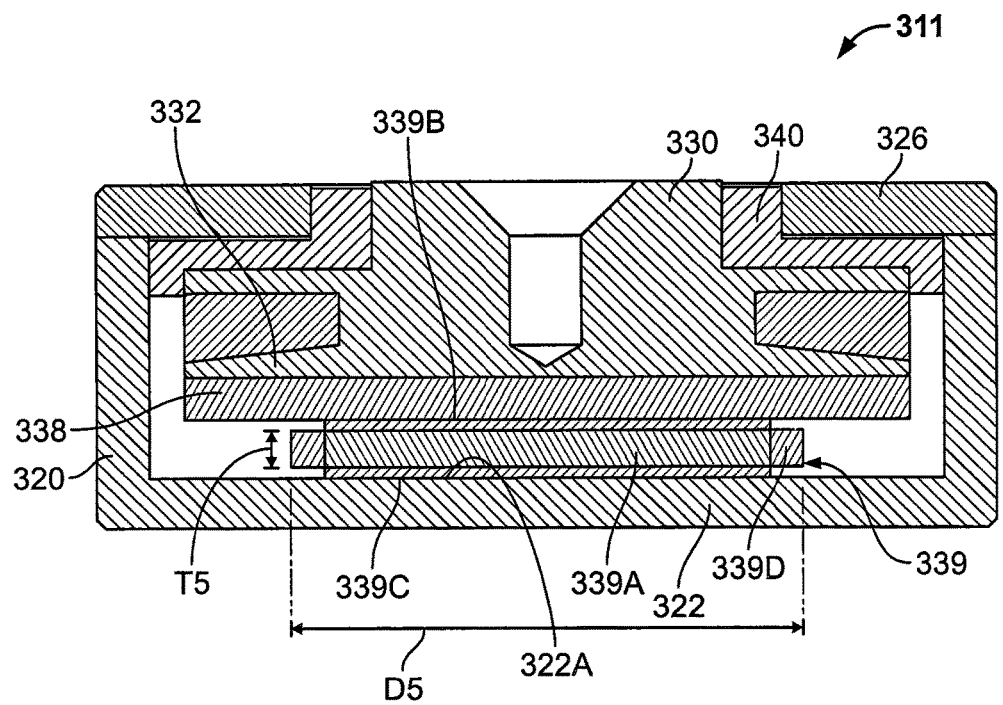
FIG. 28 is a cross-sectional view of the surge protection device of FIG. 27 taken along the line 28-28 of FIG. 27.

With reference to FIGS. 27 and 28, a surge protection device (SPD) 311 according to further embodiments of the invention is shown therein. The SPD 311 can be used in the same manner and for the same purpose as the SPDs 111, 112, 113. For example, according to some embodiments, three of the SPDs 311 can be used in place of the SPDs 111, 112, 113, respectively, in the overvoltage protection unit 100.

The SPD 311 includes a first electrode or housing 320, a piston-shaped second electrode 330, a varistor member (herein, "the varistor wafer") 338 between the housing 320 and the electrode 330, a cover 326, an electrically insulating, elastomeric insulator member 340, a meltable member 336, and bolts 346 corresponding to and constructed in the same manner as the components 120, 130, 138, 126, 140, 136, and 146 of the SPD 111, except as follows. The SPD 311 further includes a gas discharge tube (GDT) 339.

The GDT 339 is wafer or disk-shaped and includes a body 339A and opposed electrical terminals 339B and 339C on the major opposed faces of the body 339A, and an annular electrical insulator (e.g., ceramic) 339D surrounding the body 339A between the terminals 339B, 339C. In some embodiments and as illustrated, the outer faces of the terminals 339B, 339C are substantially flat and planar or include a substantially flat or planar circular or annular contact region. According to some embodiments, the ratio of the diameter D5 (FIG. 28) of the GDT 339 to its thickness T5 is in the range of from about 4 to 15. According to some embodiments, the thickness T5 of the GDT 339 is in the range of from about 3 mm to 8 mm. In some embodiments, the diameter of the GDT 339 is in the range of from about 20 mm to 40 mm. In some embodiments, the GDT 339 has surge current and energy withstand capabilities at least as great as those of the MOV varistor wafer 338 used in series with the GDT 339 in the same SPD 311. Suitable GDTs may include the Flat Gas Discharge Tube Type 3L30-25 rated at 600V GDT available from Iskra Zascite d.o.o. of Slovenia or D20-A800XP of TDK-EPC Corporation of Japan (EPCOS).

The body 339A includes a hermetically or gas-tight sealed chamber or cell in which a selected gas is contained. The terminals 339B, 339C are electrically connected to the gas (e.g., by respective electrode portions in fluid contact with the contained gas). Below a prescribed spark over voltage, the GDT 339 is electrically insulating between the terminals 339B, 339C. When an applied voltage across the terminals 339B, 339C exceeds the prescribed spark over voltage, the contained gas is ionized to cause electrical current to flow through the gas (by the Townsend discharge process) and thereby between the terminals 339B, 339C. Thus, the GDT 339 will selectively electrically insulate or conduct, depending on the applied voltage. The voltage required to initiate and sustain electrical conduction (discharge) will depend on the design characteristics of the GDT 339 (e.g., geometry, gas pressure, and gas composition).

As will be appreciated from FIGS. 27 and 28, the varistor wafer 338 and the GDT 339 are stacked in physical and electrical series between the electrodes 320, 330. More particularly, the lower contact surface 338B of the varistor wafer 338 engages the terminal 339B and the contact surface 322A of the electrode wall 322 engages the terminal 339C. As described with regard to the SPD 113, the head 332 and the wall 322 are mechanically loaded against the varistor wafer 338 and the GDT 339 to ensure firm and uniform engagement between the mated surfaces of the head 332, the varistor wafer 338, the GDT 339, and the wall 322.

In order to accommodate the GDT 339, the provided varistor 338 is thinner than the varistor 138. The thickness or thicknesses of the head 332 and/or the wall 322 may also be reduced.

As discussed above, the SPD 311 can be integrated into the overvoltage protection unit 100 in place of the SPD 111. In the event of a sufficient surge current in the line (e.g., line L1) to which the SPD 311 is electrically connected, the transient overvoltage will cause the varistor 338 and the GDT 339 to become electrically conductive, thereby allowing excess current to flow from the line L1 through the SPD 311 and to the GDT 170 to the PE or, where applicable, the neutral N. The surge current flows through the head 332, the varistor wafer 338, the GDT 339, and the wall 322 in electrical series.

The benefit of the SPD 311 (including the GDT 339) is that when the SPD 311 operates it has a lower residual voltage because the GDT 339 has limited voltage when conducting and the varistor 338 is thinner (e.g., than the varistor 138 of an SPD 111 rated for the same voltage). Therefore, the residual voltage that will be developed across the SPD 311 when it will conduct a surge current will be lower than the residual voltage developed in SPD 111. Therefore, the SPD 311 can offer better protection to the equipment. As used herein, "residual voltage" means the voltage developed at the SPD ends during the conduction of a surge current. Another benefit of using the SPD 311 is that it does not conduct any leakage current during normal operating conditions (when the voltage of the power system remains below VNOM of the SPD, i.e., below the prescribed spark over voltage of the GDT), even if the varistor member is suffering from aging. Finally, in some embodiments, in case there is no need for an SPD between N and PE (this is when the N is electrically connected (hardwired) to PE), the SPDs 311, 312, 313 may be used in 3+0 format, i.e., excluding the GDT from the circuit or replacing it with a metal bus bar connection between N and PE terminals. In that case, there might be a need to eliminate leakage current to the PE, as stated before. Under overvoltage conditions the SPD 311 will start conducting when the voltage exceeds the breakdown voltage of the GDT 339. In addition, the SPD 311 has the same fail-safe functionality as the SPD 111 during failure, as the arc generated on the varistor wafer 338 will still result in melting the meltable member 336 which in turn will by-pass both the varistor wafer 338 and the GDT 339 to form a link between the two electrodes 320, 330 of the SPD 311.

When a GDT (e.g., the GDT 339) is inserted in series to the varistor (e.g., the MOV or varistor wafer 338), the fail-safe mechanism could also operate in the same manner and by-pass the series combination of the varistor and the GDT. However, for this fail-safe mechanism to operate in an efficient and appropriate manner, there are several constraints in the selection and application of the GDT. The GDT should have a disk shaped form or configuration, i.e., with a very large diameter to almost match the diameter of the varistor disk and a very small thickness. Note that typical GDTs are of a different shape that is cylindrical, with a small diameter and long length or thickness (distance between the two electrodes). The large diameter of the GDT will provide an increased withstand capability to surge and lightning currents and also will eliminate the empty space below the varistor and thus allow a better connection between the two electrodes when the meltable member melts. In addition, the thickness of the GDT should be very small for two reasons. At first, it will reduce the vertical distance between the two electrodes and enhance the capabilities of the fail-safe mechanism. At second, when there is a current flow from the power source through the combination of the varistor and the GDT in the case of a failure of the SPD (typically the varistor), the reduced thickness of the GDT enables a much faster and better connection between its electrodes and thus its failure to a short circuit that could carry significant current and retain the high short circuit current properties of the original SPD design.

In some embodiments, in case the diameter of the GDT is less than the diameter of the varistor wafer (MOV disk), an insulating ring made of a diaelectric or electrically insulating material (e.g., a material as described below for the membrane 550, such as ULTEM™ thermoplastic) could also be used around the GDT to increase its diameter and fill in the empty space underneath the varistor wafer in order to facilitate the operation of the fail-safe mechanism.

The arrangement of the SPD 311 including a varistor wafer 338 and GDT 339 can also be incorporated into the overvoltage protection unit 200. According to further embodiments, the arrangement of the SPD 311 may also be incorporated into an overvoltage protection unit including a single SPD (e.g., in an SPD configured as disclosed in U.S. Pat. Nos. 6,038,119, 6,430,020, 7,433,169, or 8,743,525).

Figure 29:
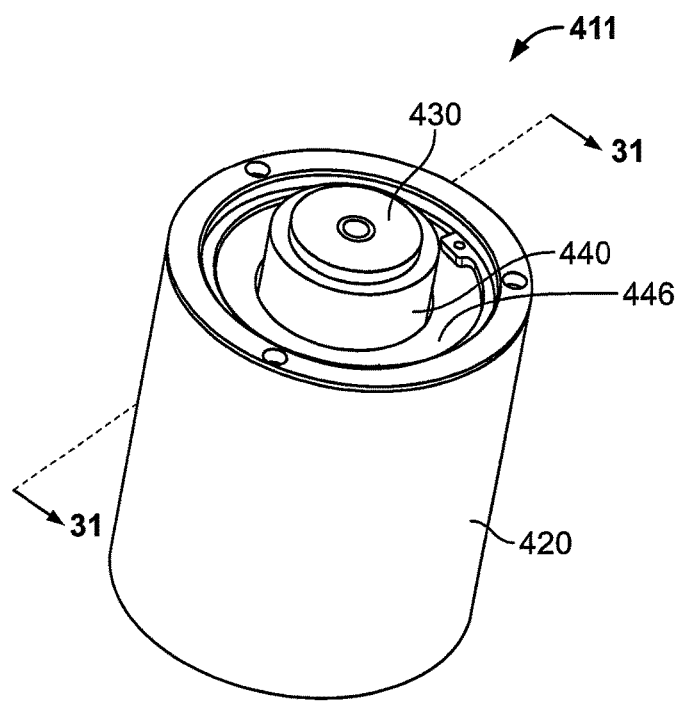
FIG. 29 is a top perspective view of a surge protection device according to further embodiments of the invention.
Figure 30:
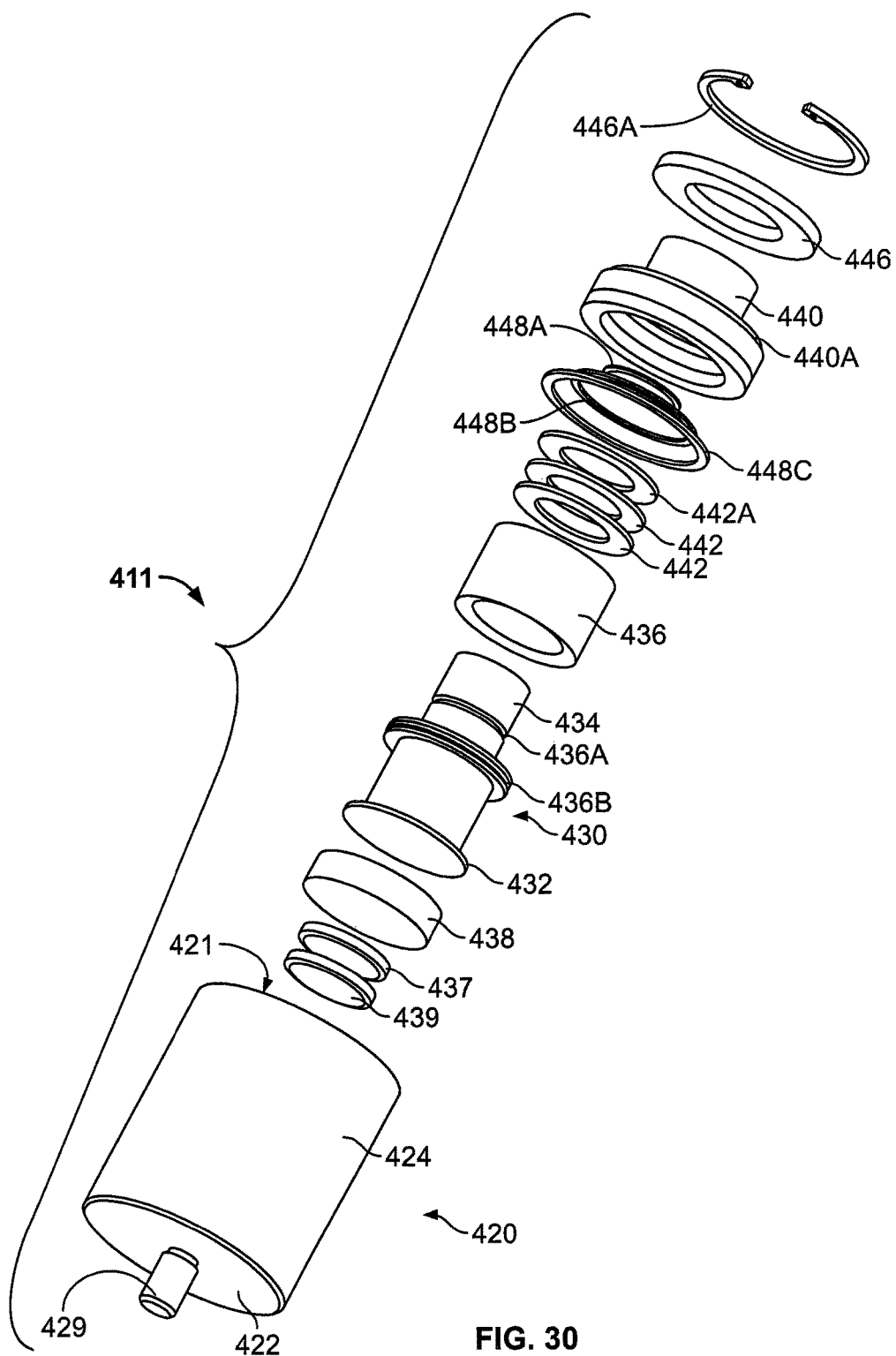
FIG. 30 is an exploded, perspective view of the surge protection device of FIG. 29.
Figure 31:
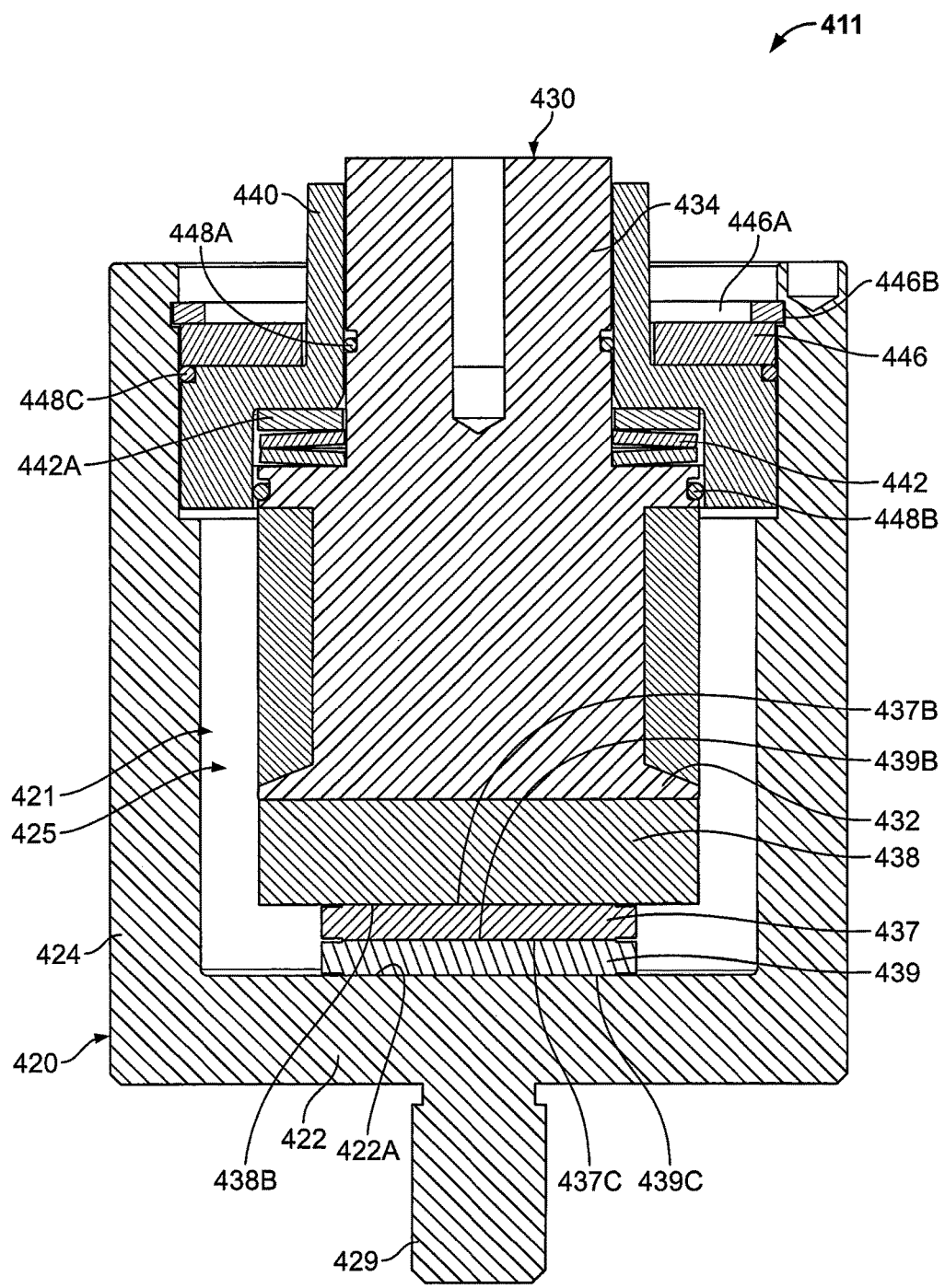
FIG. 31 is a cross-sectional view of the surge protection device of FIG. 29 taken along the line 31-31 of FIG. 29

With reference to FIGS. 29-31, a surge protection device (SPD) 411 according to further embodiments of the invention is shown therein. The SPD 411 can be used individually or in sets to provide overvoltage protection between a line and neutral, for example. In some embodiments, three of the SPDs 411 can be used in place of the SPDs 111, 112, 113, respectively, in the overvoltage protection unit 100. SPDs 111, 112, 113, SPDs 211-216, or SPDs 411 may be used in 3+0 format, i.e., excluding the GDT from the circuit, in case there is no need for an SPD between N and PE (this is when the N is electrically connected (hardwired) to PE).

The SPD 411 includes a first electrode or housing 420, a piston-shaped second electrode 430, a varistor member (herein, "the varistor wafer") 438 between the housing 420 and the electrode 430, and a meltable member 436, corresponding to and constructed in the same manner as the components 120, 130, 138, and 136 of the SPD 311, except as discussed below. The SPD 411 further includes spring washers 442, a flat washer 442A, an insulating member 440, an end cap 446, a retention clip 446A, and O-rings 448A, 448B, 448C. The SPD 411 further includes a first gas discharge tube (GDT) 437 and second a gas discharge tube 439.

The housing 420 has a generally cylindrical outer profile. The housing has an electrode wall or end wall 422 and a side wall 424 defining a housing cavity 421. The housing 420 has a threaded stud 429 configured to electrically connect and mechanically secure the housing 420 to a bus bar, for example. An annular slot 446B is formed in the inner surface of the sidewall of the housing 420.

The housing 420, the insulating member 440 and the end cap 446 collectively define an enclosed chamber 425 containing the varistor 438 and the GDTs 437, 439.

The spring washers 442 surround the shaft 434 of the electrode 430. Each spring washer 442 includes a hole that receives the shaft 434. The lowermost spring washer 442 abuts the top face of the head 432. The spring washers 442 may be formed of a resilient material. According to some embodiments and as illustrated, the spring washers 442 are Belleville washers formed of spring steel. While two spring washers 442 are shown, more or fewer may be used. The springs may be provided in a different stack arrangement such as in series, parallel, or series and parallel.

The flat metal washer 442A is interposed between the uppermost spring washer 442 and the insulator ring 440 with the shaft 434 extending through hole formed in the washer 442A. The washer 442A serves to distribute the mechanical load of the upper spring washer 442 to prevent the spring washer 442 from cutting into the insulator ring 440.

The insulator ring 440 is preferably formed of a dielectric or electrically insulating material having high melting and combustion temperatures. The insulator ring 440 may be formed of polycarbonate, ceramic or a high temperature polymer, for example.

The end cap 446 overlies and abuts the insulator ring 440. The end cap 446 has a hole that receives the shaft 434. According to some embodiments, the clearance between the hole in the end cap 446 and the shaft 434 is in the range of from about 0.1 to 0.2 inch. The end cap 446 may be formed of aluminum, for example.

The clip 446A is resilient and truncated ring shaped. The clip 446A is partly received in the slot 446B and partly extends radially inwardly from the inner wall of the housing 420 to limit outward axial displacement of the end cap 446. The clip 446A may be formed of spring steel.

The O-rings 448A, 448B are positioned in grooves 436A, 436B in the shaft 434 so that they are captured between the electrode 430 and the insulator ring 440. The O-ring 448C is positioned in groove 440A in the insulator ring 440 such that it is captured between the insulating member 440 and the sidewall 424 of the housing 420. When installed, the O-rings 448A, 448B, 448C are compressed so that they are biased against and form a seal between the adjacent interfacing surfaces. In an overvoltage event, byproducts such as hot gases and fragments from the varistor 438 and/or GDTs 437, 439 may fill or scatter into the cavity chamber 425. These byproducts may be constrained or prevented by the O-rings 448A, 448B, 448C from escaping the SPD 411 through the housing opening.

The O-rings 448A, 448B, 448C may be formed of the same or different materials. According to some embodiments, the O-rings 448A, 448B, 448C are formed of a resilient material, such as an elastomer. According to some embodiments, the O-rings 448A, 448B, 448C are formed of rubber. The O-rings 448A, 448B, 448C may be formed of a fluorocarbon rubber such as VITON™ available from DuPont. Other rubbers such as butyl rubber may also be used. According to some embodiments, the rubber has a durometer of between about 60 and 100 Shore A.

As will be appreciated from FIG. 31, the varistor wafer 438, the GDT 437 and the GDT 439 are serially stacked in physical and electrical series between the electrodes 420, 430. More particularly, the lower contact surface 438B of the varistor wafer 438 engages the terminal 437B of the GDT 437, the terminal 437C of the GDT 437 engages the terminal 439B of the GDT 439, and the terminal 439C of the GDT 439 engages the contact surface 422A of the electrode wall 422. As described with regard to the SPD 113, the head 432 and the wall 422 are mechanically loaded against the varistor wafer 438 and the GDTs 437, 439 to ensure firm and uniform engagement between the mated surfaces of the head 432, the varistor wafer 438, the GDT 437, the GDT 439, and the wall 422. In the case of the SPD 411, persistent mechanical loading is provided by the elastically compressed spring washers 442.

Serially stacking the GDTs 437, 439 as described can be used to increase the breakdown voltage of the SPD 411. Alternatively, a single GDT with a higher breakdown voltage may be used in place of the GDTs 437, 439. According to further embodiments, the SPD 311 may be modified to include two or more serially stacked SPDs in place of the single SPD 339.

In some embodiments, in case the diameter of the GDT 437, 439 is less than the diameter of the varistor wafer (MOV disk) 438, an insulating ring made of a dielectric or electrically insulating material (e.g., a material as described below for the membrane 550, such as ULTEM™ thermoplastic) could also be used around the GDT to increase its diameter and fill in the empty space underneath the varistor wafer in order to facilitate the operation of the fail-safe mechanism.

In use, the SPD 411 may be connected directly across an AC or DC input (for example, in an electrical service utility box). Service lines are connected directly or indirectly to each of the electrode shaft 434 and the housing post 429 such that an electrical flow path is provided through the electrode 430, the varistor wafer 438, the GDTs 437, 439, the housing electrode wall 422 and the housing post 429.

Figure 32:
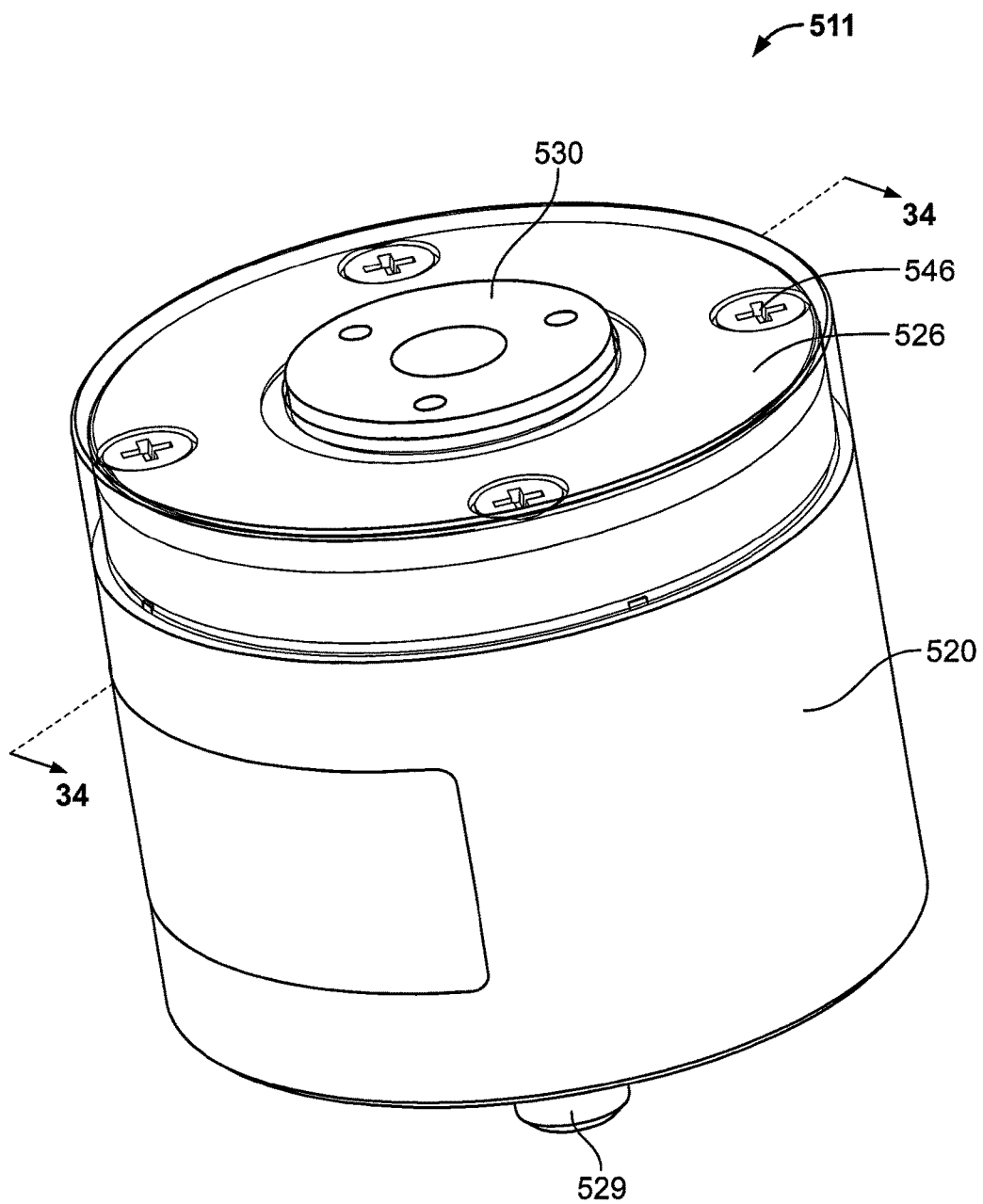
FIG. 32 is a top perspective view of a surge protection device according to further embodiments of the invention.
Figure 33:
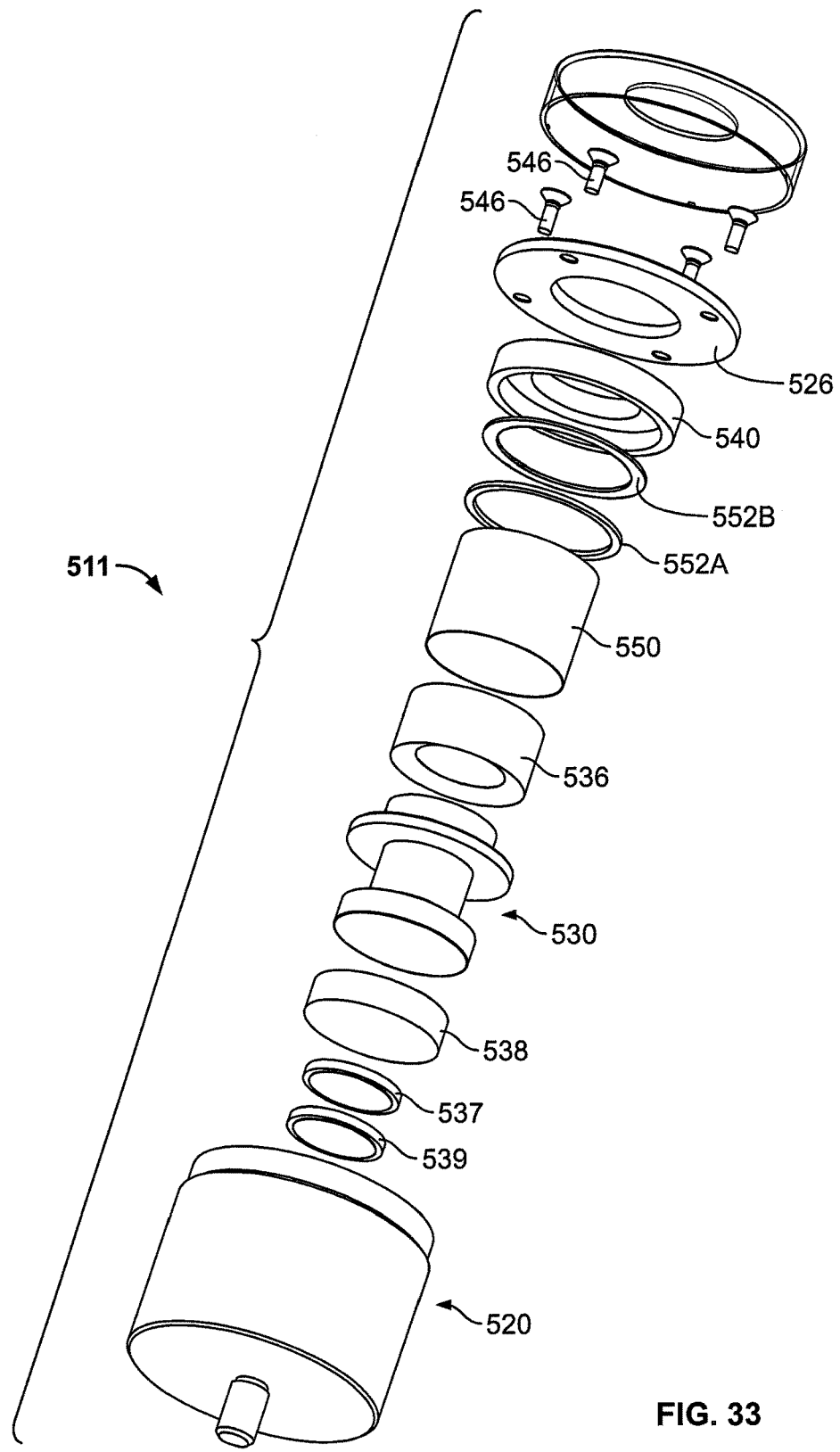
FIG. 33 is an exploded, perspective view of the surge protection device of FIG. 32.
Figure 34:
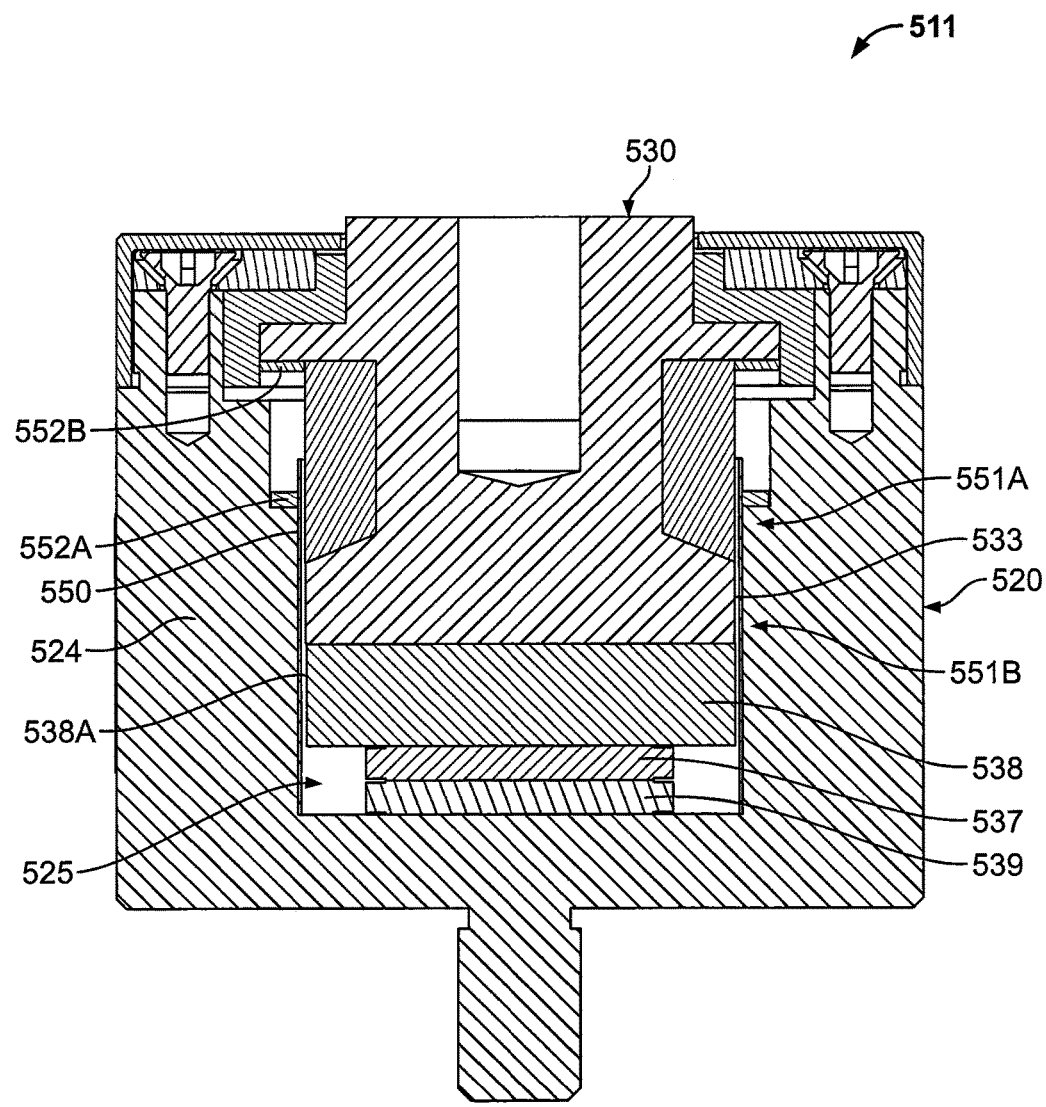
FIG. 34 is a cross-sectional view of the surge protection device of FIG. 32 taken along the line 34-34 of FIG. 32.

With reference to FIGS. 32-34, a surge protection device (SPD) 511 according to further embodiments of the invention is shown therein. The SPD 511 can be used individually or in sets to provide overvoltage protection between a line and neutral, for example. In some embodiments, three of the SPDs 511 can be used in place of the SPDs 111, 112, 113, respectively, in the overvoltage protection unit 100.

The SPD 511 includes a first electrode or housing 520, a piston-shaped second electrode 530, a varistor member (herein, "the varistor wafer") 538 between the housing 520 and the electrode 530, a cover 526, an electrically insulating, elastomeric insulator member 540, a meltable member 536, and bolts 546, corresponding to and generally constructed in the same manner as the components 120, 130, 138, 126, 140, 136, and 146 of the SPD 111. The SPD 511 further includes GDTs 537 and 539 corresponding to the GDTs 437 and 439. The housing 520 is cylindrical and provided with a threaded connector post 529 as in the SPD 411.

The SPD 511 is further provided with annular, flat, electrically insulating rings 552A, 552B and an electrically insulating spacer member or membrane 550 disposed in the cavity or chamber 525.

The membrane 550 is formed of a dielectric or electrically insulating material having high melting and combustion temperatures, but which can be disintegrated (such as by melting, burning, combusting or vaporizing) when subjected to an electric arc or the high temperatures created by an electric arc. According to some embodiments, the membrane 550 is formed of a high temperature polymer and, in some embodiments, a high temperature thermoplastic. In some embodiments, the membrane 550 is formed of polyetherimide (PEI), such as ULTEM™ thermoplastic available from SABIC of Saudi Arabia. In some embodiments, the membrane 550 is formed of non-reinforced polyetherimide. In some embodiments, the membrane 550 is formed of Polypropylene material GK-5 flame retardant propylene sheet material available from FROMEX of Addison Ill.

According to some embodiments, the membrane 550 is formed of a material having a melting point greater than the melting point of the meltable member 536. According to some embodiments, the membrane 550 is formed of a material having a melting point in the range of from about 120 to 200° C. and, according to some embodiments, in the range of from about 140 to 160° C.

According to some embodiments, the membrane 550 material can withstand a voltage of 25 kV per mm of thickness.

According to some embodiments, the membrane 550 has a thickness in the range of from about 0.1 to 0.5 mm and, in some embodiments, in the range of from about 0.3 to 0.4 mm.

In use, the meltable member 536 operates as a fail-safe mechanism 551A in the same manner as the meltable member 136 as described above.

The SPD 511 is configured to provide a fail-safe system 551B as described in U.S. Pat. No. 8,743,525 to Xepapas et al., the disclosure of which is incorporated herein by reference. More particularly, the fail-safe system 551B can be triggered when the varistor 538 fails as a short circuit. In this case, arcing will occur adjacent and within a short circuit failure site. More particularly, the arcing will occur between the varistor 538 and one or both of the electrodes 520, 530 at the varistor-electrode contact interfaces. The arcing will propagate radially outwardly toward the housing sidewall 524. The arcing may travel from the electrode wall 522 of the housing 520 up the housing sidewall 524 (i.e., with the arc extending between the varistor sidewall 538A and the housing sidewall 524) and/or may travel from the varistor upper contact face to the sidewall 533 of the electrode head 532. Ultimately, the arcing propagates up the housing sidewall 524 such that arcing occurs directly between the outer peripheral sidewall 533 of the electrode head 532 and the adjacent, opposing surface of the housing sidewall 524. This latter arcing causes a metal surface portion of the head sidewall 533 and a metal surface portion of the housing sidewall 524 to fuse or bond directly to one another in a prescribed region at a bonding or fusing site to form a bonded or fused interface portion, or region. In some embodiments, the electrodes 520, 530 are both formed of aluminum or aluminum alloy, so that the bond is direct aluminum-to-aluminum, which can provide particularly low ohmic resistance. The fusing or bonding may occur by welding induced by the arc. In this way, the electrodes 520, 530 are shorted at the interface to bypass the varistor 538 so that the current induced heating of the varistor 538 ceases.

The electrical insulation membrane 550 is provided between the housing sidewall 524 and the electrode head 532 and the varistor 538 to provide electrical isolation in normal operation. However, the membrane 550 is formed of a material that is quickly melted or vaporized by the arcing so that the membrane 550 does not unduly impede the propagation of the arc or the bonding of the electrodes 520, 530 as described.

The fail-safe mechanism 551B serves in addition to and in cooperation with the fail-safe mechanism 551A of the meltable member 536 as described in U.S. Pat. No. 8,743,525, for example. In the event of a fail-short varistor, either of the meltable member fail-safe mechanism 551A and/or the fail-safe system 551B may be triggered or activated, in which case it is unlikely that the other will be. The fail-safe system 551B requires a fault current sufficient to create the arcing, whereas the meltable member fail-safe system 551A does not. When sufficient fault current is present to create the arcing, the fail-safe system 551B will typically execute and form the electrode short circuit before the meltable member fail-safe system 551A can form the meltable member short. However, if the applied current is insufficient to generate the arcing, the fault current will continue to heat the device 511 until the meltable member fail-safe system 551A is activated. Thus, where a fail-short varistor is the trigger, the meltable member fail-safe system will operate for relatively low current and the fail-safe system 551B will operate for relatively high current.

When a GDT (e.g., the GDTs 537, 539) is inserted in series to the varistor (e.g., the MOV or varistor wafer 538), the fail-safe mechanism could also operate in the same manner and by-pass the series combination of the varistor and the GDT. However, for this fail-safe mechanism to operate in an efficient and appropriate manner, there are several constraints in the selection and application of the GDT. The GDT should have a disk shaped form or configuration, i.e., with a very large diameter to almost match the diameter of the varistor disk and a very small thickness. Note that typical GDTs are of a different shape that is cylindrical, with a small diameter and long length or thickness (distance between the two electrodes). The large diameter of the GDT will provide an increased withstand capability to surge and lightning currents and also will eliminate the empty space below the varistor and thus allow a better connection between the two electrodes when the meltable member melts. In addition, the thickness of the GDT should be very small for two reasons. At first, it will reduce the vertical distance between the two electrodes and enhance the capabilities of the fail-safe mechanism. At second, when there is a current flow from the power source through the combination of the varistor and the GDT in the case of a failure of the SPD (typically the varistor), the reduced thickness of the GDT enables a much faster and better connection between its electrodes and thus its failure to a short circuit that could carry significant current and retain the high short circuit current properties of the original SPD design.

In some embodiments, in case the diameter of the GDT 537, 539 is less than the diameter of the varistor wafer (MOV disk) 538, an insulating ring made of a dielectric or electrically insulating material (e.g., a material as described above for the membrane 550, such as ULTEM' thermoplastic) could also be used around the GDT to increase its diameter and fill in the empty space underneath the varistor wafer in order to facilitate the operation of the fail-safe mechanism.

Methods for forming the several components of the overvoltage protection devices of the present invention will be apparent to those of skill in the art in view of the foregoing description. For example, the housings 120, 221 and the electrodes 130, 230, 330 may be formed by machining, casting or impact molding. Each of these elements may be unitarily formed or formed of multiple components fixedly joined, by welding, for example.

Multiple varistor wafers (not shown) may be stacked and sandwiched between the electrode head and the center wall of each SPD 111-113, 211-216, 311, 411, 511. The outer surfaces of the uppermost and lowermost varistor wafers would serve as the wafer contact surfaces. However, the properties of the varistor wafer are preferably modified by changing the thickness of a single varistor wafer rather than stacking a plurality of varistor wafers.

While the SPD 311 is shown including only a single GDT 339, the SPD 311 may be modified to include two or more GDTs in series as in the SPD 411. Similarly, the SPDs 411 and 511 may be modified to include only a single GDT or three or more GDTs in series.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A modular overvoltage protection unit comprising:
a unit enclosure defining an enclosure cavity and having an integral DIN rail receiver channel;
first and second surge protection devices (SPDs) each disposed in the enclosure cavity, each of the first and second SPDs including:
a first electrode in the form of a metal housing defining a housing cavity;
a second electrode disposed within the housing cavity; and
a varistor member formed of a varistor material, wherein the varistor member is captured between and electrically connected with each of the first and second electrodes;
wherein the unit enclosure is configured to mount the overvoltage protection unit on a DIN rail such that the DIN rail is seated and secured in the DIN rail receiver channel to support the unit enclosure on the DIN rail; and
wherein the unit enclosure is DIN standard compliant.

2. The modular surge protection device of claim 1 wherein the unit enclosure includes an integral rail hook feature and an integral DIN rail latch mechanism each located along the DIN rail receiver channel and configured to engage the DIN rail and secure the DIN rail in the DIN rail receiver channel to secure the unit enclosure to the DIN rail.

3. A modular surge protection device comprising:
a first electrode;
a second electrode;
a varistor member captured between and electrically connected with each of the first and second electrodes, wherein the varistor member is formed of a varistor material;
a first gas discharge tube (GDT) captured and electrically connected between the varistor member and one of the first and second electrodes; and
a second GDT captured and electrically connected between the first GDT and the one of the first and second electrodes.

4. The modular surge protection device of claim 3 including an elastomeric insulator member electrically insulating the first electrode from the second electrode and biasing the first and second electrodes to apply a compressive load on the varistor member, the first GDT, and the second GDT.

5. The modular surge protection device of claim 3 wherein:
the first electrode includes a housing electrode including an end wall and an integral sidewall collectively defining a cavity;
the end wall and the sidewall of the housing electrode are unitarily formed of metal;
the second electrode extends into the cavity and includes a head; and
the varistor member, the first GDT, and the second GDT are axially stacked between the end wall and the head.

6. A modular surge protection device comprising:
a first electrode;
a second electrode;
a varistor member captured between and electrically connected with each of the first and second electrodes, wherein the varistor member is formed of a varistor material;
a gas discharge tube (GDT) captured and electrically connected between the varistor member and one of the first and second electrodes; and
an electrically conductive, meltable member, wherein the meltable member is responsive to heat in the modular surge protection device to melt and form a short circuit current flow path through the meltable member, between the first and second electrodes and bypassing the varistor member and the GDT.

7. The modular surge protection device of claim 6 further including an integral fail-safe mechanism operative to electrically short circuit the first and second electrode members about the varistor member by fusing first and second metal surfaces in the overvoltage protection device to one another using an electric arc.

8. The modular surge protection device of claim 6 including an elastomeric insulator member electrically insulating the first electrode from the second electrode and biasing the first and second electrodes to apply a compressive load on the varistor member and the GDT.

9. The modular surge protection device of claim 6 wherein:
the first electrode includes a housing electrode including an end wall and an integral sidewall collectively defining a cavity;
the end wall and the sidewall of the housing electrode are unitarily formed of metal;
the second electrode extends into the cavity and includes a head;
the varistor member and the GDT are axially stacked between the end wall and the head; and
when the meltable member melts responsive to heat in the modular surge protection device, the meltable member contacts each of the housing electrode and the second electrode.

10. A modular surge protection device comprising:
a first electrode;
a second electrode;
a varistor member captured between and electrically connected with each of the first and second electrodes, wherein the varistor member is formed of a varistor material;
a gas discharge tube (GDT) captured and electrically connected between the varistor member and one of the first and second electrodes; and
an integral fail-safe mechanism operative to electrically short circuit the first and second electrode members about the varistor member by fusing first and second metal surfaces in the overvoltage protection device to one another using an electric arc.

11. The modular surge protection device of claim 10 wherein:
the first and second metal surfaces are separated by a gap;
the overvoltage protection device further includes an electrically insulating spacer member electrically isolating the first and second metal surfaces from one another; and
the electric arc disintegrates the spacer member and extends across the gap to fuse the first and second metal surfaces.

12. The modular surge protection device of claim 10 including an elastomeric insulator member electrically insulating the first electrode from the second electrode and biasing the first and second electrodes to apply a compressive load on the varistor member and the GDT.

13. The modular surge protection device of claim 10 wherein:
the first electrode includes a housing electrode including an end wall and an integral sidewall collectively defining a cavity;

the end wall and the sidewall of the housing electrode are unitarily formed of metal;
the second electrode extends into the cavity and includes a head;
the varistor member and the GDT are axially stacked between the end wall and the head;
the first metal surface is a metal surface of the second electrode; and
the second metal surface is a metal surface of the housing electrode.

14. A modular surge protection device comprising:
a first electrode;
a second electrode;
a varistor member captured between and electrically connected with each of the first and second electrodes, wherein the varistor member is formed of a varistor material;
a gas discharge tube (GDT) captured and electrically connected between the varistor member and one of the first and second electrodes; and
an elastomeric insulator member electrically insulating the first electrode from the second electrode and biasing the first and second electrodes to apply a compressive load on the varistor member and the GDT.

15. The modular surge protection device of claim 14 wherein the elastomeric insulator member is formed of silicone rubber.

16. The modular surge protection device of claim 14 further including:
an electrically conductive, meltable member, wherein the meltable member is responsive to heat in the modular surge protection device to melt and form a short circuit current flow path through the meltable member, between the first and second electrodes and bypassing the varistor member and the GDT; and
an integral fail-safe mechanism operative to electrically short circuit the first and second electrode members about the varistor member by fusing first and second metal surfaces in the overvoltage protection device to one another using an electric arc, wherein:
the first and second metal surfaces are separated by a gap;
the overvoltage protection device further includes an electrically insulating spacer member electrically isolating the first and second metal surfaces from one another; and
the electric arc disintegrates the spacer member and extends across the gap to fuse the first and second metal surfaces.

17. The modular surge protection device of claim 16 including a second GDT captured and electrically connected between the first GDT and the one of the first and second electrodes.

18. The modular surge protection device of claim 14 wherein:
the first electrode includes a housing electrode including an end wall and an integral sidewall collectively defining a cavity;
the end wall and the sidewall of the housing electrode are unitarily formed of metal;
the second electrode extends into the cavity and includes a head; and
the varistor member and the GDT are axially stacked between the end wall and the head; and
the elastomeric insulator member biases the head toward the end wall to apply the compressive load on the varistor member and the GDT.

19. A modular surge protection device comprising:
a first electrode in the form of a metal housing defining a housing cavity;
a second electrode disposed within the housing cavity;
a varistor member captured between and electrically connected with each of the first and second electrodes, wherein the varistor member is formed of a varistor material; and
an elastomeric insulator member electrically insulating the first electrode from the second electrode and biasing the first and second electrodes to apply a compressive load on the varistor member.

20. The modular surge protection device of claim 19 wherein the elastomeric insulator member is formed of silicone rubber.

21. The modular surge protection device of claim 19 further including an electrically conductive, meltable member, wherein the meltable member is responsive to heat in the modular surge protection device to melt and form a short circuit current flow path through the meltable member, between the first and second electrodes and bypassing the varistor member.

22. The modular surge protection device of claim 21 further including an integral fail-safe mechanism operative to electrically short circuit the first and second electrode members about the varistor member by fusing first and second metal surfaces in the overvoltage protection device to one another using an electric arc.

23. The modular surge protection device of claim 19 further including an integral fail-safe mechanism operative to electrically short circuit the first and second electrode members about the varistor member by fusing first and second metal surfaces in the overvoltage protection device to one another using an electric arc.

24. The modular surge protection device of claim 23 wherein:
the first and second metal surfaces are separated by a gap;
the overvoltage protection device further includes an electrically insulating spacer member electrically isolating the first and second metal surfaces from one another; and
the electric arc disintegrates the spacer member and extends across the gap to fuse the first and second metal surfaces.

25. The modular surge protection device of claim 19 wherein:
the first electrode includes a housing electrode including an end wall and an integral sidewall collectively defining a cavity;
the end wall and the sidewall of the housing electrode are unitarily formed of metal;
the second electrode extends into the cavity and includes a head;
the varistor member is axially stacked between the end wall and the head; and
the elastomeric insulator member biases the head toward the end wall to apply the compressive load on the varistor member.

* * * * *

UNITED STATES PATENT AND TRADEMARK OFFICE
CERTIFICATE OF CORRECTION

PATENT NO. : 10,340,688 B2
APPLICATION NO. : 15/870158
DATED : July 2, 2019
INVENTOR(S) : Tsovilis et al.

Page 1 of 1

It is certified that error appears in the above-identified patent and that said Letters Patent is hereby corrected as shown below:

On the Title Page

Item (56) References Cited, FOREIGN PATENT DOCUMENTS, Page 2, Column 2, Line 3:
Please correct "DE 10 2008 02655" to read -- DE 10 2008 026555 --

In the Specification

Column 12, Line 46: Please correct "114" to read -- H4 --

Column 21, Line 4: Please correct "26011" to read -- 260H --

Column 30, Line 27: Please correct "ULTEM'" to read -- ULTEM™ --

Signed and Sealed this
Twenty-fourth Day of March, 2020

Andrei Iancu
*Director of the United States Patent and Trademark Office*